US012412716B2

(12) United States Patent
Okuda et al.

(10) Patent No.: US 12,412,716 B2
(45) Date of Patent: Sep. 9, 2025

(54) ELECTROMAGNETIC RELAY

(71) Applicant: Panasonic Intellectual Property Management Co., Ltd., Osaka (JP)

(72) Inventors: Akihiro Okuda, Mie (JP); Machiko Nishiyama, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 216 days.

(21) Appl. No.: 18/259,592

(22) PCT Filed: Dec. 9, 2021

(86) PCT No.: PCT/JP2021/045405
§ 371 (c)(1),
(2) Date: Jun. 28, 2023

(87) PCT Pub. No.: WO2022/149404
PCT Pub. Date: Jul. 14, 2022

(65) Prior Publication Data

US 2024/0136133 A1 Apr. 25, 2024
US 2024/0234063 A9 Jul. 11, 2024

(30) Foreign Application Priority Data

Jan. 6, 2021 (JP) ................................ 2021-000828

(51) Int. Cl.
*H01H 50/54* (2006.01)
*H01H 50/26* (2006.01)
(Continued)

(52) U.S. Cl.
CPC .......... *H01H 50/541* (2013.01); *H01H 50/26* (2013.01); *H01H 50/36* (2013.01); *H01H 50/546* (2013.01); *H01H 2050/446* (2013.01)

(58) Field of Classification Search
None
See application file for complete search history.

(56) References Cited

U.S. PATENT DOCUMENTS 5,144,270 A * 9/1992 Schedele .............. H01H 50/642 335/131
5,160,910 A * 11/1992 Tsuji .................... H01H 50/642 335/121
(Continued)

FOREIGN PATENT DOCUMENTS

JP 6-196065 A 7/1994
JP 8-235995 A 9/1996
JP 2015-115248 6/2015

OTHER PUBLICATIONS

International Search Report of PCT application No. PCT/JP2021/045405 dated Mar. 1, 2022.

*Primary Examiner* — Bernard Rojas
(74) *Attorney, Agent, or Firm* — Rimon P.C.

(57) ABSTRACT

An electromagnetic relay includes: a housing including a base and a case that opens downward and is provided on the base, the housing having an internal space surrounded by the base and the case; a main fixed contact; a main moving contact that comes into contact with and separates from the main fixed contact; an auxiliary fixed contact; an auxiliary moving contact that comes into contact with and separates from the auxiliary fixed contact; a coil provided in the housing such that a central axis extends in a vertical direction; an iron core disposed so as to be surrounded by the coil; a yoke disposed around the coil; an armature that is disposed to face an upper end of the iron core and swings in response to excitation/non-excitation of the coil; a movable part provided with the main moving contact and configured to move in response to swinging of the armature; and a partition wall that divides the internal space of the housing into a first space and a second space. The main fixed contact and the main moving contact are disposed in the first space, and the auxiliary fixed contact and the auxiliary moving contact are disposed in the second space.

15 Claims, 44 Drawing Sheets

(51) Int. Cl.
*H01H 50/36* (2006.01)
*H01H 50/44* (2006.01)

(56) References Cited

U.S. PATENT DOCUMENTS

| | | | | |
|---|---|---|---|---|
| 7,205,870 | B2 * | 4/2007 | Sanada | H01H 50/642 335/83 |
| 10,546,707 | B2 * | 1/2020 | Kubono | H01H 50/26 |
| 2016/0314920 | A1 | 10/2016 | Aratani | |
| 2017/0047182 | A1 * | 2/2017 | Kubono | H01H 50/56 |

* cited by examiner

ELECTROMAGNETIC RELAY

CROSS-REFERENCE TO RELATED APPLICATIONS

This application is a U.S. national stage application of the PCT International Application No. PCT/JP2021/045405 filed on Dec. 9, 2021, which claims the benefit of foreign priority of Japanese patent application No. 2021-000828 filed on Jan. 6, 2021, the contents all of which are incorporated herein by reference.

TECHNICAL FIELD

The present disclosure relates generally to an electromagnetic relay.

BACKGROUND ART

Conventionally, as disclosed in the following PTL 1, an electromagnetic relay including a housing having a base and a case covering the base and having an internal space is known.

In PTL 1, the electromagnetic relay includes a main contact portion having a main fixed contact and a main moving contact that comes into contact with or separates from the main fixed contact, and an auxiliary contact portion having an auxiliary fixed contact and an auxiliary moving contact that comes into contact with or separates from the auxiliary fixed contact. The main contact portion and the auxiliary contact portion are disposed in an internal space formed in the housing. By bringing the main fixed contact and the main moving contact into contact with or separates from each other, conduction and non-conduction between the main fixed contact portion and the main moving contact portion can be switched. On the other hand, by bringing the auxiliary fixed contact and the auxiliary moving contact into contact with or separated from each other, conduction and non-conduction between the auxiliary fixed contact portion and the auxiliary moving contact portion can be switched.

CITATION LIST

Patent Literature

PTL 1: Unexamined Japanese Patent Publication No. 2015-115248

SUMMARY OF THE INVENTION

As an electromagnetic relay having a main contact portion and an auxiliary contact portion, there is an electromagnetic relay in which a current flowing through the main contact portion is larger than that in the electromagnetic relay disclosed in PTL 1.

In the electromagnetic relay in which the current flowing through the main contact portion is large, there is a high possibility that the auxiliary contact portion is affected by the consumable powder scattered when the main contact portion comes into contact with or separates from the auxiliary contact portion.

Therefore, in the electromagnetic relay in which the current flowing through the main contact portion is large, it is preferable to more reliably prevent the auxiliary contact portion from being affected by the consumable powder or the like scattered when the main contact portion is brought into contact with or separated from the auxiliary contact portion.

That is, in the electromagnetic relay including the main contact portion and the auxiliary contact portion, it is preferable to more reliably prevent the contact reliability of the auxiliary contact portion from deteriorating even when the current flowing through the main contact portion is large.

Therefore, an object of the present disclosure is to provide an electromagnetic relay capable of more reliably preventing the contact reliability of the auxiliary contact portion from deteriorating even when the current flowing through the main contact portion is large.

An electromagnetic relay according to the present disclosure includes: a housing including a base and a case that opens downward and is provided on the base, the housing having an internal space surrounded by the base and the case; a main fixed contact; a main moving contact that comes into contact with and separates from the main fixed contact; an auxiliary fixed contact; an auxiliary moving contact that comes into contact with and separates from the auxiliary fixed contact; a coil provided in the housing such that a central axis extends in a vertical direction; an iron core disposed so as to be surrounded by the coil; a yoke disposed around the coil; an armature that is disposed to face an upper end of the iron core and swings in response to excitation/non-excitation of the coil; a movable part provided with the main moving contact and configured to move in response to swinging of the armature; and a partition wall that divides the internal space of the housing into a first space and a second space. The main fixed contact and the main moving contact are disposed in front of the coil. The main fixed contact, the main moving contact, the auxiliary fixed contact, the auxiliary moving contact, the coil, the iron core, the yoke, the armature, the movable part, and the partition wall are provided in the internal space of the housing. The main fixed contact and the main moving contact are disposed in the first space. The auxiliary fixed contact and the auxiliary moving contact are disposed in the second space. The partition wall includes a first side wall connected to the base, a pair of second side walls connected to the base, and a pair of third side walls. When viewed from above, the first side wall is disposed between: (1) the main fixed contact and the main moving contact; and (2) the coil, the iron core, the yoke, the auxiliary fixed contact, and the auxiliary moving contact. One of the pair of second side walls is connected to one end of the first side wall. An other of the pair of second side walls is connected to an other end of the first side wall. One of the pair of third side walls is disposed so as to be adjacent to one of the pair of second side walls. An other of the pair of third side walls is disposed so as to be adjacent to an other of the pair of second side walls. The coil is surrounded by the first side wall and the pair of second side walls. (1) Each of the pair of third side walls is located on a side of the auxiliary fixed contact and the auxiliary moving contact, or (2) each of the pair of third side walls is located above the upper end of the iron core.

According to the present disclosure, it is possible to suppress a decrease in contact reliability of the auxiliary contact portion (the auxiliary fixed contact and the auxiliary moving contact) even when a current flowing through the main contact portion (configured by the main fixed contact and the main moving contact) is large.

DESCRIPTION OF EMBODIMENT

An exemplary embodiment of the present disclosure will now be described in detail with reference to the attached drawings. In the following description, the vertical direction in a state where a base is positioned below a case and coils are disposed such that the axial direction extends in the vertical direction is referred to as a Z direction (axial direction). Specifically, a description will be given assuming that the vertical direction in a state where the base is positioned below the case in a state where the base portion extends along a horizontal plane and the coil is disposed such that the axial direction extends in the vertical direction is a Z direction (axial direction).

In addition, a direction intersecting the Z direction (axial direction) will be described as an X direction (first direction: front-rear direction: a direction in which the main fixed contact and the main moving contact face each other). A direction intersecting the X direction and the Z direction will be described as a Y direction (second direction: width direction: longitudinal direction of moving contactor). Specifically, the Z direction is orthogonal to the X direction, and the Y direction is orthogonal to the X direction and the Z direction.

In addition, description will be given by defining an upper side and a lower side in a state where the base is positioned below the case, defining a side on which the main fixed contact is disposed as a front side in the front-rear direction, and defining a side on which the main moving contact is disposed as a rear side in the front-rear direction.

Substantially identical constitutional elements are included in the plurality of exemplary embodiments described hereinafter respectively. Accordingly, in the following description, common symbols are given to the substantially identical constitutional elements, and the repeated explanation of these constitutional elements is omitted.

Further, in the present disclosure, the description will be given by using terms indicating directions such as “upper”, “lower”, “left”, “right”, “front”, and “rear”. However, these terms merely indicate a relative positional relationship, and the present disclosure is not limited thereto. For example, when electromagnetic relay 1 of the present disclosure is installed in an inclined manner, the direction of electromagnetic relay 1 in an actual use state may be different from the direction described in the present disclosure.

First Exemplary Embodiment

Figure 1:
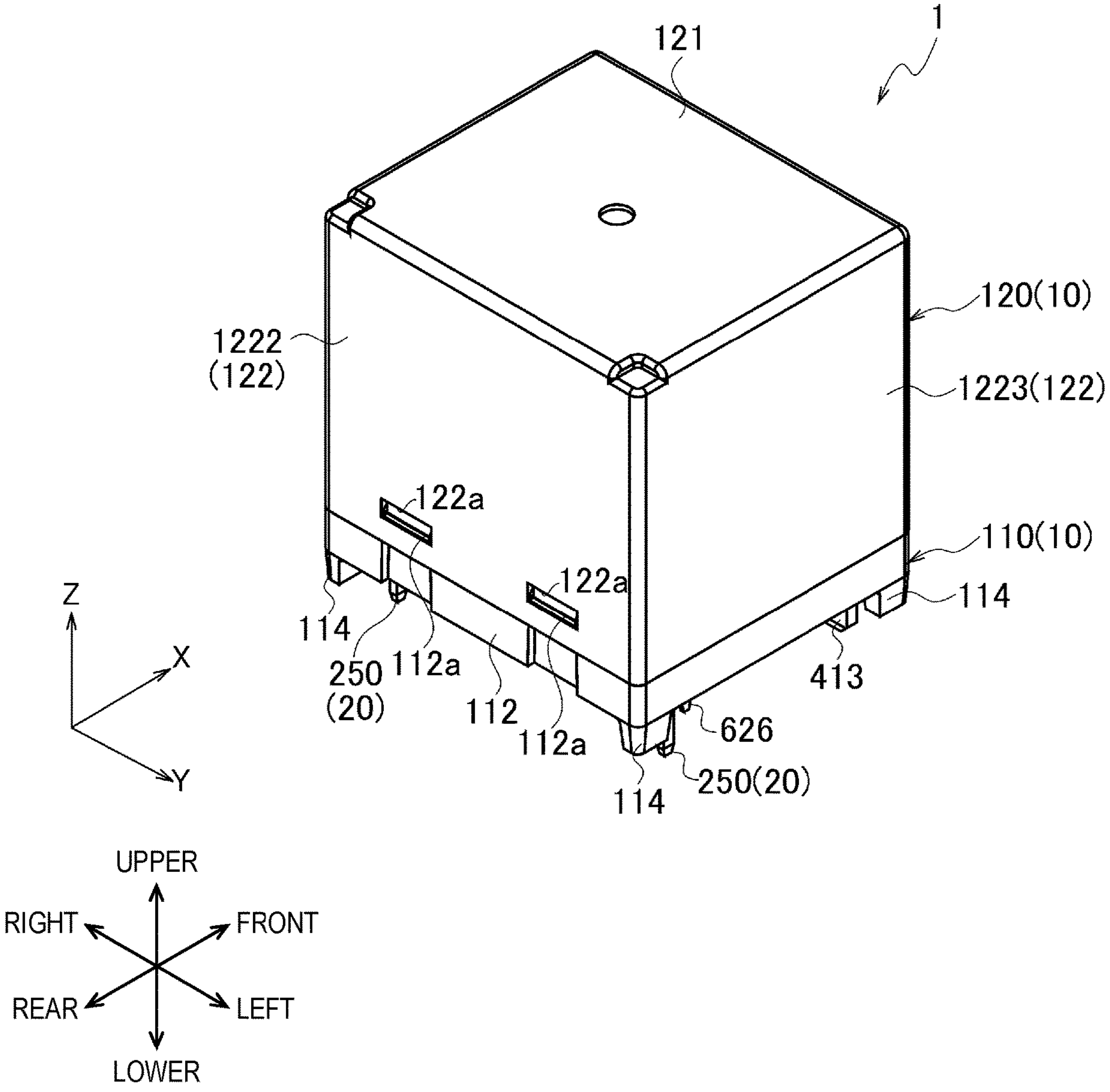
FIG. 1 is a perspective view of an electromagnetic relay according to a first exemplary embodiment as viewed from one direction.
Figure 2:
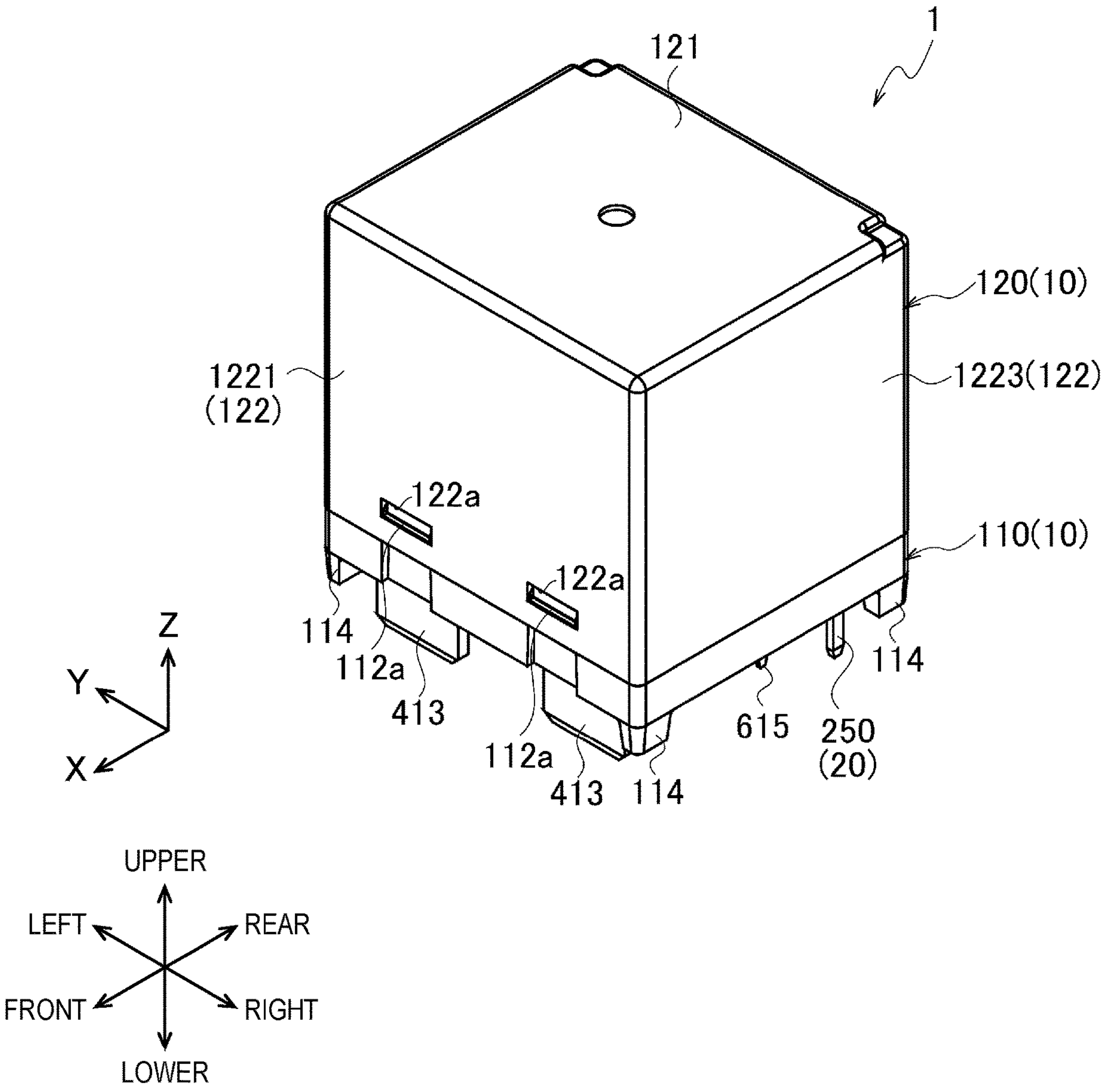
FIG. 2 is a perspective view of the electromagnetic relay according to the first exemplary embodiment as viewed from another direction.

As illustrated in FIGS. 1 and 2, electromagnetic relay 1 according to the present exemplary embodiment includes housing 10 formed of a resin material in a hollow box shape. In the present exemplary embodiment, housing 10 includes base 110 and case 120 covering base 110, and has a substantially rectangular parallelepiped outer surface. In addition, internal space S1 is formed in housing 10 in a state where case 120 is attached to base 110. Note that the shape of the outer surface of housing 10 is not limited to a rectangular parallelepiped shape, and may have any shape.

Electromagnetic device (drive unit) 20 is disposed on the rear side in the X direction (front-rear direction: first direction) in internal space S1 of housing 10, and main contact portion 40 is disposed on the front side in the X direction (front-rear direction: first direction). Further, auxiliary contact portion 60 is disposed behind housing 10 in the X direction (front-rear direction: first direction) and above housing 10 in the Z direction (vertical direction: axial direction) in internal space S1.

Here, in the present exemplary embodiment, main contact portion 40 is a so-called normally closed contact that is turned on in the initial state, and auxiliary contact portion 60 is a so-called normally open contact that is turned off in the initial state. Note that main contact portion 40 can be a so-called normally open contact that is turned off in the initial state, and auxiliary contact portion 60 can be a so-called normally closed contact that is turned on in the initial state.

Base 110 includes base portion 111 in a substantially rectangular plate-shape extending along a substantially horizontal plane (a direction intersecting the Z direction: an XY plane), and a peripheral wall 112 continuously connected to a peripheral edge of base portion 111 and extending in the Z direction (vertical direction) (see FIGS. 3 to 7). A stepped portion is formed on the opening peripheral edge on the upper end side of peripheral wall 112, and the outer periphery is smaller than that on the lower end side. A pair of protrusions **112*a* is juxtaposed in the horizontal direction on each of the front surface and the rear surface above the stepped portion of peripheral wall 112**.

On the other hand, case 120 has a substantially box shape that opens downward, and case 120 is attached to base 110 from above.

Figure 3:
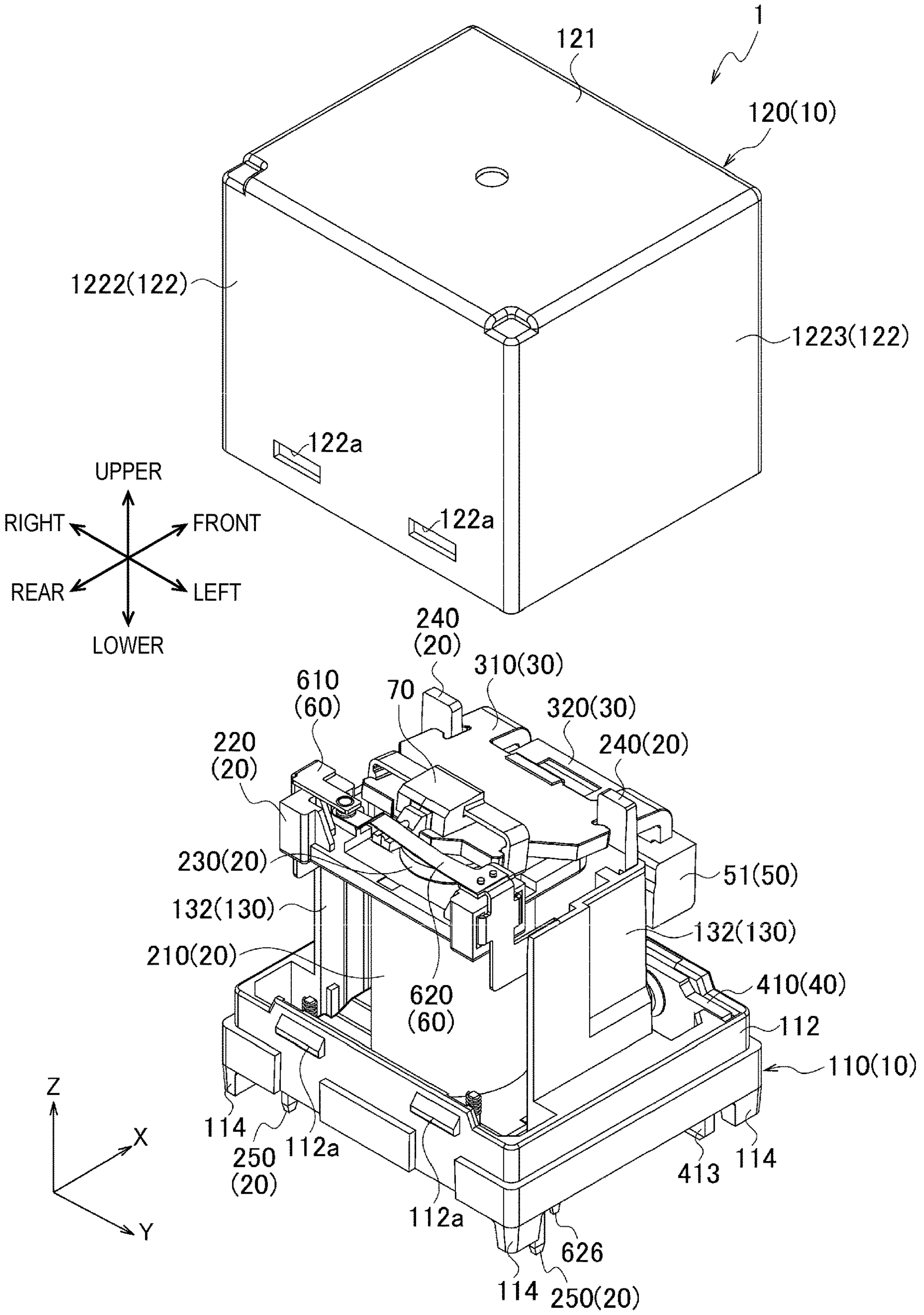
FIG. 3 is a view illustrating the electromagnetic relay according to the first exemplary embodiment, and is an exploded perspective view of a state in which a cover is removed as viewed from one direction.
Figure 4:
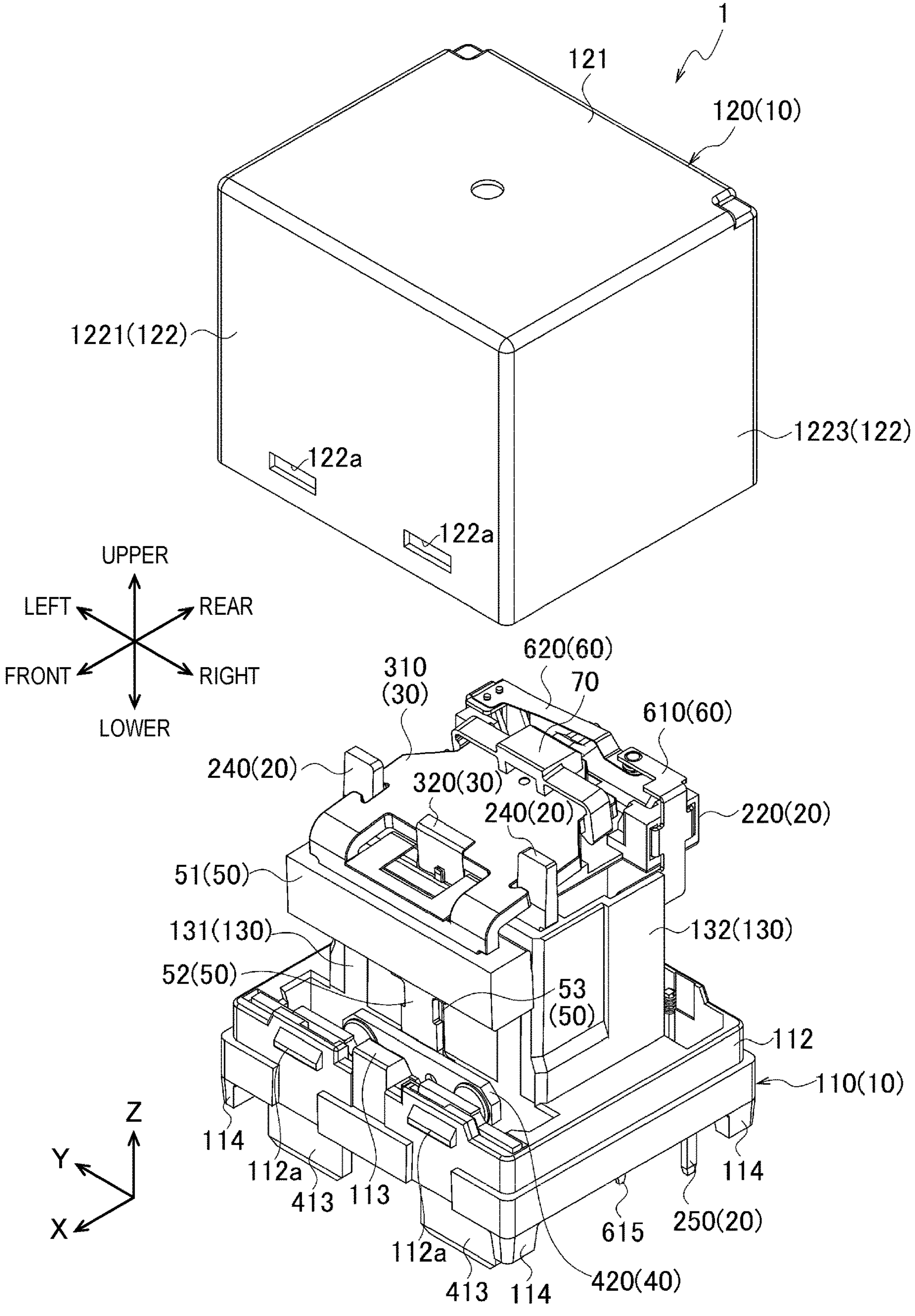
FIG. 4 is a view illustrating the electromagnetic relay according to the first exemplary embodiment, and is an exploded perspective view of a state in which the cover is removed as viewed from another direction.
Figure 5:
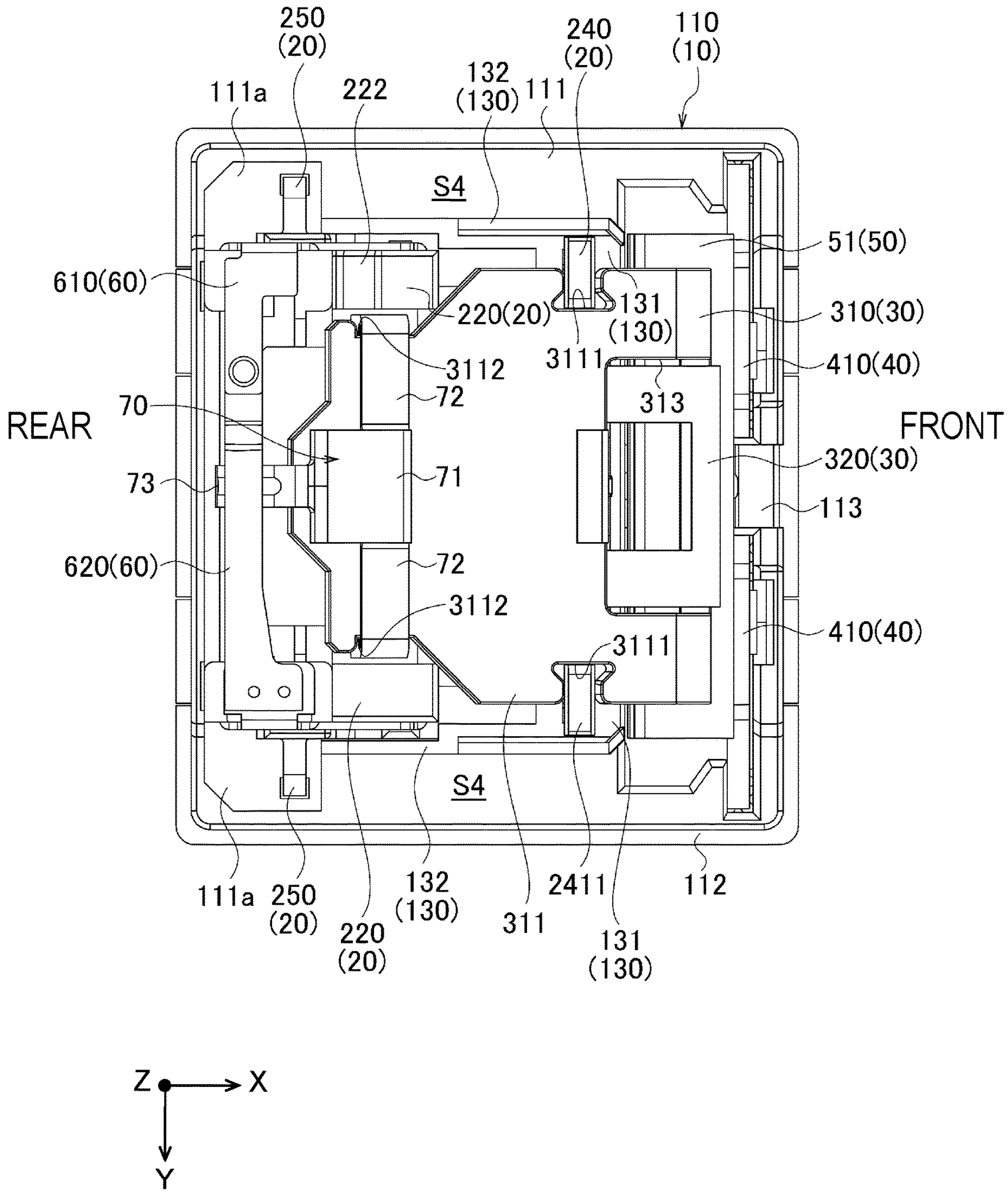
FIG. 5 is a plan view illustrating members other than the cover of the electromagnetic relay according to the first exemplary embodiment as viewed from above.

Case 120 includes top wall 121 in a substantially rectangular plate-shape extending along a substantially horizontal plane (a direction intersecting the Z direction: an XY plane), and peripheral wall 122 extending downward in the Z direction (vertical direction) from a peripheral edge of top wall 121 (see FIGS. 3 to 5).

Peripheral wall 122 includes front wall 1221 that is located on the front side in the X direction (front-rear direction) and extends in the Y direction (width direction) and the Z direction (vertical direction), and a rear wall 1222 that is located backward in the X direction (front-rear direction) and extends in the Y direction (width direction) and the Z direction (vertical direction). Peripheral wall 122 includes a pair of side walls 1223 that is continuously connected to front wall 1221 and rear wall 1222 on both sides in the Y direction (width direction) and extends in the X direction (front-rear direction) and the Z direction (vertical direction).

A pair of insertion holes 122*a* into which protrusion 112*a* of base 110 are inserted when case 120 is attached to base 110 are juxtaposed in the horizontal direction in lower portions of the front wall 1221 and rear wall 1222.

In the present exemplary embodiment, base 110 includes first side wall 131 that is continuously provided so as to rise upward from bottom surface 111*a* of base portion 111 and extends in the Y direction (width direction). Further, base 110 includes a pair of second side walls 132 that is continuously connected from both ends in the Y direction (width direction) of first side wall 131 backward in the X direction (front-rear direction). The pair of second side walls 132 also extends upward from bottom surface 111*a* of base portion 111. Yoke 240 of electromagnetic device 20 is held by first side wall 131 and the pair of second side walls 132 extending upward from bottom surface 111*a* of base portion 111, so that three sides (at least a part) of side surface 210*a* of coil 210 are surrounded.

As described above, in the present exemplary embodiment, electromagnetic device 20 is disposed on the rear side of first side wall 131. Main contact portion 40 is disposed on the front side of first side wall 131 (see FIGS. 2 to 4). That is, in the present exemplary embodiment, electromagnetic device 20 and main contact portion 40 are disposed in internal space S1 in a state partitioned in the X direction (front-rear direction) by first side wall 131.

In addition, partition wall 113 is formed on the front side of first side wall 131 of base 110, and a creepage distance between a pair of fixed contact portions 310, 310 described later is secured by partition wall 113.

In addition, base 110 is provided with raising member 114 for providing a gap between base 110 and a printed circuit board (not illustrated) when electromagnetic relay 1 is disposed on the printed circuit board.

Figure 8:
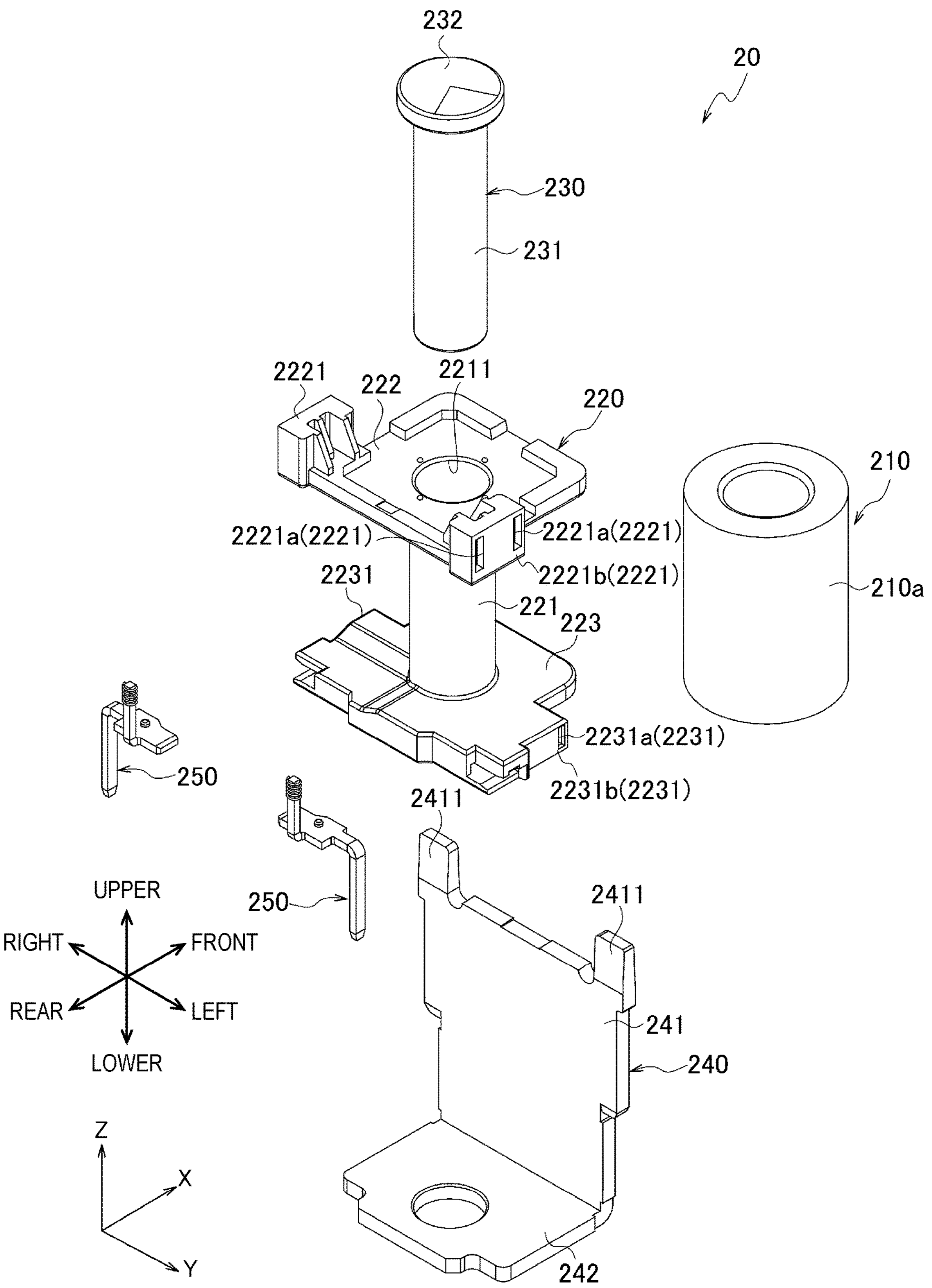
FIG. 8 is an exploded perspective view of the electromagnetic device included in the electromagnetic relay according to the first exemplary embodiment as viewed from one direction.

Electromagnetic device (drive unit) 20 is a device that generates an electromagnetic force, and includes coil 210 that generates a magnetic flux by being energized, and hollow cylindrical coil bobbin 220 around which coil 210 is wound (see FIG. 8).

As coil 210, for example, a conductive wire can be used. In the present exemplary embodiment, coil 210 is disposed in internal space S1 of housing 10 such that the axial direction extends in the Z direction (vertical direction) in a state where base 110 is positioned on the lower side of case 120.

coil bobbin 220 is formed of resin which is an insulating material, and a cylindrical portion 221 having a cylindrical shape and extending in the Z direction (vertical direction: axial direction of the coil) is formed at a central portion of coil bobbin 220. Through-hole 2211 penetrating in the Z direction (vertical direction: axial direction of coil) is formed inside cylindrical portion 221.

In addition, coil bobbin 220 includes upper flange portion 222 in a substantially rectangular shape which is continuously connected to the upper end of cylindrical portion 221 around which coil 210 is wound on the outer surface and protrudes radially outward of cylindrical portion 221. Coil bobbin 220 includes lower flange portion 223 in a substantially rectangular shape which is continuously connected to the lower end of cylindrical portion 221 and protrudes radially outward of cylindrical portion 221.

Further, in the present exemplary embodiment, upper flange portion 222 is formed with upper auxiliary contact retainer 2221 that holds auxiliary contact portion 60. Upper auxiliary contact retainer 2221 is formed at each of both ends in the Y direction (width direction) at the rear end in the X direction (front-rear direction) of upper flange portion 222. Each of upper auxiliary contact retainers 2221 is provided with press-fitting opening 2221*a* that opens outward in the Y direction (width direction) and into which press-fitting piece 6141*a*, 6251*a* of auxiliary contact portion 60 to be described later are press-fitted (see FIGS. 6 to 8). Restriction wall 2221*b* that regulates coming-off and rotation of press-fitting piece 6141*a*, 6251*a* is formed around press-fitting opening 2221*a* in upper auxiliary contact retainer 2221 (see FIGS. 6 to 8).

On the other hand, lower auxiliary contact retainer 2231 that holds auxiliary contact portion 60 is formed in lower flange portion 223. In the present exemplary embodiment, lower flange portion 223 is formed such that the rear end side in the X direction (front-rear direction) is wider than the front end side, and lower auxiliary contact retainers 2231 are respectively formed at both ends in the Y direction (width direction) on the front end side of the wide portion. Each of lower auxiliary contact retainers 2231 is provided with press-fitting opening 2231*a* that opens outward in the Y direction (width direction) and into which press-fitting piece 6143*a*, 6253*a* of auxiliary contact portion 60 to be described later are press-fitted (see FIGS. 6 to 8). Restriction wall 2231*b* that restricts coming off and rotation of press-fitting piece 6143*a*, 6253*a* is formed around press-fitting opening 2231*a* in lower auxiliary contact retainer 2231 (see FIGS. 6 to 8).

Electromagnetic device 20 also includes iron core 230 that is inserted into through-hole 2211 formed in cylindrical portion 221 of coil bobbin 220 and is magnetized (through which magnetic flux passes) by energized coil 210. Iron core 230 is disposed inside coil 210.

Iron core 230 includes shaft portion 231 in a substantially columnar shape extending in the Z direction (vertical direction) and head 232 in a substantially columnar shape formed to have a larger diameter than shaft portion 231 and continuously connected to an upper end of shaft portion 231 (see FIG. 8).

Electromagnetic device 20 includes yoke 240 disposed around coil 210 wound around cylindrical portion 221. In the present exemplary embodiment, yoke 240 is a substantially plate-shaped member made of a magnetic material, and has a substantially L shape in a side view (as viewed along the Y direction). That is, yoke 240 includes vertical wall (upright portion) 241 disposed on the front side of coil 210 wound around cylindrical portion 221 so as to extend substantially along the vertical plane, and horizontal wall 242 extending to the rear side from the lower end of vertical wall 241 (see FIG. 8). Such yoke 240 can be formed, for example, by bending one plate.

As described above, yoke 240 is supported by first side wall 131 and the pair of second side walls 132 extending upward from bottom surface 111*a* of base portion 111 (see FIGS. 3 and 4). A pair of protruding portions (extension parts) 2411 projecting upward is formed at both ends in the Y direction (width direction) of vertical wall (upright portion) 241 of yoke 240, and armature 310 is disposed between the pair of protruding portions (extension parts) 2411.

Further, electromagnetic device 20 includes a pair of coil terminals 250 to which both ends of coil 210 are connected, and electromagnetic device 20 is driven by energizing coil 210 via the pair of coil terminals 250.

Then, moving member 30 is moved by switching the driving state of electromagnetic device 20.

In the present exemplary embodiment, moving member 30 includes armature 310 disposed so as to face head 232 of iron core 230 in the vertical direction (Z direction), and hinge spring 320 attached across armature 310 and yoke 240.

Armature 310 is formed of a conductive metal, and is disposed so as to be swingable in the vertical direction (Z direction) with respect to head 232 of iron core 230 according to the excitation/non-excitation of coil 210.

Figure 9:
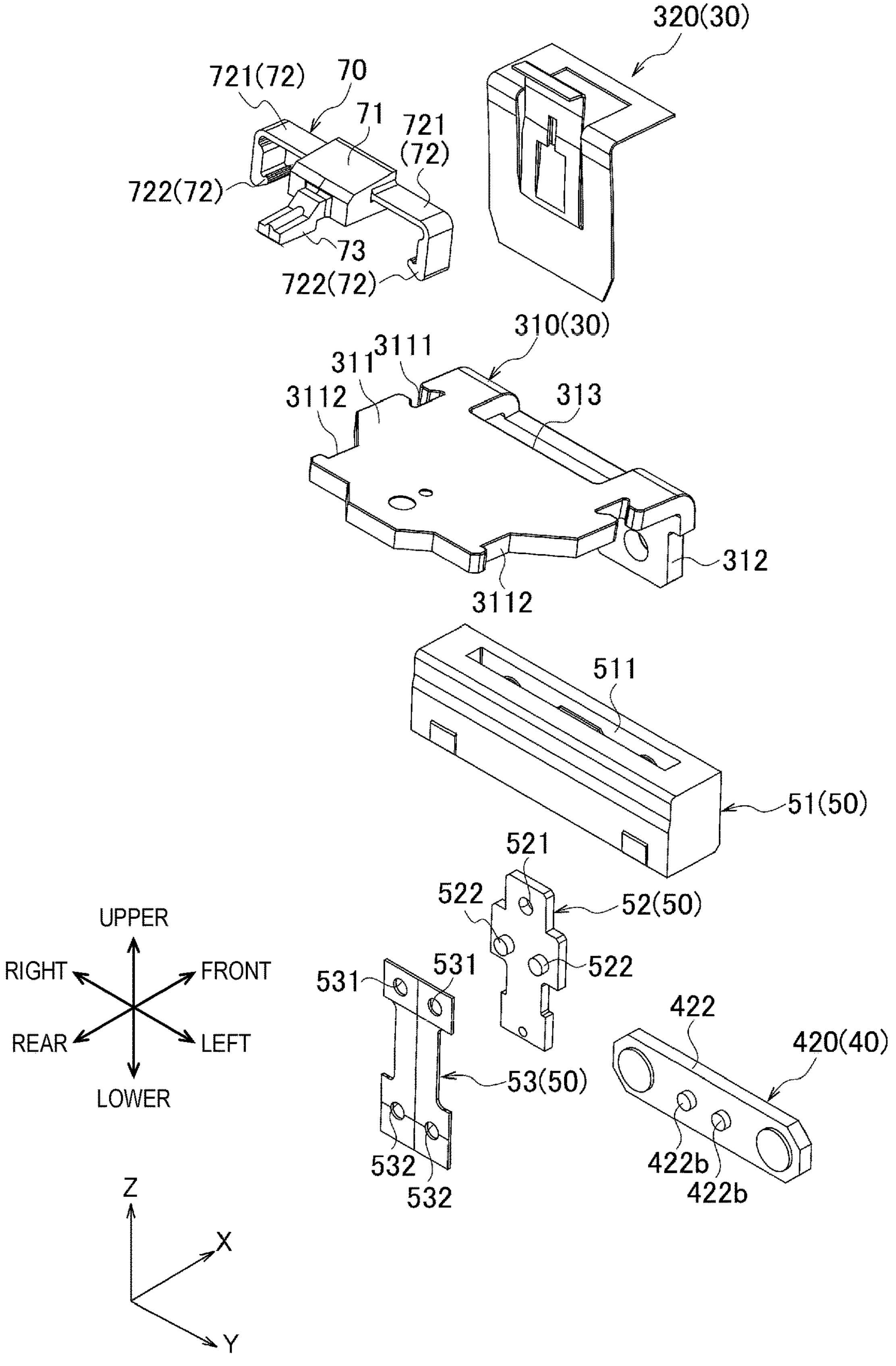
FIG. 9 is an exploded perspective view of a moving member, a movable part, and a main moving contact portion included in the electromagnetic relay according to the first exemplary embodiment as viewed from one direction.
Figure 10:
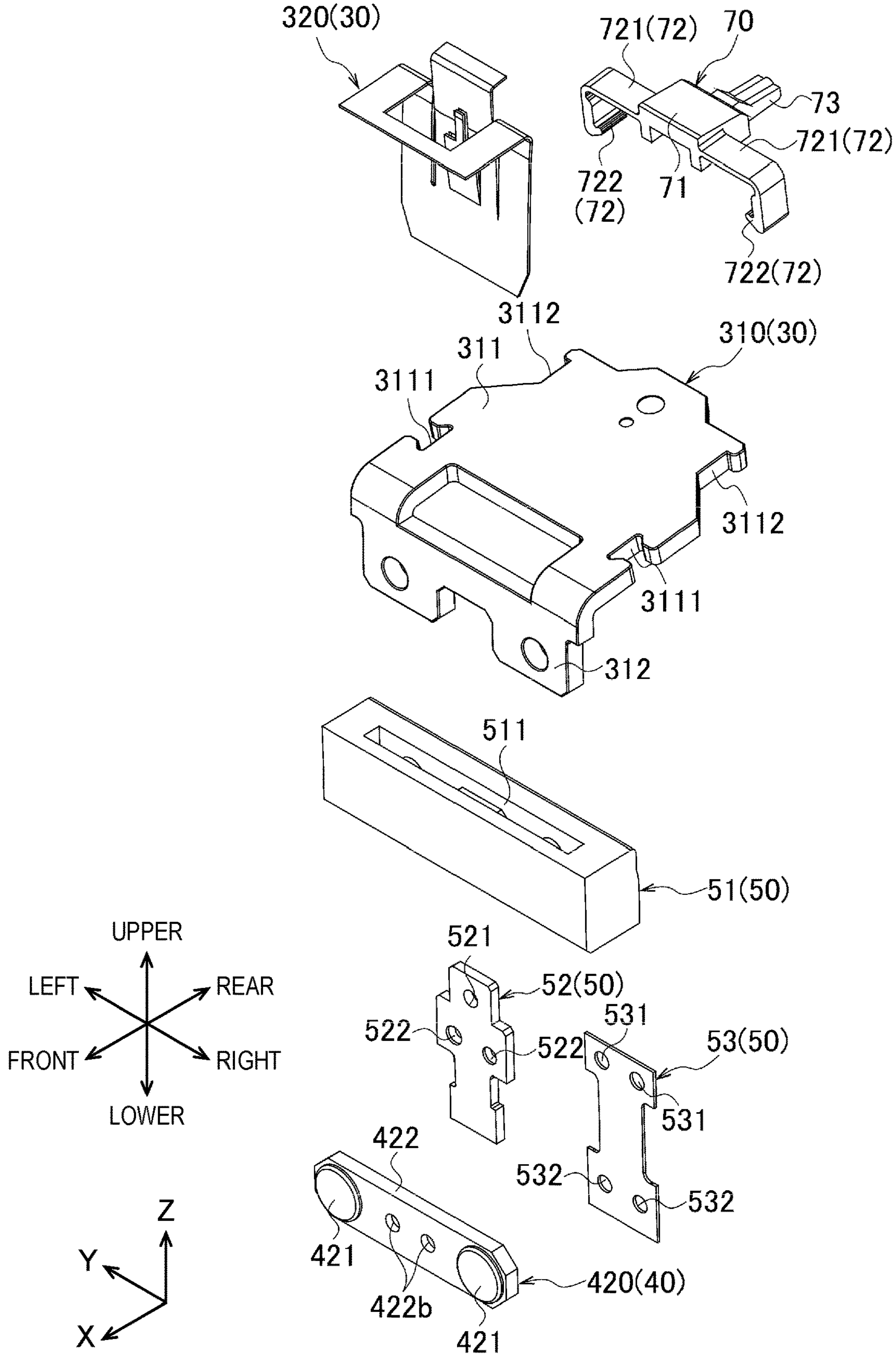
FIG. 10 is an exploded perspective view of the moving member, the movable part, and the main moving contact portion included in the electromagnetic relay according to the first exemplary embodiment as viewed from another direction.

In the present exemplary embodiment, armature 310 includes horizontal wall 311 facing head 232 of iron core 230 in the vertical direction (Z direction), and vertical wall 312 extending downward from the front end of horizontal wall 311 in the X direction (front-rear direction) (see FIGS. 9 and 10).

Horizontal wall 311 of armature 310 is attached to the upper end of vertical wall 241 so as to be swingable in the vertical direction (Z direction), and armature 310 can rotate in the Z direction (vertical direction) about a portion supported by yoke 240.

Specifically, cutouts 3111 are formed at both ends in the Y direction (width direction) at the front end in the X direction (front-rear direction) of horizontal wall 311. Protruding portion (extension portion) 2411 of yoke 240 is inserted into cutout 3111, whereby armature 310 is supported by yoke 240. As described above, in the present exemplary embodiment, cutout 3111 is a portion supported by yoke 240 of armature 310.

Further, in the present exemplary embodiment, through-hole 313 penetrating in the Z direction (vertical direction) is formed at the front end of armature 310 in the X direction (front-rear direction). Then, in a state of being inserted into hinge spring 320 and through-hole 313, armature 310 and yoke 240 are attached. At this time, armature 310 is biased by hinge spring 320 in a direction in which horizontal wall 311 is separated from head 232 of iron core 230.

When coil 210 is energized, armature 310 is rotated so that horizontal wall 311 approaches head 232 of iron core 230. Specifically, horizontal wall 311 of armature 310 is attracted to head 232 of iron core 230 by energizing coil 210, and armature 310 is rotated so that horizontal wall 311 approaches head 232 of iron core 230. That is, by energizing coil 210 via the pair of coil terminals 250, horizontal wall 311 of armature 310 rotates downward in the Z direction (vertical direction). At this time, vertical wall 312 continuously connected to horizontal wall 311 rotates forward in the X direction (front-rear direction).

The swing range of armature 310 is set between a position where horizontal wall 311 is farthest from head 232 of iron core 230 and a position where horizontal wall 311 is closest to head 232 of iron core 230.

In the present exemplary embodiment, the swing range of armature 310 is set between an initial position where horizontal wall 311 is disposed to be separated upward from head 232 of iron core 230 by a predetermined gap and an abutment position where horizontal wall 311 abuts on head 232 of iron core 230.

Therefore, in the present exemplary embodiment, when coil 210 is energized, armature 310 moves to the abutment position where horizontal wall 311 abuts on head 232 of iron core 230, and when the energization to coil 210 is stopped, the armature returns to the initial position by the biasing force of hinge spring 320.

As described above, armature 310 according to the present exemplary embodiment is disposed to face head 232 of iron core 230 via a predetermined gap when coil 210 is not energized, and swings so as to be attracted to head 232 side of iron core 230 when coil 210 is energized.

Then, by switching the driving state of electromagnetic device 20 and swinging armature 310, it is possible to switch conduction and non-conduction between main fixed contact portion 410 and main moving contact portion 420 paired with each other (having main contacts that come into contact with or separate from each other).

In the present exemplary embodiment, main contact portion 40 that opens and closes the main contact according to turning on and off of energization of coil 210 is provided on the front side of electromagnetic device 20.

Main contact portion 40 includes main fixed contact portion 410 and main moving contact portion 420, and main fixed contact portion 410 includes main fixed contact 411 and main body 412 having main fixed contact 411. On the other hand, main moving contact portion 420 includes main moving contact 421 that moves relative to main fixed contact 411 and can come into contact with or separate from main fixed contact 411, and moving contactor 422 having main moving contact 421.

Figure 6:
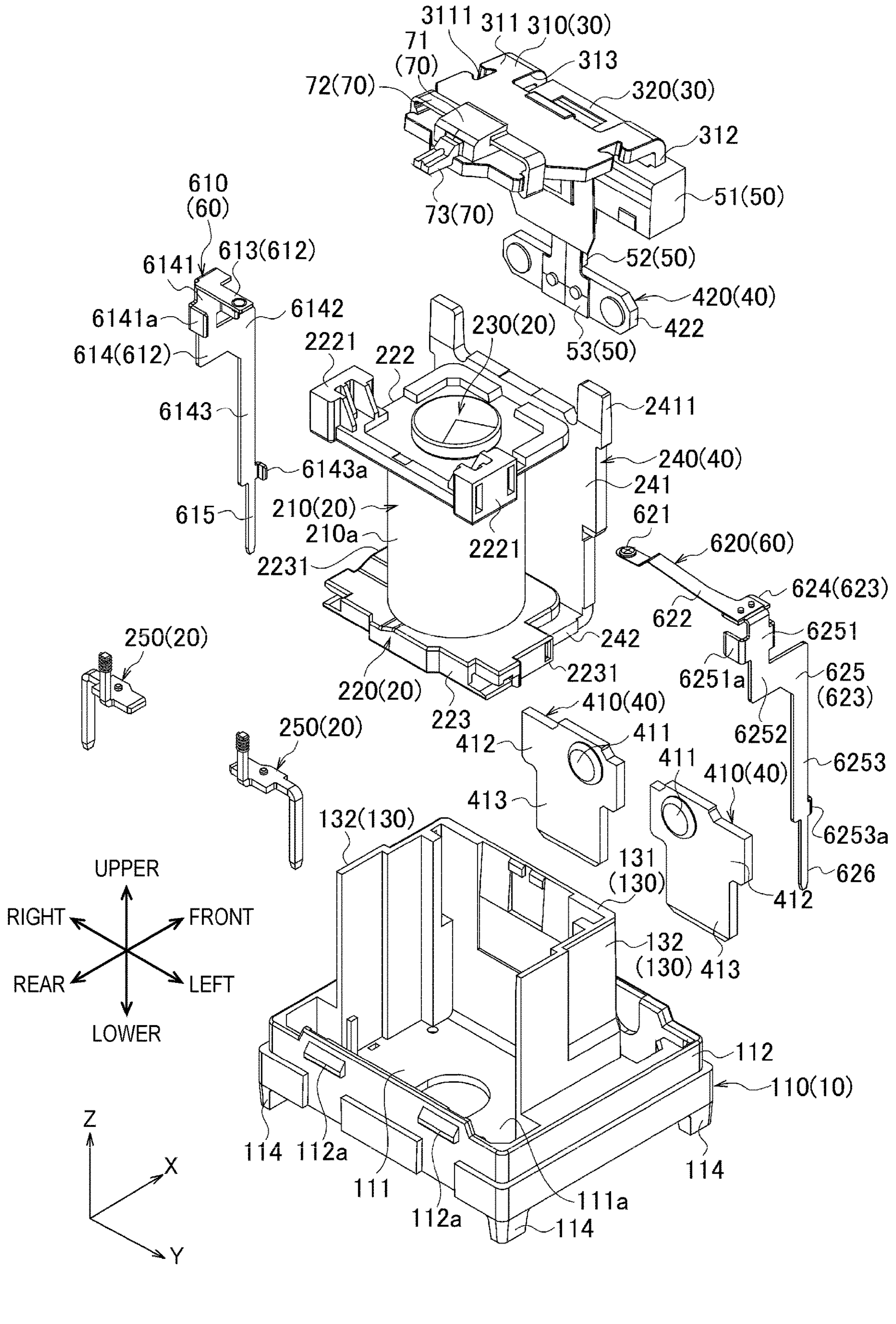
FIG. 6 is an exploded perspective view of members other than the cover of the electromagnetic relay according to the first exemplary embodiment as viewed from one direction.
Figure 7:
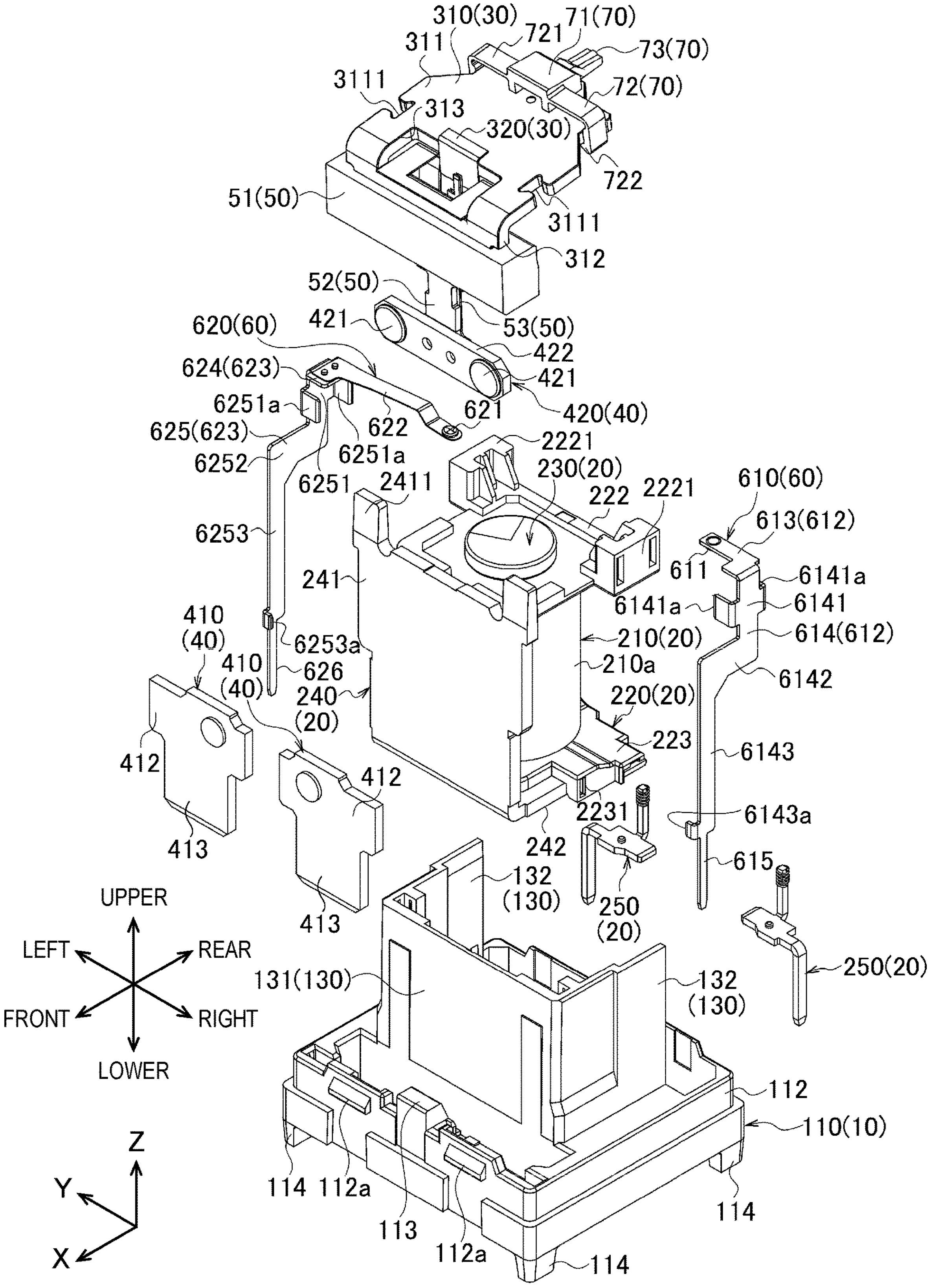
FIG. 7 is an exploded perspective view of members other than the cover of the electromagnetic relay according to the first exemplary embodiment as viewed from another direction.

In the present exemplary embodiment, main contact portion 40 includes only one set of main fixed contact portion 410 and the main moving contact portion 420 (having main contacts that come into contact with or separate from each other) forming a pair with each other (see FIGS. 6 and 7).

In the present exemplary embodiment, the set of main fixed contact portion 410 and main moving contact portion 420 having the main contacts that come into contact with or separate from each other includes the pair of main fixed contact portions 410 and one main moving contact portion 420.

Specifically, two main fixed contact portions 410 having a symmetrical shape with respect to the XZ plane are a pair of main fixed contact portions 410. Two main fixed contact portions 410 forming a pair are fixed to base 110 (housing 10) in a state of being separated in the Y direction (width direction: axial direction and direction intersecting the first direction: second direction).

Each of main fixed contact portions 410 includes main body 412 having one main fixed contact 411 (see FIGS. 6 and 7). In the present exemplary embodiment, a member to be a main fixed contact is inserted into insertion hole 412*a* formed in main body 412 so as to penetrate in the plate thickness direction, and riveting is performed, so that main body 412 has main fixed contact 411 (see FIGS. 14 and 15). As described above, in the present exemplary embodiment, main body 412 has a function as a fixed-side main contact holder that holds main fixed contact 411.

Main fixed contact 411 is not necessarily formed on main body 412 by rivet joining, and can be formed by various methods. For example, it is also possible to cause a portion protruding by performing dowel processing on main body 412 to function as a main fixed contact. Further, by bringing main moving contact 421 into contact with a part of the flat surface of main body 412, it is also possible to cause a part of the flat surface of main body 412 to function as the main fixed contact.

Further, main fixed contact portion 410 includes terminal portion 413 which is connected to a lower end of main body 412 and is fixed to base 110 (housing 10) in a state where a distal end (connection part) protrudes outward (downward) from base 110 (housing 10).

In the present exemplary embodiment, insertion hole 115 penetrating in the Z direction (vertical direction) is formed in base 110. Then, the distal end (connection part: lower end) of terminal portion 413 is inserted into insertion hole 115 from above. With such a configuration, main fixed contact portion 410 is fixed to base 110 (housing 10) in a state where the distal end (connection part: lower end) of terminal portion 413 protrudes outward (downward) from base 110 (see FIGS. 14 and 15). Main fixed contact portion 410 is fixed to base 110 (housing 10) with an adhesive or the like.

At this time, main fixed contact portion 410 is fixed to base 110 (housing 10) with main fixed contact 411 facing backward in the X direction (front-rear direction). That is, main fixed contact portion 410 is fixed to base 110 (housing 10) in a state where a surface of main body 412 on a side where main fixed contact 411 is formed (rear surface: surface on a side facing main moving contact 421) faces backward.

Note that main fixed contact 411, main body 412, and terminal portion 413 can be formed of, for example, a conductive material such as a silver-based material or a copper-based material.

As described above, in the present exemplary embodiment, two main fixed contacts 411 are disposed side by side in the Y direction that is the direction orthogonal (intersecting) to the direction in which main fixed contact 411 and main moving contact 421 relatively move. One of two main bodies 412 has one main fixed contact 411, and the other main body has other main fixed contact 411.

On the other hand, one main moving contact portion 420 includes one moving contactor 422, and one moving contactor 422 includes a pair of main moving contacts 421 arranged side by side in the Y direction (width direction) (see FIGS. 9 and 10).

In the present exemplary embodiment, a member to be a main moving contact is inserted into insertion hole 422*a* formed on both sides in the longitudinal direction of moving contactor 422 having a substantially rectangular plate shape so as to penetrate in the plate thickness direction, and riveting is performed. Thus, main moving contactor 422 includes main moving contact 421 (see FIGS. 14 and 15). As described above, in the present exemplary embodiment, moving contactor 422 has a function as a movable-side main contact holder that holds main moving contact 421.

Main moving contact 421 is not necessarily formed on moving contactor 422 by riveting, and can be formed by various methods. For example, it is also possible to cause a portion protruding by performing dowel processing on moving contactor 422 to function as a main moving contact. Further, by bringing a part of the flat surface of moving contactor 422 into contact with main fixed contact 411, it is also possible to cause a part of the flat surface of moving contactor 422 to function as the main moving contact.

One of main moving contact portions 420 is disposed so as to be located behind two main fixed contact portions 410 forming a pair in the X direction (front-rear direction) with the plate thickness direction substantially coinciding with the X direction (front-rear direction) and the longitudinal direction substantially coinciding with the Y direction (width direction). At this time, main moving contact portion 420 is disposed in a state where main moving contact 421 faces main fixed contact 411 in the X direction (front-rear direction). Specifically, moving contactor 422 is disposed such that main moving contact 421 formed on one side in the Y direction (width direction) faces main fixed contact 411 of main fixed contact portion 410 disposed on one side in the Y direction (width direction) in the X direction (front-rear direction). Similarly, moving contactor 422 is disposed such that main moving contact 421 formed on the other side in the Y direction (width direction) faces main fixed contact 411 of main fixed contact portion 410 disposed on the other side in the Y direction (width direction) in the X direction (front-rear direction). Thus, one main moving contact 421 comes into contact with or separates from one main fixed contact 411 of two main fixed contacts 411, and other main moving contact 421 comes into contact with or separates from other main fixed contact 411. One moving contactor 422 includes two main moving contacts 421.

Note that main moving contact 421 and moving contactor 422 can also be formed of, for example, a conductive material such as a silver-based material or a copper-based material.

A set including the pair of main fixed contact portions 410 and one main moving contact portion 420 having such a configuration is accommodated on the front side of first side wall 131 in the X direction (front-rear direction: first direction) in internal space S1 (see FIGS. 12 to 15).

Here, main moving contact portion 420 is disposed so as to be relatively swingable in the X direction (front-rear direction) with respect to the pair of main fixed contact portions 410.

In the present exemplary embodiment, main contact portion 40 is continuously connected to armature 310 via movable part 50. By swinging movable part 50 in the X direction (front-rear direction) along with the swinging of armature 310, main moving contact portion 420 swings in the X direction (front-rear direction) in conjunction with the operation of movable part 50. That is, by causing movable part 50 to hold main moving contact portion 420, main moving contact portion 420 swings relative to the pair of main fixed contact portions 410 in the X direction (front-rear direction).

As illustrated in FIGS. 9 and 10, in the present exemplary embodiment, movable part 50 includes holder part 51 which is formed of an insulating resin material and has an upper portion in which insertion hole 511 into which vertical wall 312 of armature 310 is inserted and held is formed. Movable part 50 includes movable plate 52 continuously connected to a lower portion of holder part 51, and movable spring 53 connecting movable plate 52 and moving contactor 422.

In the present exemplary embodiment, through-hole 521 penetrating in the plate thickness direction is formed in an upper portion of movable plate 52 in the Z direction (vertical direction). Then, in a state where the upper end of movable plate 52 is inserted into an insertion hole (not illustrated) formed at the lower end of holder part 51, a projection formed in the insertion hole (not illustrated) of holder part 51 is inserted into through-hole 521, so that movable plate 52 is held by holder part 51.

In addition, projection 522 protruding backward is formed at a central portion of movable plate 52 in the Z direction (vertical direction), and upper through-hole 531 penetrating in the plate thickness direction is formed at an upper portion of movable spring 53 in the Z direction (vertical direction). Projection 522 of movable plate 52 is inserted into upper through-hole 531 of movable spring 53, so that movable spring 53 is held by movable plate 52.

Further, lower through-hole 532 penetrating in the plate thickness direction is formed at a lower portion of movable spring 53 in the Z direction (vertical direction), and projection 422*b* protruding backward is formed at a central portion of moving contactor 422 in the Y direction (width direction). Projection 422*b* of moving contactor 422 is inserted into lower through-hole 532 of movable spring 53 so that movable spring 53 holds moving contactor 422.

In this way, main contact portion 40 is continuously connected to armature 310 via movable part 50.

With such a configuration, main moving contact portion 420 swings relative to the pair of main fixed contact portions 410 in the X direction (front-rear direction) as armature 310 swings. Therefore, main moving contact 421 swings so as to draw an arc around the upper end of vertical wall 312.

Further, in the present exemplary embodiment, auxiliary contact portion 60 is disposed in internal space S1 of housing 10 separately from main contact portion 40. Auxiliary contact portion 60 is disposed in internal space S1 in a state in which the auxiliary contacts (auxiliary fixed contact 611 and auxiliary moving contact 621) exist at positions on the rear side in the X direction (front-rear direction) and on the upper end side of coil 210.

Auxiliary contact portion 60 includes auxiliary fixed contact portion 610 and auxiliary moving contact portion 620, and auxiliary fixed contact portion 610 includes auxiliary fixed contact 611 and terminal portion 612 having auxiliary fixed contact 611. On the other hand, auxiliary moving contact portion 620 includes auxiliary moving contact 621 that moves relative to auxiliary fixed contact 611 and can come into contact with or separate from auxiliary fixed contact 611, auxiliary moving terminal portion 622 having auxiliary moving contact 621, and terminal portion 623 connected to auxiliary moving terminal portion 622. The movable member of auxiliary moving terminal portion 622 is formed of a leaf spring.

In the present exemplary embodiment, auxiliary contact portion 60 includes only one set of auxiliary fixed contact portion 610 and auxiliary moving contact portion 620 (having auxiliary contacts that come into contact with or separate from each other) forming a pair with each other (see FIGS. 6 and 7).

In the present exemplary embodiment, the set of auxiliary fixed contact portion 610 and auxiliary moving contact portion 620 having the auxiliary contacts that come into contact with or separate from each other includes one auxiliary fixed contact portion 610 and one auxiliary moving contact portion 620. One auxiliary fixed contact 611 is formed in one auxiliary fixed contact portion 610, and only one auxiliary moving contact 621 that comes into contact with or separates from one auxiliary fixed contact 611 is formed in one auxiliary moving contact portion 620.

Figure 11:
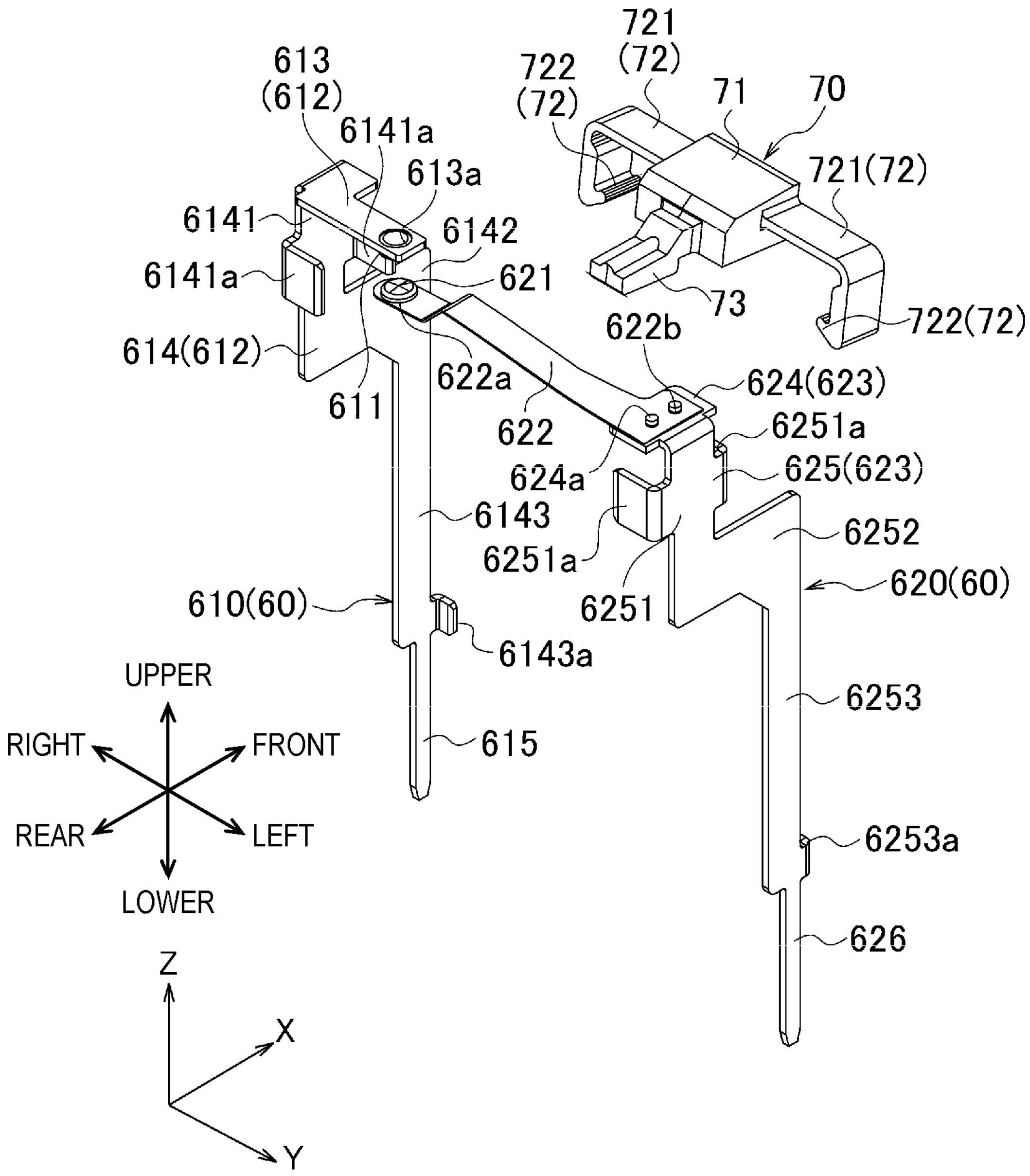
FIG. 11 is an exploded perspective view of an auxiliary contact portion included in the electromagnetic relay according to the first exemplary embodiment as viewed from one direction.

In the present exemplary embodiment, as described above, auxiliary fixed contact portion 610 includes terminal portion 612 having one auxiliary fixed contact 611, and terminal portion 612 includes horizontal piece 613 extending in the horizontal direction and elongated in the Y direction (width direction). Auxiliary fixed contact 611 is formed on horizontal piece 613. In the present exemplary embodiment, a member to be an auxiliary fixed contact is inserted into insertion hole 613*a* formed in horizontal piece 613 so as to penetrate in the plate thickness direction, and riveting is performed, so that horizontal piece 613 has auxiliary fixed contact 611 (see FIG. 11). As described above, in the present exemplary embodiment, horizontal piece 613 has a function as a fixed-side auxiliary contact holder that holds auxiliary fixed contact 611.

Auxiliary fixed contact 611 is not necessarily formed on horizontal piece 613 by riveting, and can be formed by various methods. For example, it is also possible to cause a portion protruding by performing dowel processing on horizontal piece 613 to function as an auxiliary fixed contact. In addition, by bringing auxiliary fixed contact 611 into contact with a part of the flat surface of horizontal piece 613, it is also possible to cause a part of the flat surface of horizontal piece 613 to function as an auxiliary fixed contact. A plurality of auxiliary fixed contacts 611 may be provided on horizontal piece 613 (terminal portion 612).

In addition, terminal portion 612 includes side piece portion 614 that is continuously connected to an outer end of horizontal piece 613 in the Y direction (width direction), extends along the XZ plane, and is elongated in the Z direction (vertical direction).

In the present exemplary embodiment, side piece portion 614 includes first side piece portion 6141 continuously connected to an outer end of horizontal piece 613 in the Y direction (width direction), and coupling part 6142 extending forward in the X direction (front-rear direction) from a lower end of first side piece portion 6141. Side piece portion 614 further includes second side piece portion 6143 extending downward in the Z direction (vertical direction) from a front end lower portion of coupling part 6142. As described above, in the present exemplary embodiment, side piece portion 614 has a shape bent into a crank shape when viewed from the Y direction (width direction).

In the present exemplary embodiment, auxiliary fixed contact portion 610 is held by coil bobbin 220.

Specifically, press-fitting pieces 6141*a* protruding inward in the Y direction (width direction) are provided at both ends in the X direction (front-rear direction) of first side piece portion 6141. The pair of press-fitting pieces 6141*a* is press-fitted into the pair of press-fitting openings 2221*a* of upper auxiliary contact retainer 2221 formed in upper flange portion 222.

Press-fitting piece 6143*a* protruding inward in the Y direction (width direction) is provided at the lower end of second side piece portion 6143 on the front end side in the X direction (front-rear direction). Then, press-fitting piece 6143*a* is press-fitted into press-fitting opening 2231*a* of lower auxiliary contact retainer 2231 formed in lower flange portion 223.

In this manner, the pair of press-fitting pieces 6141*a* is press-fitted into the pair of press-fitting openings 2221*a*, and press-fitting piece 6143*a* is press-fitted into press-fitting opening 2231*a*, so that auxiliary fixed contact portion 610 is held by coil bobbin 220.

Auxiliary fixed contact portion 610 includes connection part 615 extending downward from the lower end of second side piece portion 6143. Connection part 615 is formed so as to protrude outward (downward) from base 110 in a state where side piece portion 614 is held by coil bobbin 220 arranged on base 110.

In the present exemplary embodiment, auxiliary fixed contact portion 610 is held by coil bobbin 220 with auxiliary fixed contact 611 facing downward in the Z direction (vertical direction). That is, auxiliary fixed contact portion 610 is held by coil bobbin 220 in a state where the surface of horizontal piece 613 on the side where auxiliary fixed contact 611 is formed (lower surface: surface facing auxiliary moving contact 621) faces downward.

In addition, auxiliary fixed contact 611, terminal portion 612, and connection part 615 can be formed of, for example, a conductive material such as a silver-based material or a copper-based material.

On the other hand, auxiliary moving contact portion 620 includes auxiliary moving terminal portion 622, and auxiliary moving terminal portion 622 includes a leaf spring extending in the horizontal direction and elongated in the Y direction (width direction). Auxiliary moving terminal portion 622 includes auxiliary moving contact 621.

In the present exemplary embodiment, auxiliary moving terminal portion 622 has a shape bent in a crank shape such that the distal end (end on the inner side in the Y direction) is located downward. A member to serve as the auxiliary moving contact is inserted into insertion hole 622*a* formed at the distal end of auxiliary moving terminal portion 622 so as to penetrate in the plate thickness direction, and riveting is performed to allow auxiliary moving terminal portion 622 to include auxiliary moving contact 621 (see FIG. 11). As described above, in the present exemplary embodiment, auxiliary moving terminal portion 622 has a function as a movable-side auxiliary contact holder that holds auxiliary moving contact 621.

The formation of auxiliary moving contact 621 on auxiliary moving terminal portion 622 does not need to be performed by riveting, and can be performed by various methods. For exameple, it is also possible to cause a portion protruding by performing dowel processing on auxiliary moving terminal portion 622 to function as an auxiliary moving contact. Further, by bringing auxiliary moving contact 621 into contact with a part of the flat surface of auxiliary moving terminal portion 622, a part of the flat surface of auxiliary moving terminal portion 622 can function as the auxiliary moving contact. A plurality of auxiliary moving contacts 621 may be provided in auxiliary moving terminal portion 622.

Further, terminal portion 623 is continuously provided at an outer end of auxiliary moving terminal portion 622 in the Y direction (width direction). Terminal portion 623 includes horizontal piece 624 extending in the horizontal direction and elongated in the Y direction (width direction), and auxiliary moving terminal portion 622 is connected to horizontal piece 624. Specifically, a pair of insertion holes 622*b* is formed at an outer end of auxiliary moving terminal portion 622 in the Y direction (width direction) so as to be aligned in the X direction (front-rear direction), and a pair of projections 624*a* is formed on horizontal piece 624 so as to be aligned in the X direction (front-rear direction). Auxiliary moving terminal portion 622 is connected to horizontal piece 624 by riveting in a state where the pair of projections 624*a* are respectively inserted into the pair of insertion holes 622*b*.

In addition, terminal portion 623 includes side piece portion 625 which is connected to an outer end of horizontal piece 624 in the Y direction (width direction), extends along the XZ plane, and is elongated in the Z direction (vertical direction).

In the present exemplary embodiment, side piece portion 625 includes first side piece portion 6251 connected to an outer end of horizontal piece 624 in the Y direction (width direction), and coupling part 6252 extending forward in the X direction (front-rear direction) from a lower end of first side piece portion 6251. Side piece portion 625 further includes second side piece portion 6253 extending downward in the Z direction (vertical direction) from a front end lower portion of coupling part 6252. As described above, in the present exemplary embodiment, side piece portion 625 also has a shape bent into a crank shape as viewed in the Y direction (width direction).

Further, in the present exemplary embodiment, auxiliary moving contact portion 620 is held by coil bobbin 220.

Specifically, press-fitting pieces 6251*a* protruding inward in the Y direction (width direction) are provided at both ends in the X direction (front-rear direction) of first side piece portion 6251. The pair of press-fitting pieces 6251*a* are press-fitted into the pair of press-fitting openings 2221*a* of upper auxiliary contact retainer 2221 formed in upper flange portion 222.

Press-fitting piece 6253*a* protruding inward in the Y direction (width direction) is provided at the lower end of second side piece portion 6253 on the front end side in the X direction (front-rear direction). Then, press-fitting piece 6253*a* is press-fitted into press-fitting opening 2231*a* of lower auxiliary contact retainer 2231 formed in lower flange portion 223.

In this manner, the pair of press-fitting pieces 6251*a* is press-fitted into the pair of press-fitting openings 2221*a*, and press-fitting piece 6253*a* is press-fitted into press-fitting opening 2231*a*, so that auxiliary moving contact portion 620 is held by coil bobbin 220.

Auxiliary moving contact portion 620 includes connection part 626 extending downward from the lower end of second side piece portion 6253. Connection part 626 is formed so as to protrude outward (downward) from base 110 in a state where side piece portion 625 is held by coil bobbin 220 arranged on base 110.

In the present exemplary embodiment, auxiliary moving contact portion 620 is held by coil bobbin 220 with auxiliary moving contact 621 facing upward in the Z direction (vertical direction). That is, auxiliary moving contact portion 620 is held by coil bobbin 220 in a state where a surface of auxiliary moving terminal portion 622 on a side where auxiliary moving contact 621 is formed (upper surface: surface facing auxiliary fixed contact 611) faces upward.

In addition, auxiliary moving contact 621, auxiliary moving terminal portion 622, terminal portion 623, and the connection part 626 can be formed of, for example, a conductive material such as a silver-based material or a copper-based material.

A set including one auxiliary fixed contact portion 610 and one auxiliary moving contact portion 620 having such a configuration is accommodated behind first side wall 131 in the X direction (front-rear direction: first direction) and on the upper end side of coil 210 in internal space S1 (see FIGS. 12 to 15). Auxiliary fixed contact 611 and auxiliary moving contact 621 are disposed above head 232 of iron core 230 in the Z direction (vertical direction).

Here, auxiliary moving contact portion 620 is disposed so that auxiliary moving terminal portion 622 can swing relative to auxiliary fixed contact portion 610 in the Z direction (vertical direction). In the present exemplary embodiment, auxiliary moving terminal portion 622 can be relatively swung in the Z direction (vertical direction) with respect to auxiliary fixed contact portion 610 by auxiliary drive unit 70. That is, by switching the driving state of electromagnetic device 20 and swinging auxiliary drive unit 70, conduction and non-conduction between auxiliary fixed contact portion 610 and auxiliary moving contact portion 620 paired with each other (having auxiliary contacts that come into contact with or separate from each other) can be switched.

In the present exemplary embodiment, auxiliary drive unit 70 is made of an insulating resin material and is held by horizontal wall 311 of armature 310. Auxiliary drive unit 70 is swung in the Z direction (vertical direction) along with the swinging of armature 310. In this way, auxiliary moving terminal portion 622 is swung in the Z direction (vertical direction) along with the swinging of auxiliary drive unit 70 in the Z direction (vertical direction).

Auxiliary drive unit 70 includes main body 71 and fixed part 72 which is continuously provided so as to protrude outward in the Y direction (width direction) from main body 71 and is held by horizontal wall 311 of armature 310. Further, auxiliary drive unit 70 includes push-up part 73 that is continuously provided so as to protrude from main body 71 toward the rear side in the X direction (front-rear direction) and pushes up auxiliary moving terminal portion 622.

In the present exemplary embodiment, fixed part 72 includes arm portion 721 that protrudes outward in the Y direction (width direction), and hook portion 722 that is continuously provided downward in the Z direction (vertical direction) from an outer end in the Y direction (width direction) of arm portion 721.

Held part 3112 which holds auxiliary drive unit 70 is formed on a rear portion of horizontal wall 311 of armature 310 in the X direction (front-rear direction). By hooking a pair of hook portions 72 on the held part 3112, auxiliary drive unit 70 is held by horizontal wall 311 of armature 310.

As described above, in the present exemplary embodiment, by swinging auxiliary drive unit 70 in conjunction with the swinging of armature 310, conduction and non-conduction between auxiliary fixed contact portion 610 and auxiliary moving contact portion 620 having the auxiliary contact that comes into contact with or separates from each other can be switched. That is, main contact portion 40 is brought into and out of contact with one end of armature 310, and auxiliary contact portion 60 comes into contact with or separates from the other end of armature 310.

With such a configuration, auxiliary moving contact portion 620 swings relative to auxiliary fixed contact portion 610 in the Z direction (vertical direction) as armature 310 swings. At this time, auxiliary moving contact 621 swings so as to draw an arc around the outer end in the Y direction (width direction) of auxiliary moving terminal portion 622.

In the present exemplary embodiment, auxiliary moving terminal portion 622 is connected to terminal portion 623 held by coil bobbin 220 in a state where auxiliary moving contact 621 is separated from auxiliary fixed contact 611 in the natural state. In the state where the energization to coil 210 is stopped, push-up part 73 of auxiliary drive unit 70 is pushed up by coming into contact with auxiliary moving terminal portion 622, and auxiliary moving contact 621 comes into contact with auxiliary fixed contact 611.

On the other hand, in a state where coil 210 is energized, the rear end side of horizontal wall 311 of armature 310 rotates downward, and auxiliary drive unit 70 moves downward as the rear end side of horizontal wall 311 rotates downward. When auxiliary drive unit 70 moves downward, auxiliary moving terminal portion 622 moves downward by the elastic restoring force, and auxiliary moving contact 621 is separated from auxiliary fixed contact 611.

Alternatively, auxiliary drive unit 70 may drive auxiliary moving terminal 622 using another method. As another method of driving the auxiliary moving terminal 622 by auxiliary drive unit 70, for example, there is a method in which, when auxiliary drive unit 70 is separated from auxiliary moving terminal 622, auxiliary moving contact 621 is brought into contact with auxiliary fixed contact 611 by the elastic restoring force of auxiliary moving terminal portion 622 to be in the conductive state, and auxiliary moving contact 621 is separated from auxiliary fixed contact 611 to be in the non-conductive state by auxiliary drive unit 70 pushing down auxiliary moving terminal 622.

As described above, in the present exemplary embodiment, auxiliary contact portion 60 is provided such that the on state and the off state are opposite to main contact portion 40.

Next, an example of the operation of electromagnetic relay 1 having the above-described configuration will be described.

First, in a state where coil 210 is not energized, horizontal wall 311 of armature 310 is moved in a direction away from head 232 of iron core 230 by the elastic force of hinge spring 320. At this time, since vertical wall 312 of armature 310 is located behind in the X direction (front-rear direction), movable part 50 is also located behind in the X direction (front-rear direction). That is, main moving contact portion 420 held by movable part 50 is separated from main fixed contact portion 410, and main moving contact 421 is separated from main fixed contact 411 (see FIGS. 12 and 14).

Figure 12:
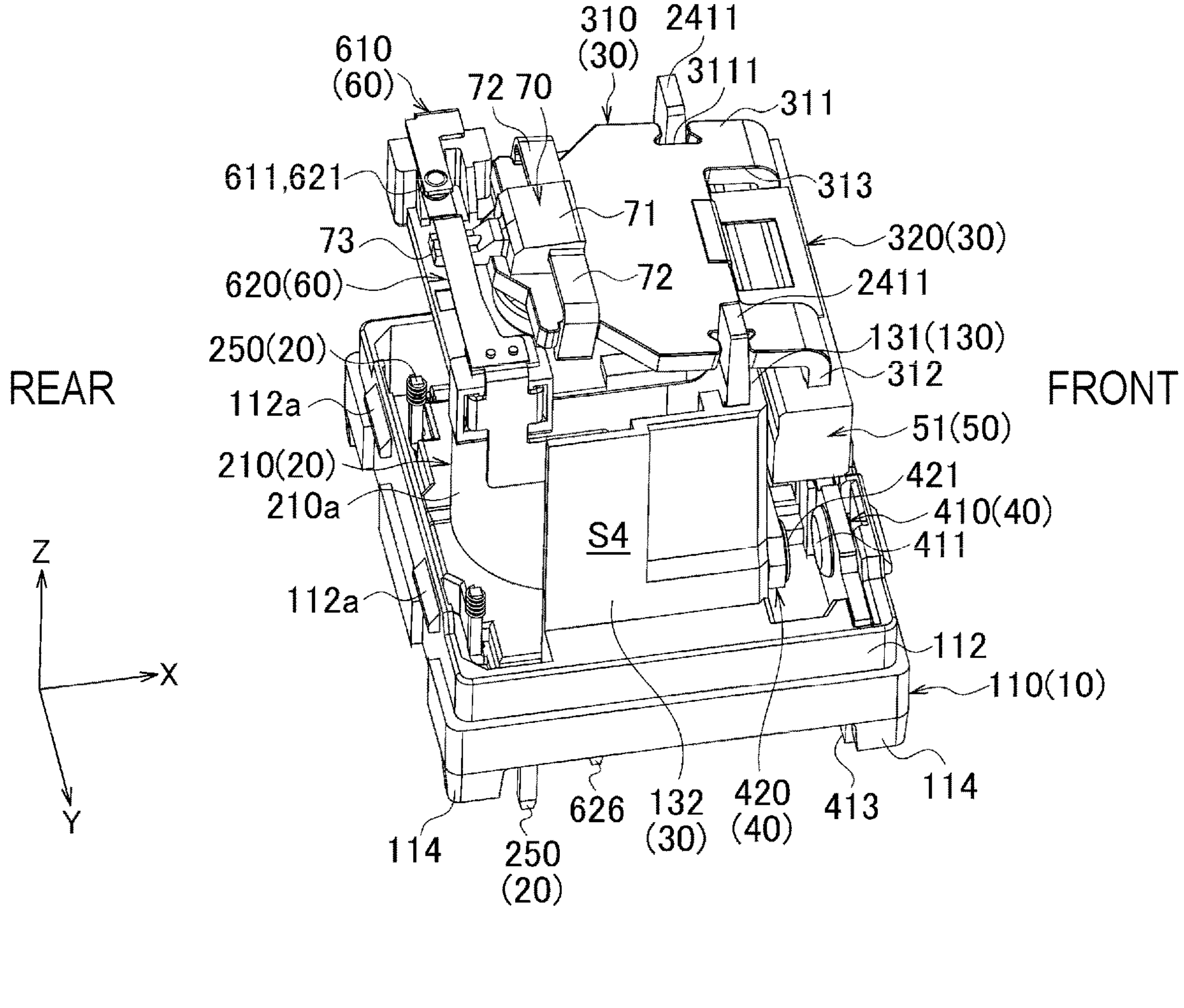
FIG. 12 is a view illustrating contact or separation between the main contact portion and the auxiliary contact portion according to the first exemplary embodiment, and is a perspective view illustrating a state in which the main contact portion and the auxiliary contact portion are at a second position.
Figure 13:
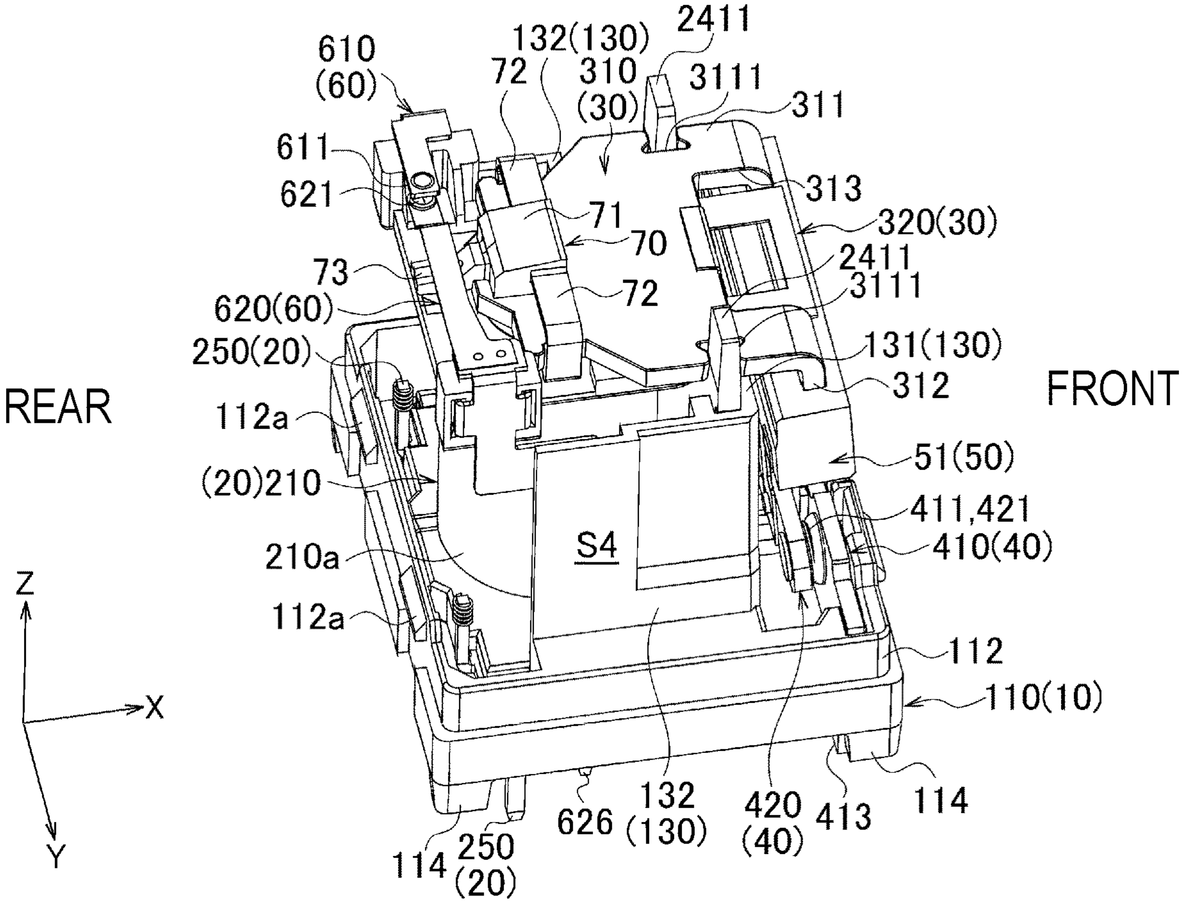
FIG. 13 is a view illustrating contact or separation between the main contact portion and the auxiliary contact portion according to the first exemplary embodiment, and is a perspective view illustrating a state in which the main contact portion and the auxiliary contact portion are at a first position.
Figure 14:
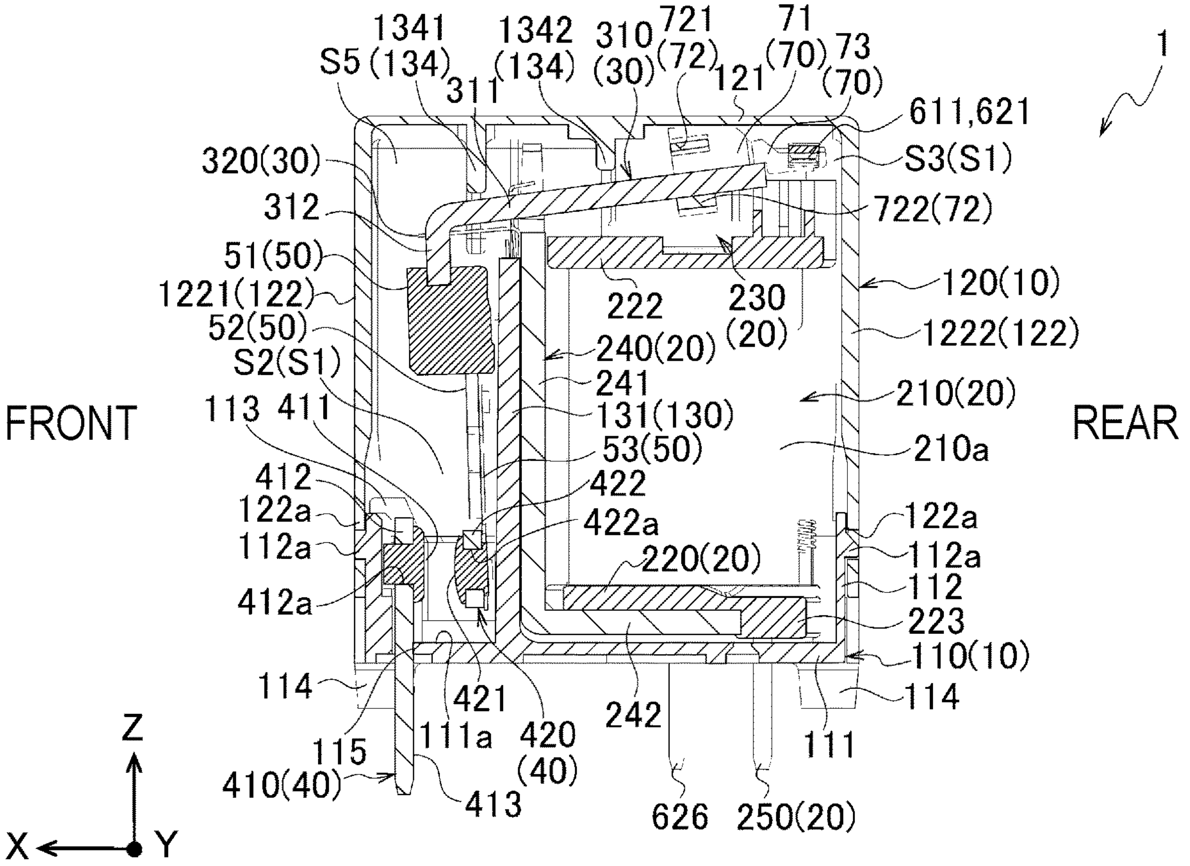
FIG. 14 is a view illustrating the contact or separation between the main contact portion and the auxiliary contact portion according to the first exemplary embodiment, and is a vertical cross-sectional view illustrating a state in which the main contact portion and the auxiliary contact portion are at a second position.

On the other hand, since auxiliary drive unit 70 also moves in the direction away from head 232 of iron core 230, auxiliary moving terminal portion 622 is pushed up by push-up part 73 of auxiliary drive unit 70, and auxiliary moving contact 621 comes into contact with auxiliary fixed contact 611 (see FIGS. 12 and 14).

When coil 210 is energized from the off state, horizontal wall 311 of armature 310 is attracted downward (toward iron core 230) by the electromagnetic force, and approaches head 232 of iron core 230 against the elastic force of hinge spring 320. Then, vertical wall 312 rotates forward as horizontal wall 311 rotates downward (toward iron core 230), and movable part 50 rotates forward as vertical wall 312 rotates forward. Consequently, moving contactor 422 held by movable part 50 rotates forward toward main fixed contact portion 410, and main moving contact 421 of moving contactor 422 comes into contact with main fixed contact 411 of main fixed contact portion 410. Thus, the pair of main fixed contact portions 410 is electrically connected by main moving contact portion 420 (see FIGS. 13 and 15).

On the other hand, since auxiliary drive unit 70 also moves in the direction approaching head 232 of iron core 230, push-up part 73 of auxiliary drive unit 70 is lowered, and auxiliary moving contact 621 is separated from auxiliary fixed contact 611. Accordingly, the electrical connection between auxiliary fixed contact portion 610 and auxiliary moving contact portion 620 is released (see FIGS. 13 and 15).

Then, when the energization to coil 210 is stopped in this state, horizontal wall 311 of armature 310 rotates upward (the side away from iron core 230) by the biasing force of hinge spring 320 and returns to the initial position. In addition, vertical wall 312 rotates backward as horizontal wall 311 rotates upward, and movable part 50 rotates backward as vertical wall 312 rotates backward. As a result, moving contactor 422 held by movable part 50 rotates backward so as to be separated from main fixed contact portion 410, and main moving contact 421 of moving contactor 422 is separated from main fixed contact 411 of main fixed contact portion 410. In this way, the electrical connection between the pair of main fixed contact portions 410 is released.

On the other hand, since auxiliary drive unit 70 also moves in a direction away from head 232 of iron core 230, auxiliary moving terminal portion 622 is pushed up by push-up part 73 of auxiliary drive unit 70 and returns to the initial position. As a result, auxiliary moving contact 621 comes into contact with auxiliary fixed contact 611, and auxiliary fixed contact portion 610 and auxiliary moving contact portion 620 are electrically connected.

As described above, in the present exemplary embodiment, when armature 310 is at the initial position, main moving contact 421 and main fixed contact 411 are separated from each other, and auxiliary moving contact 621 and auxiliary fixed contact 611 are at the second position in contact with each other (see FIGS. 12 and 14). On the other hand, when armature 310 is at the abutment position, main moving contact 421 and main fixed contact 411 are in contact with each other, and auxiliary moving contact 621 and auxiliary fixed contact 611 are at the first position to be separated from each other (see FIGS. 13 and 15).

Therefore, while coil 210 is not energized, the pair of main fixed contact portions 410 are insulated from each other, and while coil 210 is energized, the pair of main fixed contact portions 410 are electrically connected to each other. As described above, in the present exemplary embodiment, main moving contact 421 is configured to be able to relatively reciprocate (turn) in the first direction (X direction: front-rear direction) with respect to main fixed contact 411 between the first position and the second position.

On the other hand, auxiliary fixed contact portion 610 and auxiliary moving contact portion 620 are insulated while coil 210 is not energized, and auxiliary fixed contact portion 610 and auxiliary moving contact portion 620 are electrically connected while coil 210 is energized. As described above, in the present exemplary embodiment, auxiliary moving contact 621 is configured to be able to reciprocate (turn) relatively in the axial direction (Z direction: vertical direction) with respect to auxiliary fixed contact 611 between the first position and the second position.

Here, when energization to coil 210 is stopped in a state where main moving contact 421 and main fixed contact 411 are located at the first position where the main moving contact and the main fixed contact are in contact with each other, opening of main moving contact 421 to separate from main fixed contact 411 is started.

When the opening is started, an arc is generated between main moving contact 421 and main fixed contact 411 in the initial stage of the opening, and the current conduction state is continued by the arc.

Therefore, by extending the arc generated between main moving contact 421 and main fixed contact 411 backward in the X direction (front-rear direction), the arc generated between main moving contact 421 and main fixed contact 411 is extinguished more reliably and more quickly.

At this time, the arc generated between main moving contact 421 and main fixed contact 411 is extended in the space formed between second side wall 132 and side wall 1223 of case 120. Therefore, in the present exemplary embodiment, a space formed between second side wall 132 and side wall 1223 of case 120 is arc extension space S4 for extending an arc (see FIG. 5).

If the arc generated between main moving contact 421 and main fixed contact 411 is extended backward in the X direction (front-rear direction), electromagnetic relay 1 can be downsized. However, when the arc is extended backward in the X direction (front-rear direction), consumable powder or the like may be scattered backward in the X direction (front-rear direction) together with the extended arc. At this time, if the main contact side space (first space) S2 in which main contact portion 40 is disposed and auxiliary contact side space (second space) S3 in which auxiliary contact portion 60 is disposed in internal space S1 of housing 10 communicate with each other through a large passage, auxiliary contact portion 60 may be affected by the consumable powder or the like.

As described above, when main contact side space S2 in which main contact portion 40 is disposed and auxiliary contact side space S3 in which auxiliary contact portion 60 is disposed are completely communicated with each other, auxiliary contact portion 60 may be affected by consumable powder or the like. In particular, in an electromagnetic relay through which a large current flows, auxiliary contact portion 60 is greatly affected by consumable powder or the like.

Therefore, in the present exemplary embodiment, even when the current flowing through main contact portion 40 is large, it is possible to more reliably prevent the contact reliability of auxiliary contact portion 60 from deteriorating. Specifically, partition wall 130 is formed which divides internal space S1 into main contact side space S2 where main contact portion 40 exists and auxiliary contact side space S3 where auxiliary contact portion 60 exists. That is, main contact side space S2 and auxiliary contact side space S3 of internal space S1 can be defined by the continuous portion of partition wall 130.

By providing partition wall 130, main contact side space S2 in which main contact portion 40 is disposed and auxiliary contact side space S3 in which auxiliary contact portion 60 is disposed can communicate with each other through a narrower gap. That is, by providing partition wall 130, it is possible to prevent main contact side space S2 and auxiliary contact side space S3 from communicating with each other through a relatively wide gap as much as possible. In this way, it is possible to more reliably prevent the consumable powder or the like generated in main contact portion 40 from entering auxiliary contact side space S3 where auxiliary contact portion 60 exists.

In the present exemplary embodiment, partition wall 130 includes first side wall 131 that is continuously connected to base 110 so as to extend along the Z direction (vertical direction: axial direction) on the front side of coil 210 in the X direction (front-rear direction) (one side in the first direction intersecting the axial direction).

Partition wall 130 includes a pair of second side walls 132 disposed on both sides in the Y direction (width direction: a second direction intersecting with the axial direction of the coil and the first direction) and continuously connected to base 110 so as to extend along the Z direction (vertical direction: axial direction).

As described above, in the present exemplary embodiment, first side wall 131 and the pair of second side walls 132 for supporting yoke 240 also function as partition wall 130 that divides into main contact side space S2 where main contact portion 40 exists and auxiliary contact side space S3 where auxiliary contact portion 60 exists.

First side wall 131 is continuously connected to base 110 such that main contact portion 40 and movable part 50 are located on the front side in the X direction (front-rear direction) and auxiliary contact portion 60 and coil 210 are located on the rear side in the X direction (front-rear direction) (the other side in the first direction intersecting the axial direction).

At least a part of side surface 210*a* of coil 210 is surrounded by first side wall 131 and the pair of second side walls 132.

Figure 16:
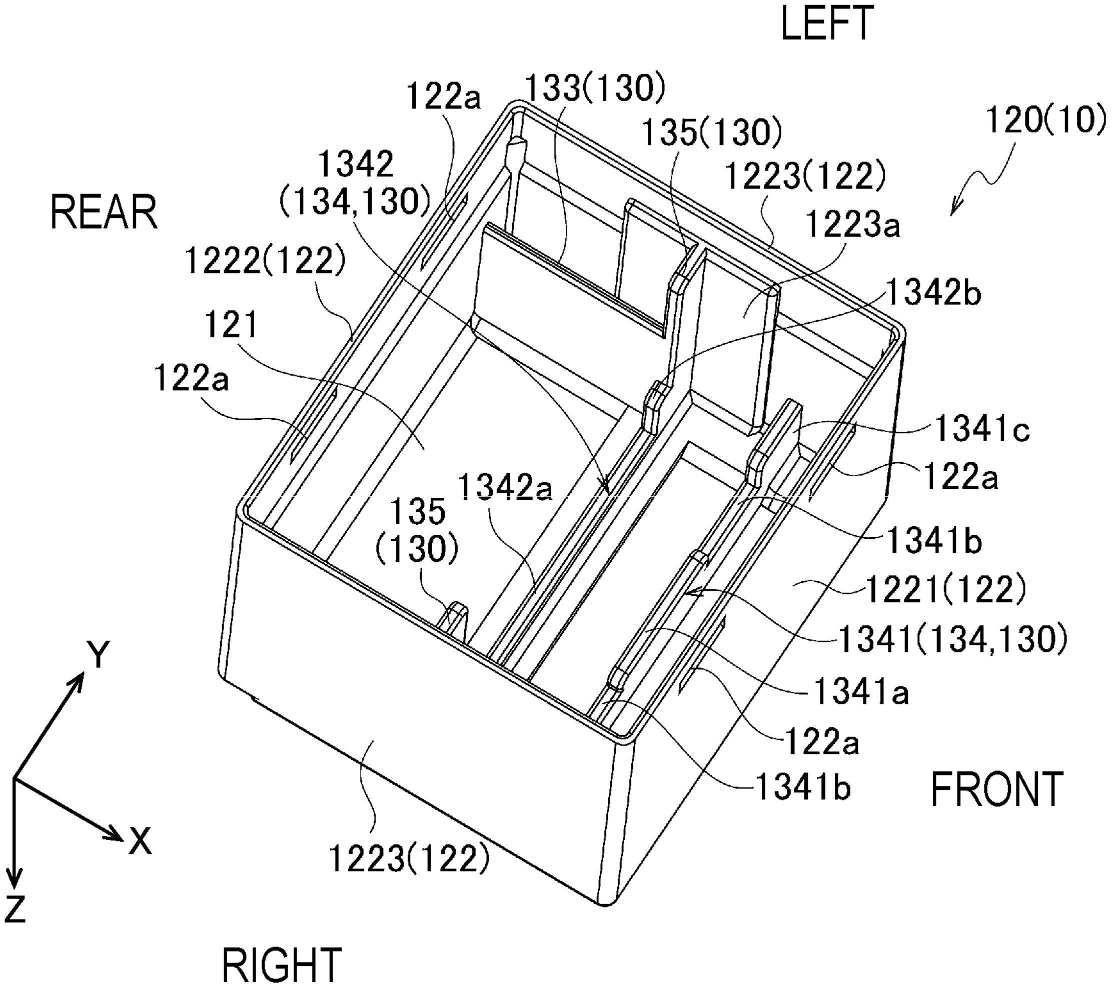
FIG. 16 is a perspective view illustrating the inside of the cover according to the first exemplary embodiment.
Figure 17:
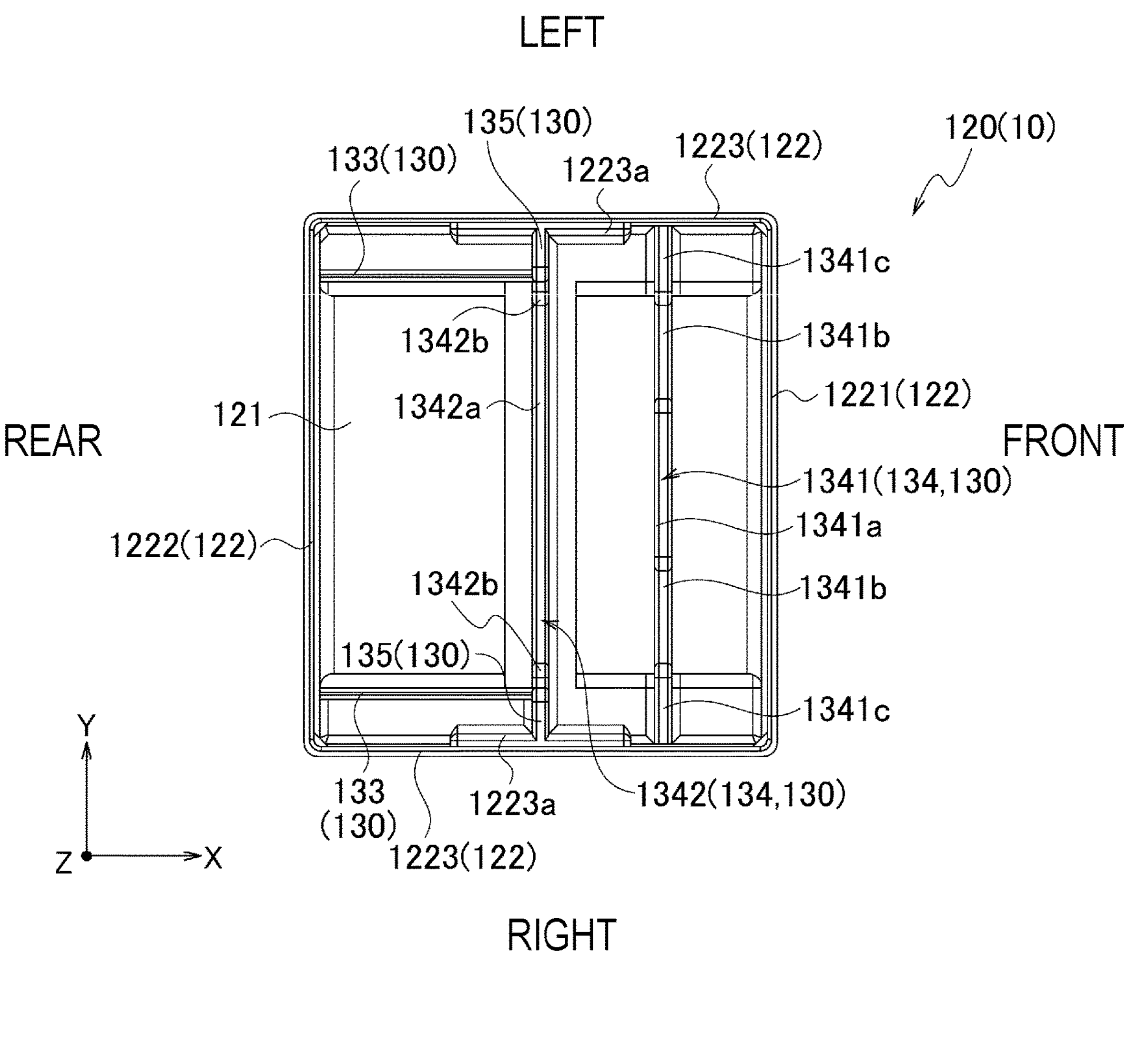
FIG. 17 is a rear view illustrating the cover according to the first exemplary embodiment.

Further, in the present exemplary embodiment, partition wall 130 includes a pair of third side walls 133 disposed side by side in the Y direction (width direction: second direction)

and provided along the Z direction (vertical direction: axial direction) and along second side wall 132 (see FIGS. 16 and 17).

In the present exemplary embodiment, third side wall 133 is formed inside case 120. Specifically, third side wall 133 extends from the inner surface of top wall 121 along the X direction (front-rear direction: first direction) and the Z direction (vertical direction: axial direction). Third side wall 133 is formed such that the rear end in the X direction (front-rear direction: first direction) is in contact with the inner surface of rear wall 1222.

Figure 19:
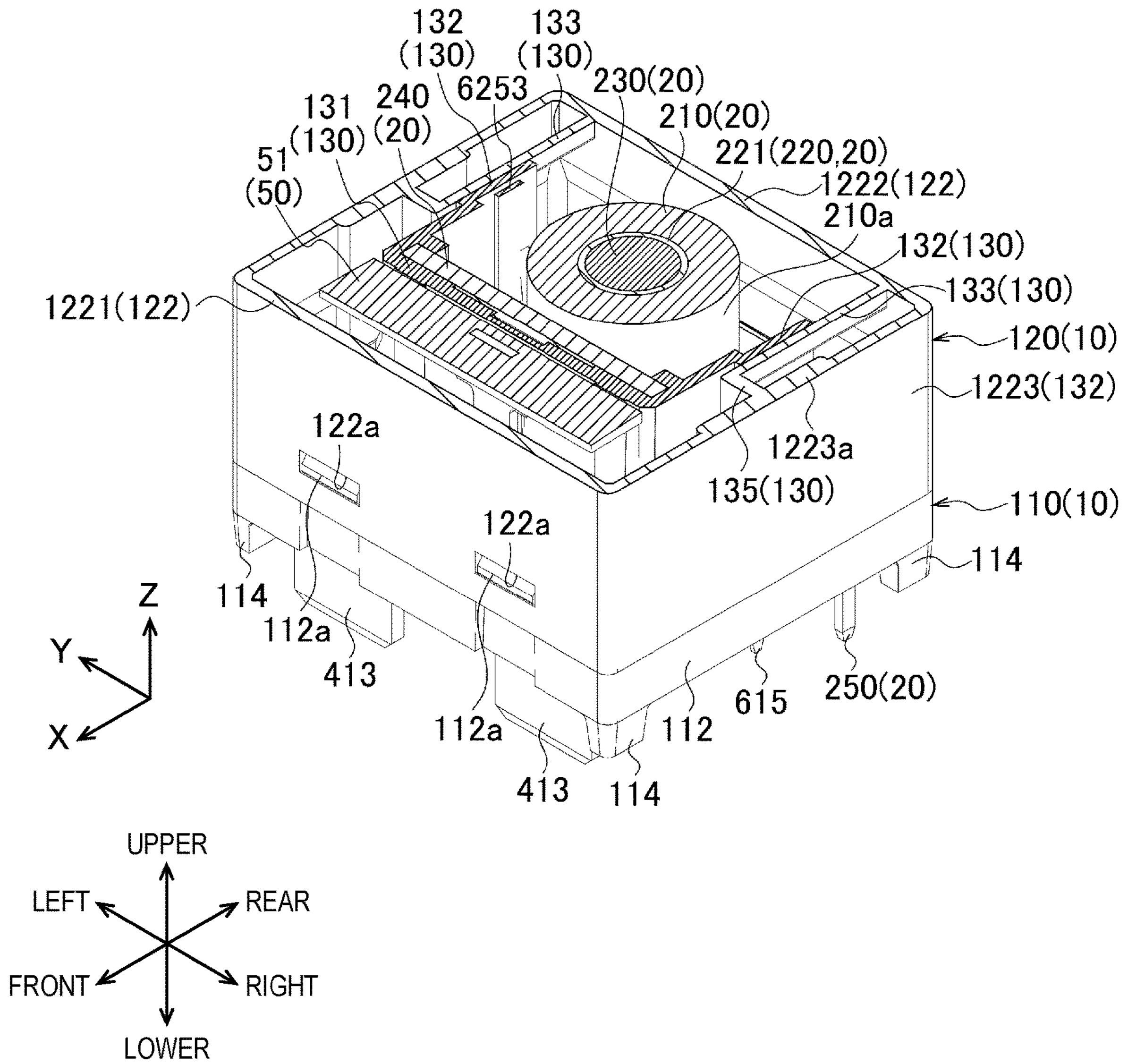
FIG. 19 is a view illustrating the electromagnetic relay according to the first exemplary embodiment, and is a perspective view illustrating a state in which a center in a vertical direction of the electromagnetic relay is cut by a horizontal plane.
Figure 20:
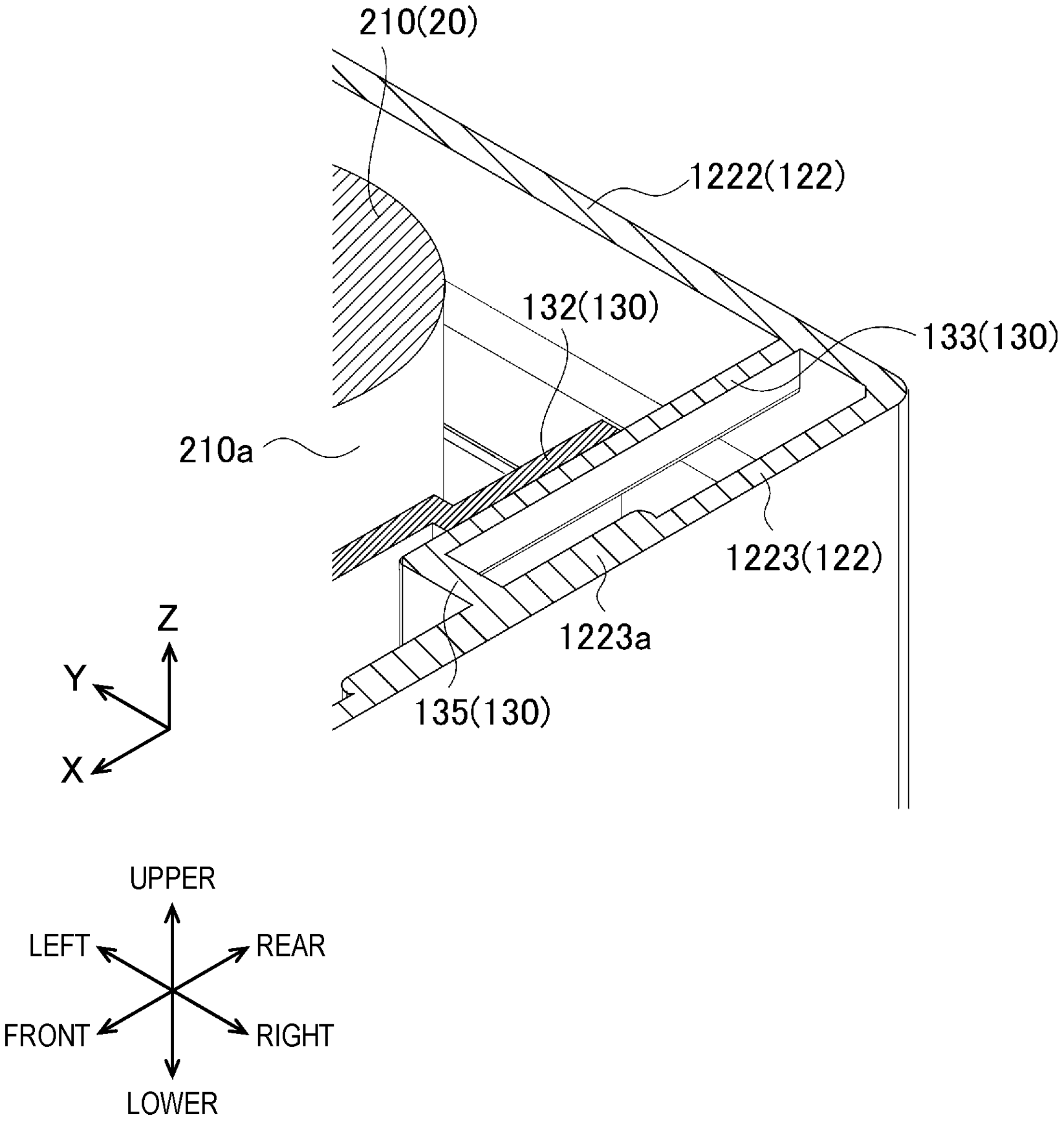
FIG. 20 is an enlarged perspective view of a part of FIG. 19.

With case 120 attached to base 110, the lower end of third side wall 133 is disposed outside second side wall 132 in the Y direction (width direction: second direction). At this time, a gap is hardly formed between the lower end of third side wall 133 and second side wall 132 (see FIGS. 18 to 20).

As described above, in the present exemplary embodiment, third side wall 133 is provided on case 120 so as to overlap second side wall 132 as viewed in the Y direction (width direction: second direction).

Here, main contact side space S2 includes internal space S1 facing a front side surface of first side wall 131 in the X direction, internal space S1 facing an outer side surface of the pair of second side walls 132 in the Y direction, and internal space S1 facing an outer side surface of third side wall 133 in the Y direction. On the other hand, auxiliary contact side space S3 includes internal space S1 facing the side surface on the rear side in the X direction of first side wall 131, internal space S1 facing the inner side surface in the Y direction of the pair of second side walls 132, and internal space S1 facing the inner side surface in the Y direction of third side wall 133. In the portion where second side wall 132 and third side wall 133 overlap, internal space S1 facing the outer side surface in the Y direction of one of second side wall 132 and third side wall 133 is main contact side space S2, and internal space S1 facing the inner side surface in the Y direction of the other is auxiliary contact side space S3.

Figure 18:
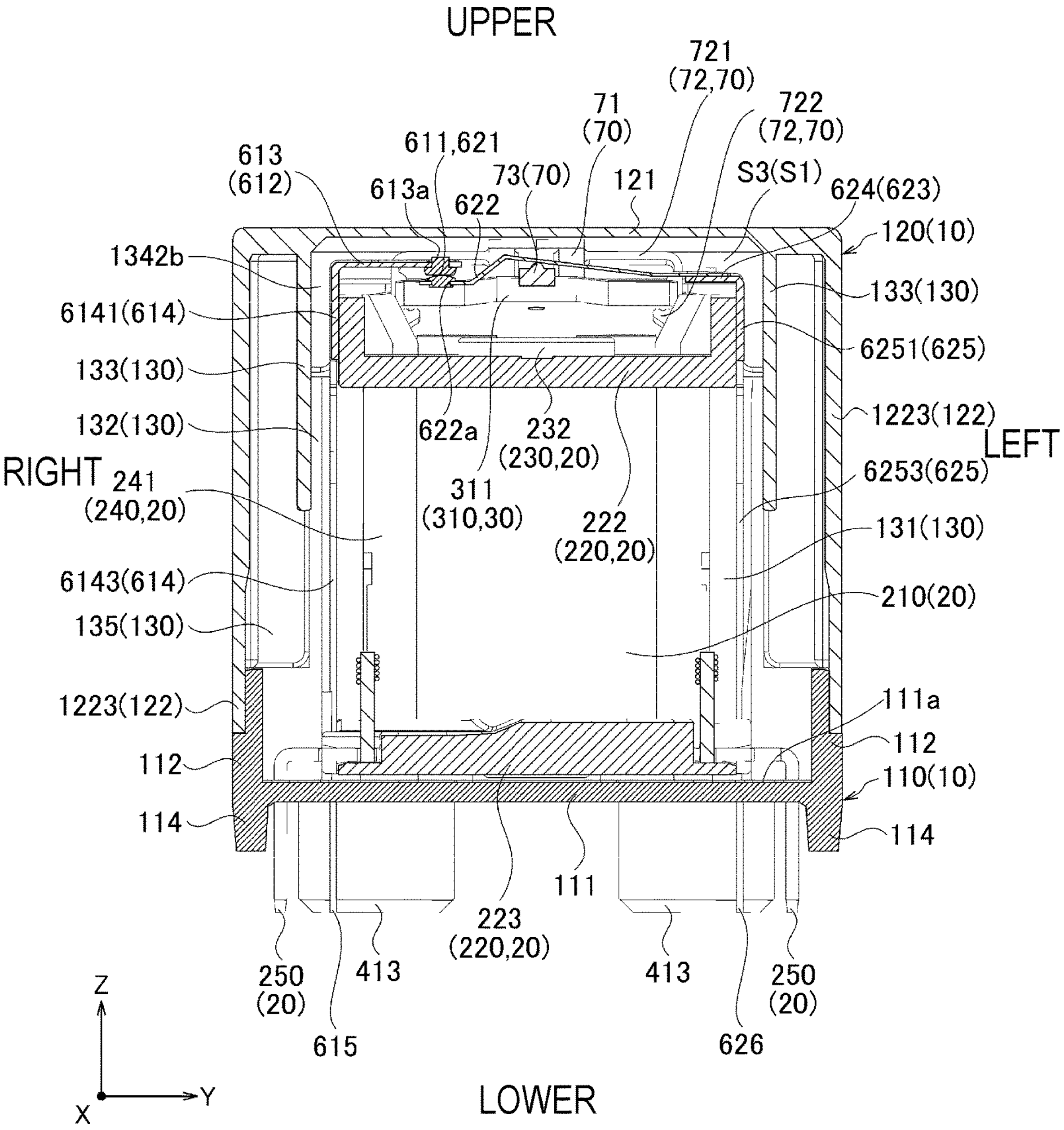
FIG. 18 is a view illustrating the electromagnetic relay according to the first exemplary embodiment, and is a cross-sectional view illustrating a state in which a position where the auxiliary contact of the electromagnetic relay exists is cut by a vertical plane extending in the horizontal direction.
Figure 21:
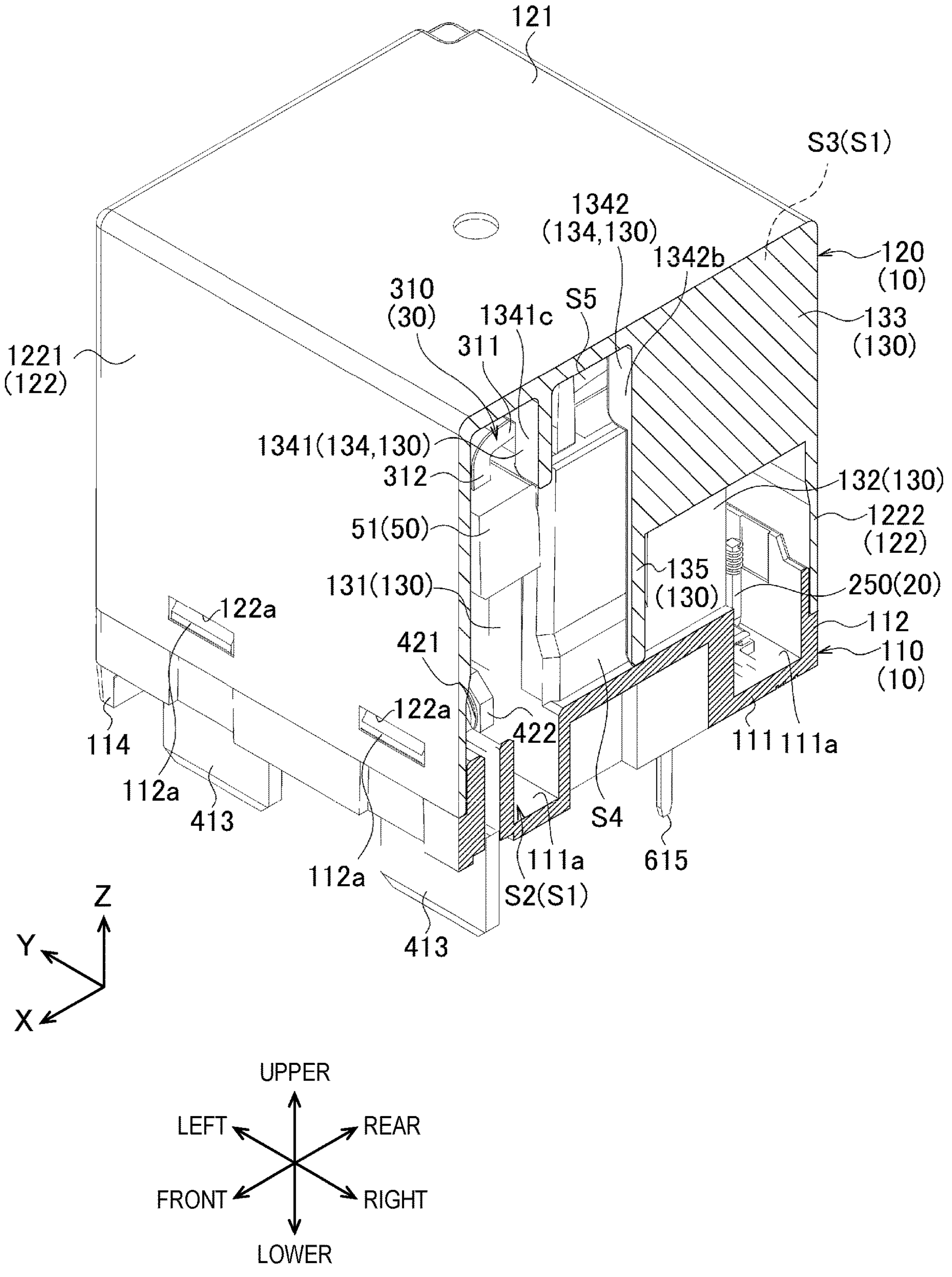
FIG. 21 is a view illustrating the electromagnetic relay according to the first exemplary embodiment, and is a perspective view illustrating a state in which a position where a third side wall of the electromagnetic relay exists is cut by a vertical plane extending in the front-rear direction.

Further, the pair of third side walls 133 is provided at the same height as the contact peripheral portion of auxiliary contact portion 60 in the Z direction (vertical direction: axial direction) with the bottom surface 111*a* of base 110 as a reference in a state where base 110 is located below case 120 (see FIGS. 18 and 21). That is, the pair of third side walls 133 overlaps at least a part of the contact peripheral portion of auxiliary contact portion 60 when viewed from the direction orthogonal to the Z direction. In the present exemplary embodiment, the contact peripheral portion includes auxiliary fixed contact 611, terminal portion 612 (upper end of horizontal piece 613 and side piece portion 614) around auxiliary fixed contact 611, auxiliary moving contact 621 and auxiliary moving terminal portion 622 movable within the movable range of auxiliary moving terminal portion 622, horizontal piece 624, and the upper end of side piece portion 625.

The contact peripheral portion of auxiliary contact portion 60 is located at the upper end of auxiliary contact portion 60. The pair of third side walls 133 is provided at the same height as at least one of auxiliary fixed contact 611 and auxiliary moving contact 621 in the Z direction with reference to bottom surface 111*a* of base 110. Note that the pair of third side walls 133 may be provided higher than head 232 of iron core 230 in the Z direction with respect to bottom surface 111*a* of base 110.

In the present exemplary embodiment, when viewed from the Y direction (width direction: second direction), the entire auxiliary moving terminal portion 622 provided with auxiliary moving contact 621 and entire horizontal piece 613 provided with auxiliary fixed contact 611 (terminal portion 612 around auxiliary fixed contact 611) overlap third side wall 133. That is, the contact peripheral portion (entire auxiliary moving terminal portion 622 provided with auxiliary moving contact 621 and entire horizontal piece 613 provided with auxiliary fixed contact 611) of auxiliary contact portion 60 is disposed between a pair of third side walls 133 in the Y direction (width direction: second direction).

In this way, arc extension space S4 and auxiliary contact side space S3 of main contact side space S2 are divided by third side wall 133. Third side wall 133 more reliably prevents the consumable powder or the like generated in main contact portion 40 from entering auxiliary contact side space S3 through arc extension space S4.

In the present exemplary embodiment, main contact side space S2 is located above main contact portion 40 and has a substantially L-shaped space when viewed from the Y direction (width direction: second direction). This space is armature arrangement space S5 in which armature 310 is disposed (see FIGS. 14 and 15). Since armature 310 is disposed in armature arrangement space S5 in a state of being allowed to swing, a relatively large gap is formed between armature 310 and case 120 in armature arrangement space S5. Therefore, there is a possibility that armature 310 is displaced at the time of swinging, or consumable powder or the like generated in main contact portion 40 enters auxiliary contact side space S3 through a relatively large gap formed between armature 310 and case 120.

Therefore, in the present exemplary embodiment, partition wall 130 includes fourth side wall 134 provided on case 120 so as to protrude downward in the Z direction (vertical direction: axial direction) in a state where base 110 is positioned below case 120. Fourth side wall 134 extends in the Y direction (width direction: second direction) and faces armature 310 in the Z direction (vertical direction: axial direction) (see FIGS. 14 and 15).

Further, in the present exemplary embodiment, fourth side wall 134 includes pressing wall 1341 which is disposed on the front side (main contact portion 40 side) in the X direction (front-rear direction: first direction) with respect to vertical wall (upright portion) 241 of yoke 240, and is capable of pressing armature 310.

Pressing wall 1341 includes protrusion 1341*a* formed at the central portion in the Y direction (width direction: second direction) and a pair of recesses 1341*b* formed at both ends in the Y direction (width direction: second direction) of protrusion 1341*a* (see FIGS. 16 and 17). Further, pressing wall 1341 includes a pair of pressing wall extended portions 1341*c* formed on the outer sides of the pair of recesses 1341*b* in the Y direction (width direction: second direction). The pair of pressing wall extended portions 1341*c* is formed such that the outside in the Y direction (width direction: second direction) is in contact with the inner surface of side wall 1223.

Figure 22:
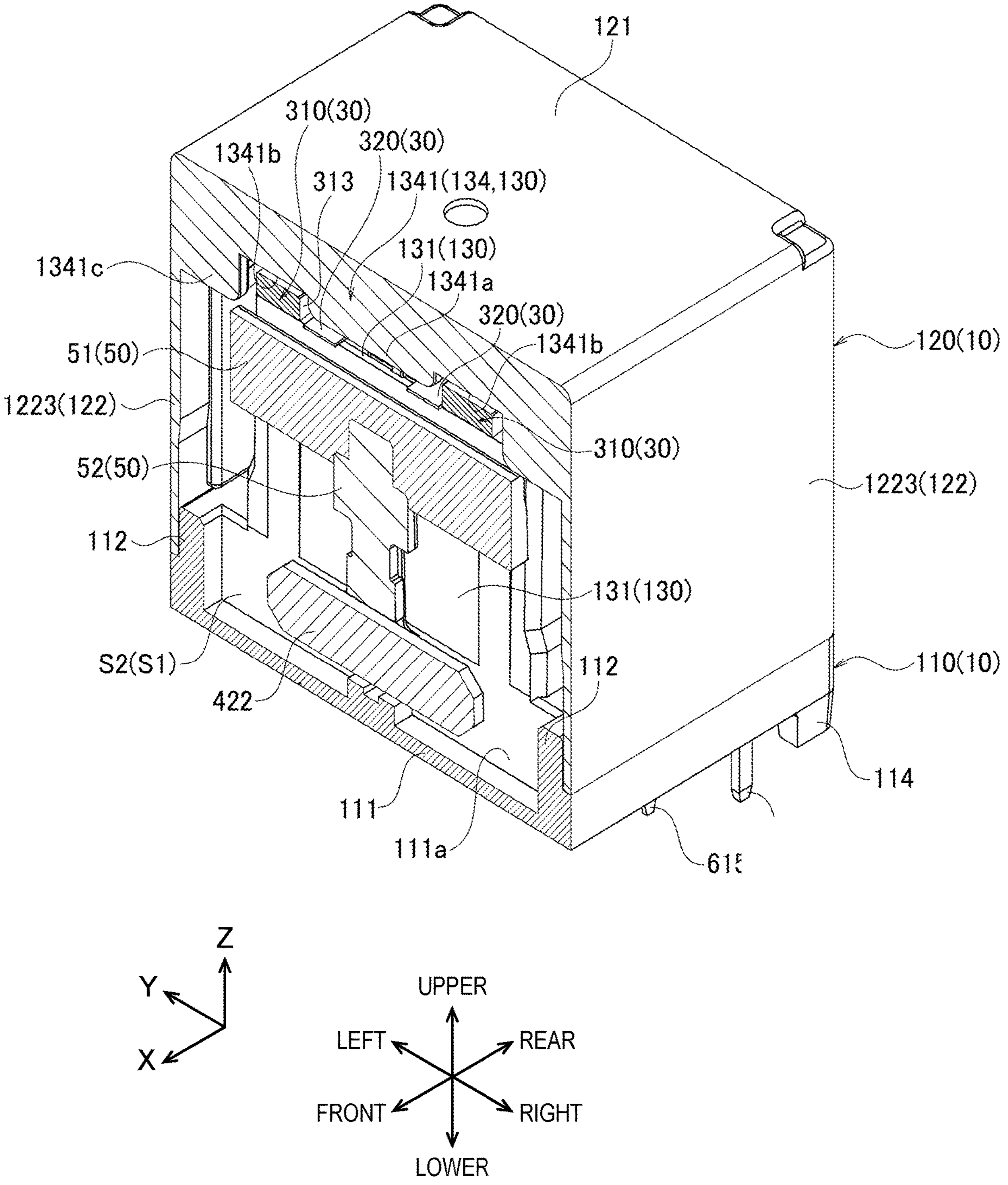
FIG. 22 is a view illustrating the electromagnetic relay according to the first exemplary embodiment, and is a perspective view illustrating a state in which the position where the pressing wall of the electromagnetic relay exists is cut by a vertical plane extending in the left-right direction.
Figure 23:
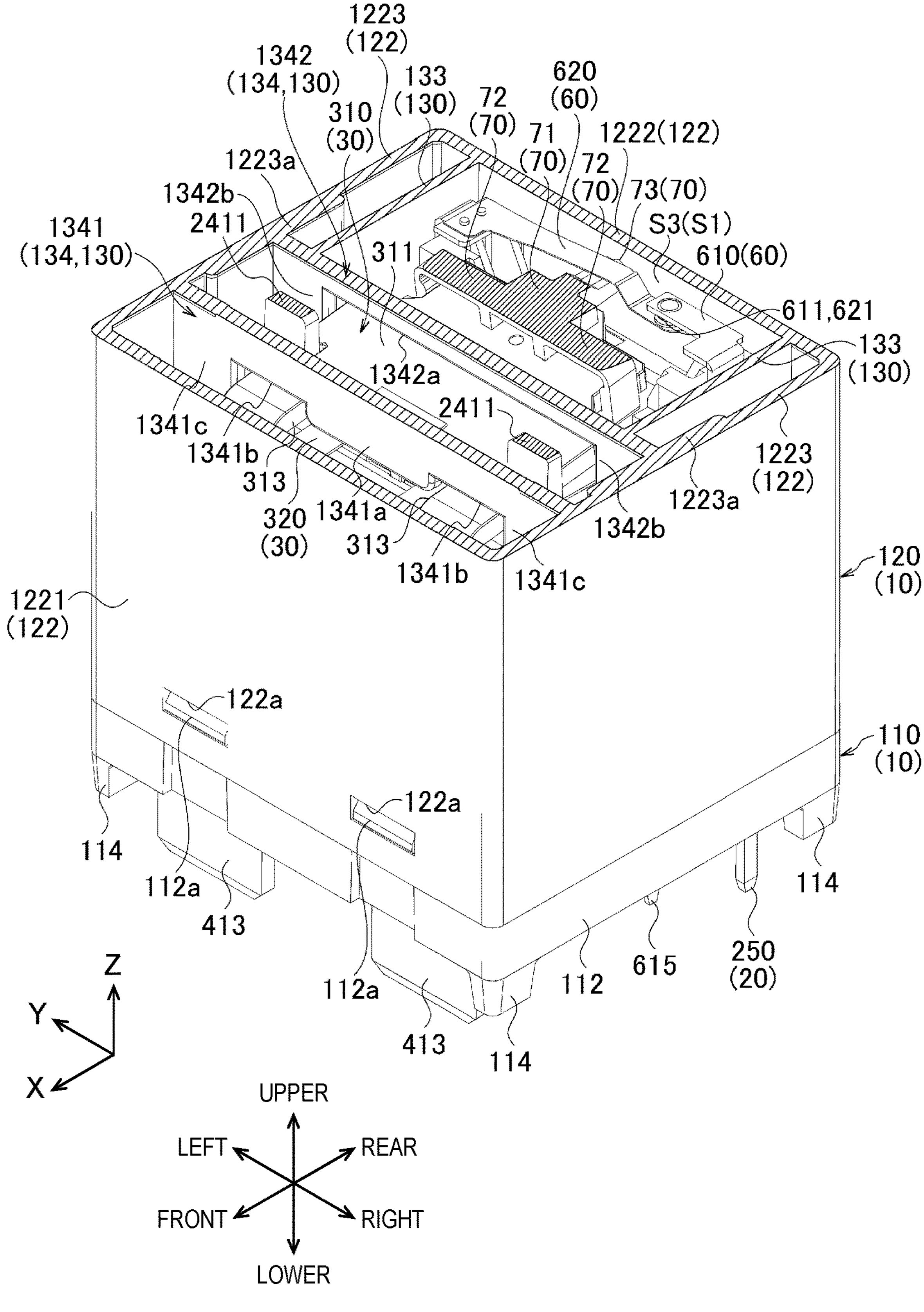
FIG. 23 is a view illustrating the electromagnetic relay according to the first exemplary embodiment, and is a perspective view illustrating a state in which a position where the auxiliary drive unit of the electromagnetic relay exists is cut by a horizontal plane.
Figure 24:
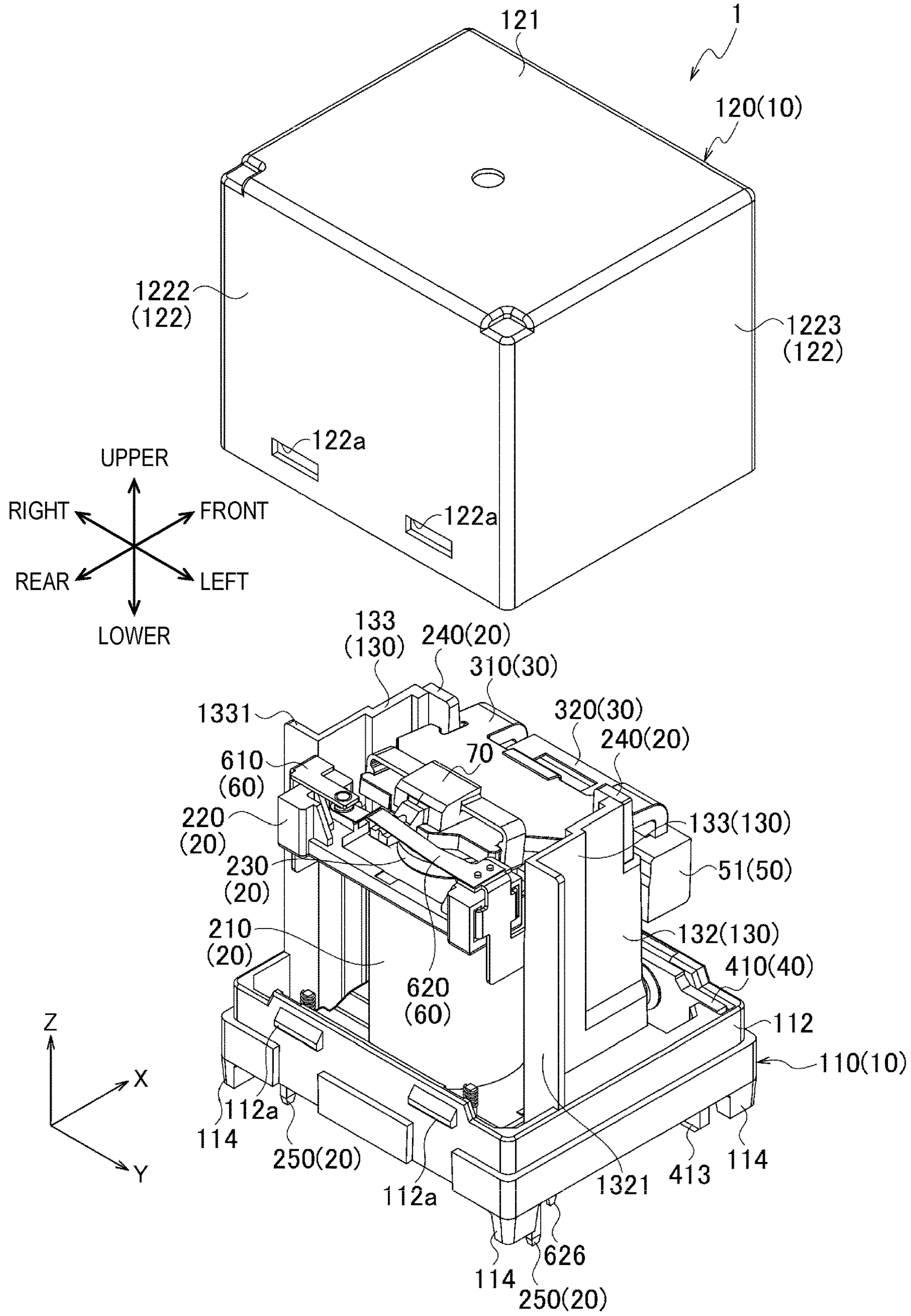
FIG. 24 is an exploded perspective view of a state in which a cover of the electromagnetic relay according to a second exemplary embodiment is removed as viewed from one direction.
Figure 25:
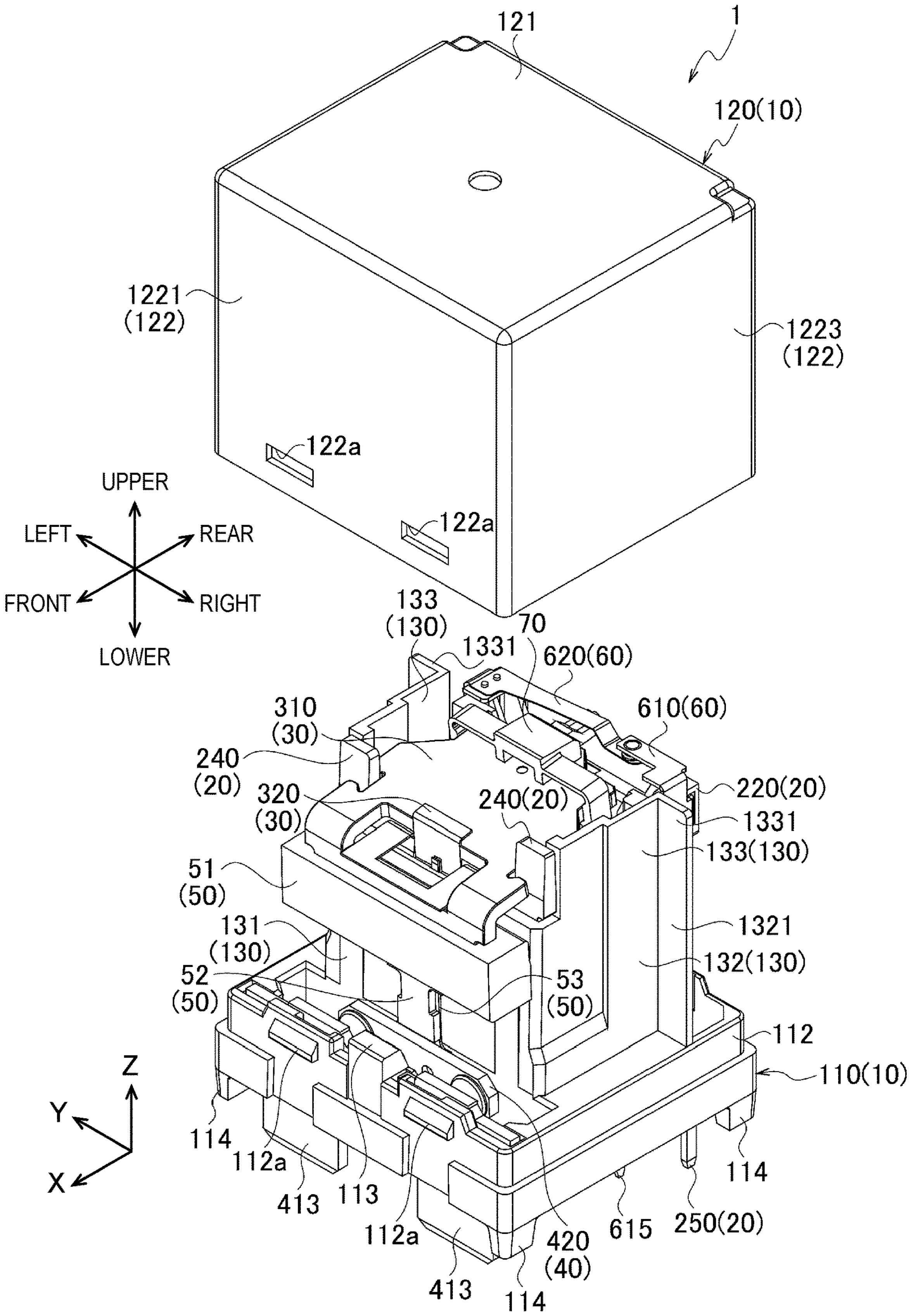
FIG. 25 is an exploded perspective view of a state in which the cover of the electromagnetic relay according to the second exemplary embodiment is removed as viewed from another direction.

With case 120 attached to base 110, the lower end of protrusion 1341*a* is inserted into through-hole 313 formed in armature 310 (see FIGS. 22 and 23). In addition, in a state where case 120 is attached to base 110, the pair of recesses 1341*b* faces both sides of through-hole 313 of armature 310 in the Y direction (width direction: second direction) in the Z direction (vertical direction: axial direction). Further, in a state where case 120 is attached to base 110, armature 310 is disposed between the pair of pressing wall extended portions 1341*c* in the Y direction (width direction: second direction).

By providing pressing wall 1341 having such a shape in case 120, position deviation of armature 310 at the time of swinging is suppressed. In addition, since armature arrangement space S5 is divided in the X direction (front-rear direction: first direction) by pressing wall 1341, the consumable powder and the like generated in main contact portion 40 can be more reliably suppressed from entering auxiliary contact side space S3 by pressing wall 1341.

Further, fourth side wall 134 is disposed behind (on auxiliary contact portion 60 side) the vertical wall (upright portion) 241 of yoke 240 in the X direction (front-rear direction: first direction), and has partition wall 1342 capable of dividing space S5 above armature 310.

Main contact side space S2 includes internal space S1 facing the side surface on the front side in the X direction of fourth side wall 134 (pressing wall 1341, partition wall 1342). On the other hand, auxiliary contact side space S3 includes internal space S1 facing the side surface on the rear side in the X direction of fourth side wall 134 (pressing wall 1341, partition wall 1342).

Partition wall 1342 includes recess **1342*a* formed at the central portion in the Y direction (width direction: second direction) and a pair of partition wall extended portions 1342*b* formed at both ends in the Y direction (width direction: second direction) of recess 1342*a* (see FIGS. 16 and 17). The pair of partition wall extended portions 1342*b* is formed such that the outside in the Y direction (width direction: second direction) is continuously connected to the front end of third side wall 133**.

Figure 15:
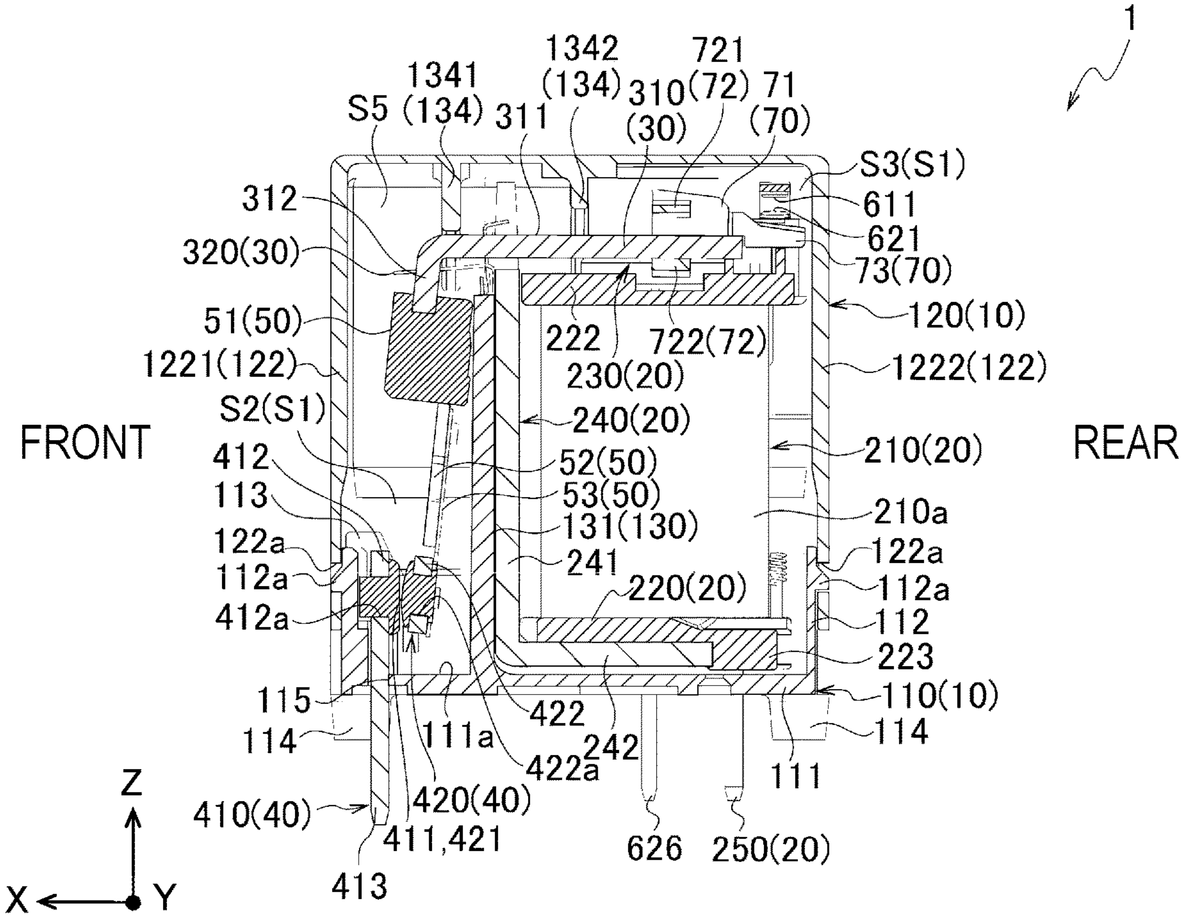
FIG. 15 is a view illustrating the contact or separation between the main contact portion and the auxiliary contact portion according to the first exemplary embodiment, and is a vertical cross-sectional view illustrating a state in which the main contact portion and the auxiliary contact portion are at the first position.

In a state where case 120 is attached to base 110, the lower end of recess **1342*a* faces armature 310 (the upper surface of water wall 311) in the Z direction (vertical direction: axial direction) (see FIGS. 14 and 15). Further, in a state where case 120 is attached to base 110, armature 310 is disposed between the pair of partition wall extended portions 1342*b*** in the Y direction (width direction: second direction).

As described above, in the present exemplary embodiment, partition wall 1342 has partition wall extended portions **1342*b* disposed on both sides of armature 310 in the Y direction (width direction: second direction). In the present exemplary embodiment, partition wall extended portion 1342*b* has a portion located outside second side wall 132 in the Y direction (width direction: second direction) (see FIG. 21**).

By providing partition wall 1342 having such a shape in case 120, it is possible to suppress the consumable powder or the like that has not been blocked by pressing wall 1341 from entering auxiliary contact side space S3 by partition wall 1342.

Further, in the present exemplary embodiment, partition wall 130 includes fifth side wall 135 that extends in the Z direction (vertical direction: axial direction) and is provided on case 120 so as to be disposed outside second side wall 132 in the Y direction (width direction: second direction).

In the present exemplary embodiment, thick portion **1223*a* is formed at the central portion of side wall 1223 of case 120 in the X direction (front-rear direction: first direction). Fifth side wall 135 extends so as to protrude inward in the Y direction (width direction: second direction) from a center in the X direction (front-rear direction: first direction) in thick portion 1223*a*. Fifth side wall 135 extends downward in the Z direction (vertical direction: axial direction) from top wall 121 of case 120. Then, in a state where case 120 is attached to base 110, the lower end of fifth side wall 135 is extended to a position substantially in contact with base portion 111 of base 110**.

Further, in the present exemplary embodiment, fifth side wall 135 is formed integrally with third side wall 133 and partition wall extended portion **1342*b*. Specifically, fifth side wall 135, third side wall 133, and partition wall extended portion 1342*b*** are formed by integral molding.

Since arc extension space S4 is divided in the X direction (front-rear direction: first direction) by providing fifth side wall 135 having such a shape, the consumable powder or the like generated in main contact portion 40 can be more reliably suppressed from entering auxiliary contact side space S3 by fifth side wall 135.

In the present exemplary embodiment, main contact side space S2 includes internal space S1 facing the side surface on the front side in the X direction of fifth side wall 135. On the other hand, auxiliary contact side space S3 includes internal space S1 facing the side surface on the rear side in the X direction of fifth side wall 135.

Second Exemplary Embodiment

As illustrated in FIGS. 24 to 27, electromagnetic relay 1 according to the present exemplary embodiment has substantially the same configuration as electromagnetic relay 1 shown in the first exemplary embodiment.

That is, electromagnetic relay 1 according to the present exemplary embodiment includes housing 10 having base 110 and case 120 covering base 110.

Housing 10 further includes main contact portion 40 that has main fixed contact 411 and main moving contact 421 that comes into contact with and separates from main fixed contact 411 and is disposed in internal space S1 formed in the housing.

Auxiliary fixed contact 611 and auxiliary moving contact 621 that comes into contact with or separates from auxiliary fixed contact 611 are provided, and auxiliary contact portion 60 disposed in internal space S1 is provided.

In a state where base 110 is located below case 120, coil 210 disposed in internal space S1 such that the axial direction extends in the Z direction (vertical direction), and yoke 240 disposed around coil 210 are provided.

Armature 310 that swings in response to the excitation/non-excitation of coil 210, and movable part 50 that moves main moving contact 421 in response to the swing of armature 310 are provided.

Electromagnetic relay 1 according to the present exemplary embodiment also includes partition wall 130 that divides internal space S1 into main contact side space S2 where main contact portion 40 exists and auxiliary contact side space S3 where auxiliary contact portion 60 exists.

Partition wall 130 includes first side wall 131 continuously connected to base 110 so as to extend along the Z direction (vertical direction: axial direction) on the front side of coil 210 in the X direction (front-rear direction) (one side in the first direction intersecting the axial direction).

Partition wall 130 includes a pair of second side walls 132 disposed on both sides in the Y direction (width direction: a second direction intersecting with the axial direction of the coil and the first direction) and continuously connected to base 110 so as to extend along the Z direction (vertical direction: axial direction).

First side wall 131 is continuously connected to base 110 such that main contact portion 40 and movable part 50 are located on the front side in the X direction (front-rear direction) and auxiliary contact portion 60 and coil 210 are located on the rear side in the X direction (front-rear direction) (the other side in the first direction intersecting the axial direction).

At least a part of side surface 210*a* of coil 210 is surrounded by first side wall 131 and the pair of second side walls 132.

Further, also in the present exemplary embodiment, partition wall 130 includes a pair of third side walls 133 disposed side by side in the Y direction (width direction: second direction) and provided along the Z direction (vertical direction: axial direction) and along second side wall 132.

In a state where base 110 is located below case 120, the pair of third side walls 133 is provided at the same height as the contact peripheral portion of auxiliary contact portion 60 in the Z direction (vertical direction: axial direction) with bottom surface 111*a* of base 110 as a reference (see FIGS. 30 and 32). The pair of third side walls 133 is provided at the same height as at least one of auxiliary fixed contact 611 and auxiliary moving contact 621 in the Z direction with reference to bottom surface 111*a* of base 110. Also in the present exemplary embodiment, the pair of third side walls 133 may be provided higher than head 232 of iron core 230 in the Z direction with reference to bottom surface 111*a* of base 110.

Further, also in the present exemplary embodiment, partition wall 130 includes fourth side wall 134 provided on case 120 so as to protrude downward in the Z direction (vertical direction: axial direction) in a state where base 110 is located below case 120 (see FIGS. 28 and 29). Fourth side wall 134 extends in the Y direction (width direction: second direction) and faces armature 310 in the Z direction (vertical direction: axial direction) (see FIGS. 32 and 33).

Fourth side wall 134 is disposed on the front side (main contact portion 40 side) in the X direction (front-rear direction: first direction) with respect to vertical wall (upright portion) 241 of yoke 240, and includes pressing wall 1341 capable of pressing armature 310.

Figure 28:
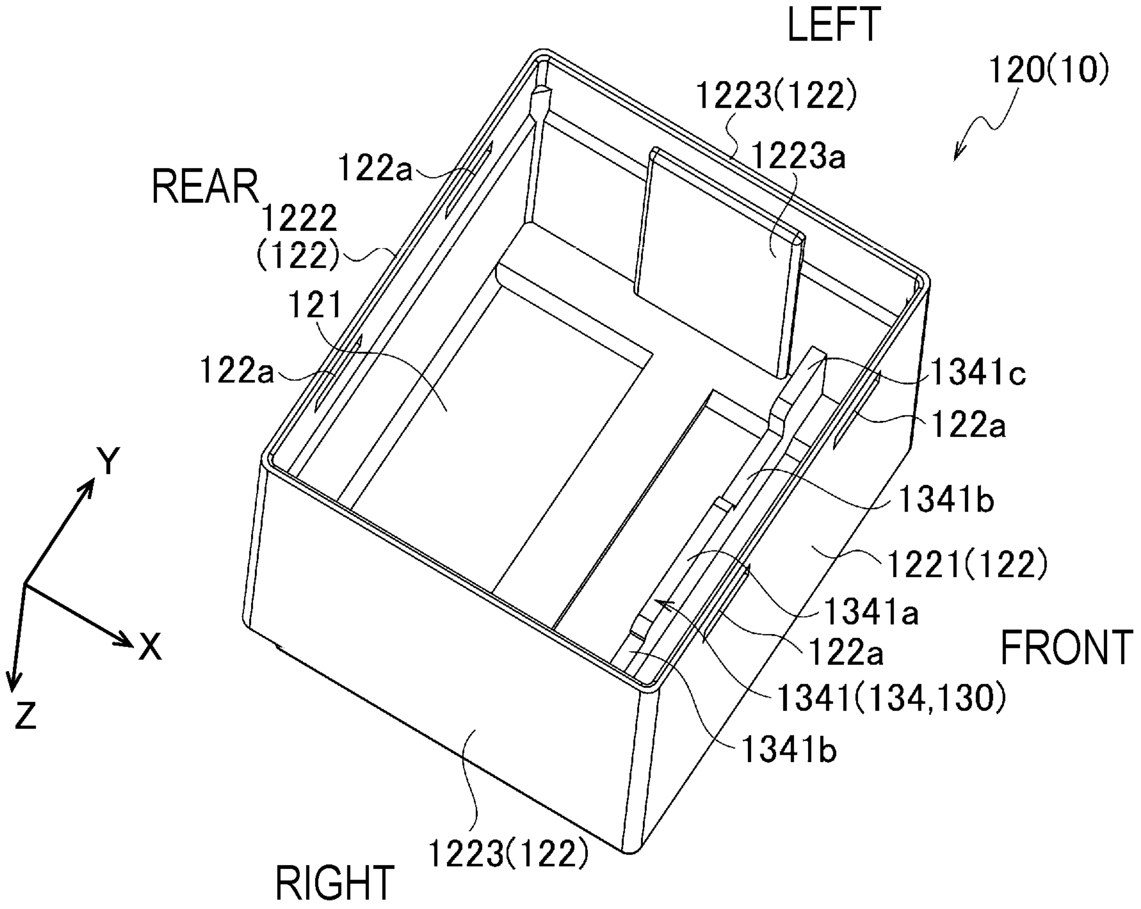
FIG. 28 is a perspective view illustrating the inside of a cover according to the second exemplary embodiment.
Figure 29:
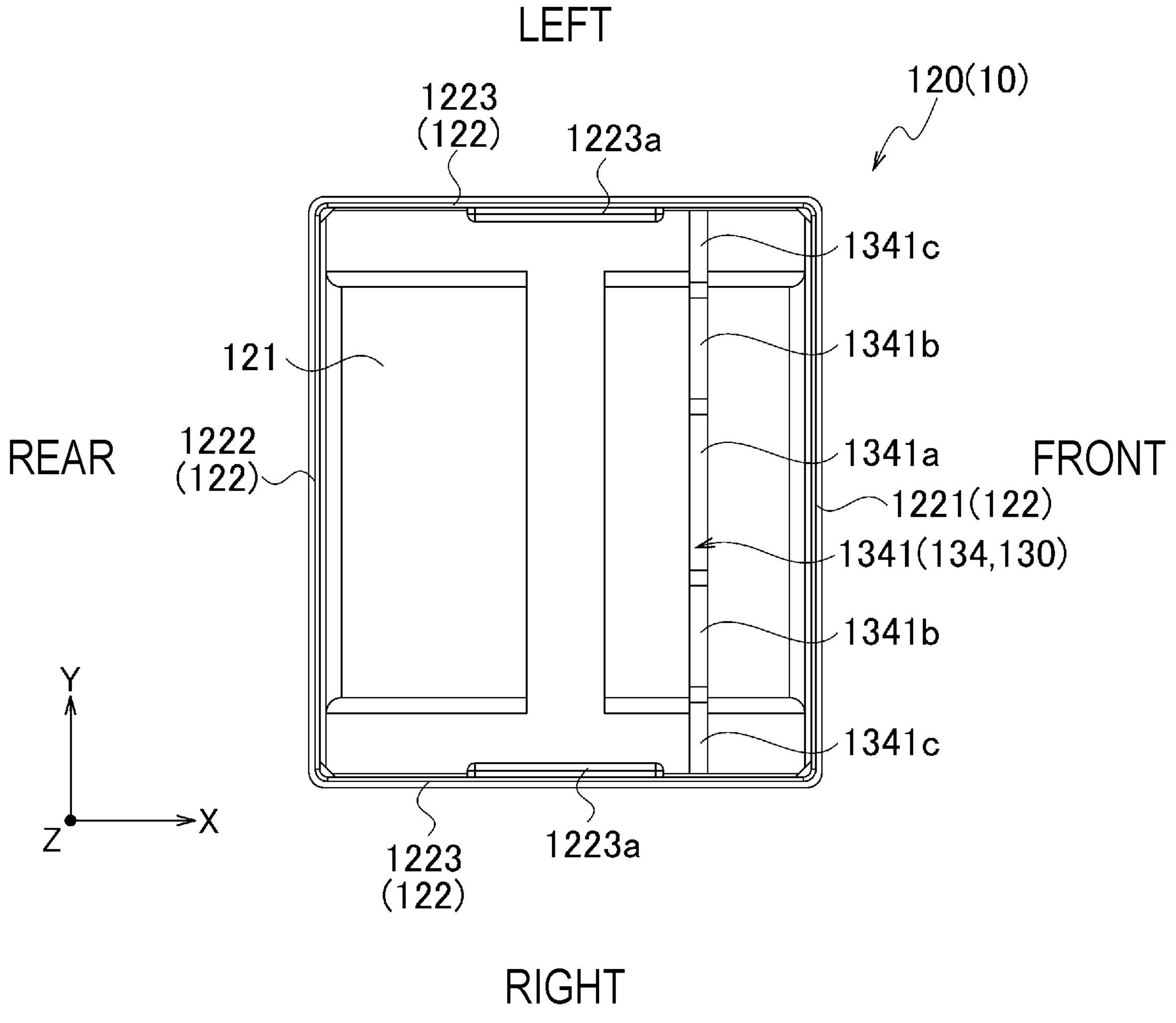
FIG. 29 is a rear view illustrating the cover according to the second exemplary embodiment.

Pressing wall 1341 includes protrusion 1341*a* formed at the center in the Y direction (width direction: second direction) and a pair of recesses 1341*b* formed at both ends in the Y direction (width direction: second direction) of protrusion 1341*a* (see FIGS. 28 and 29). Further, pressing wall 1341 includes a pair of pressing wall extended portions 1341*c* formed on the outer sides of the pair of recesses 1341*b* in the Y direction (width direction: second direction). The pair of pressing wall extended portions 1341*c* is formed such that the outside in the Y direction (width direction: second direction) is in contact with the inner surface of side wall 1223.

Figure 32:
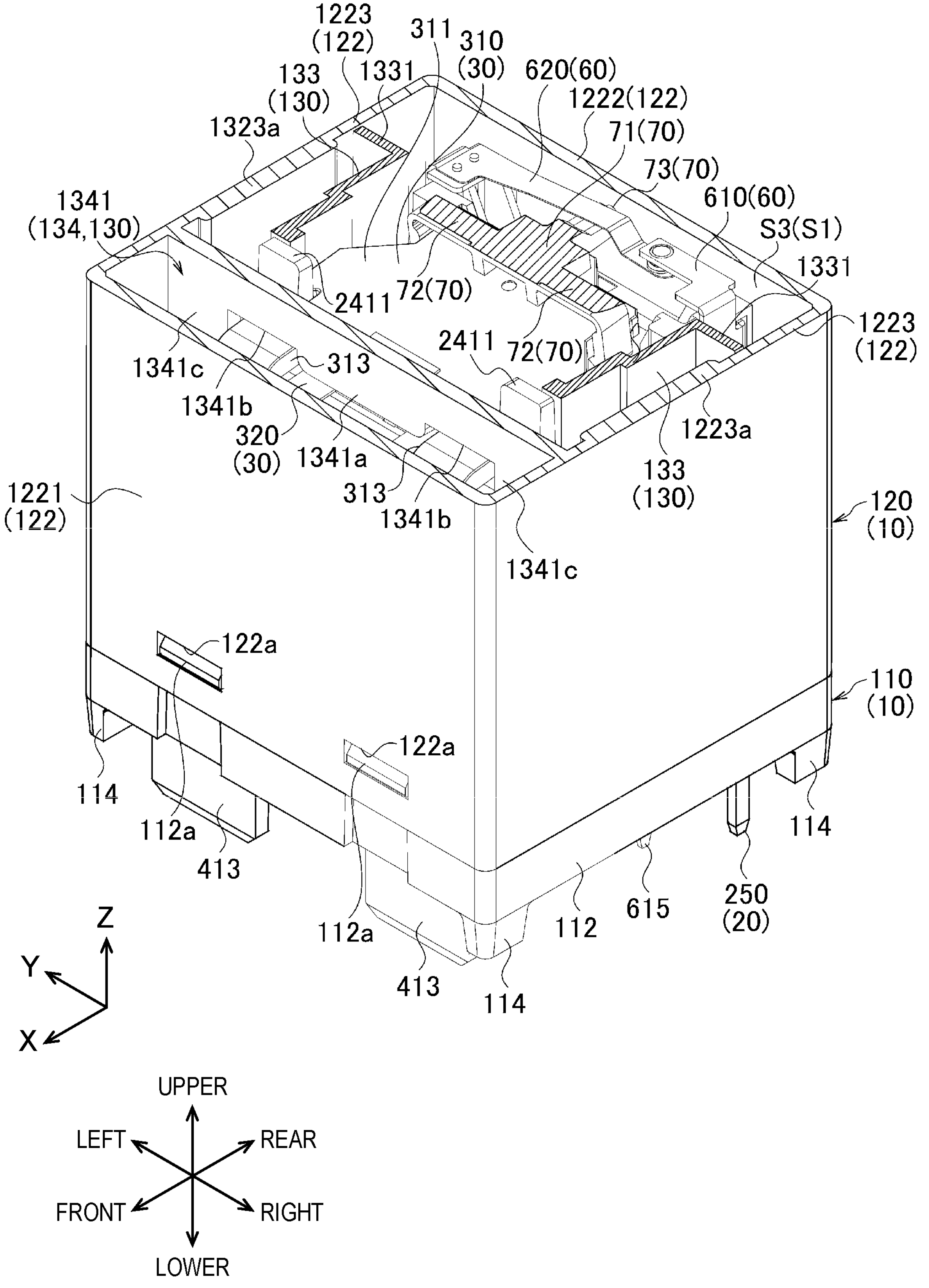
FIG. 32 is a view illustrating an electromagnetic relay according to the second exemplary embodiment, and is a perspective view illustrating a state in which a position where an auxiliary drive unit of the electromagnetic relay exists is cut by a horizontal plane.
Figure 33:
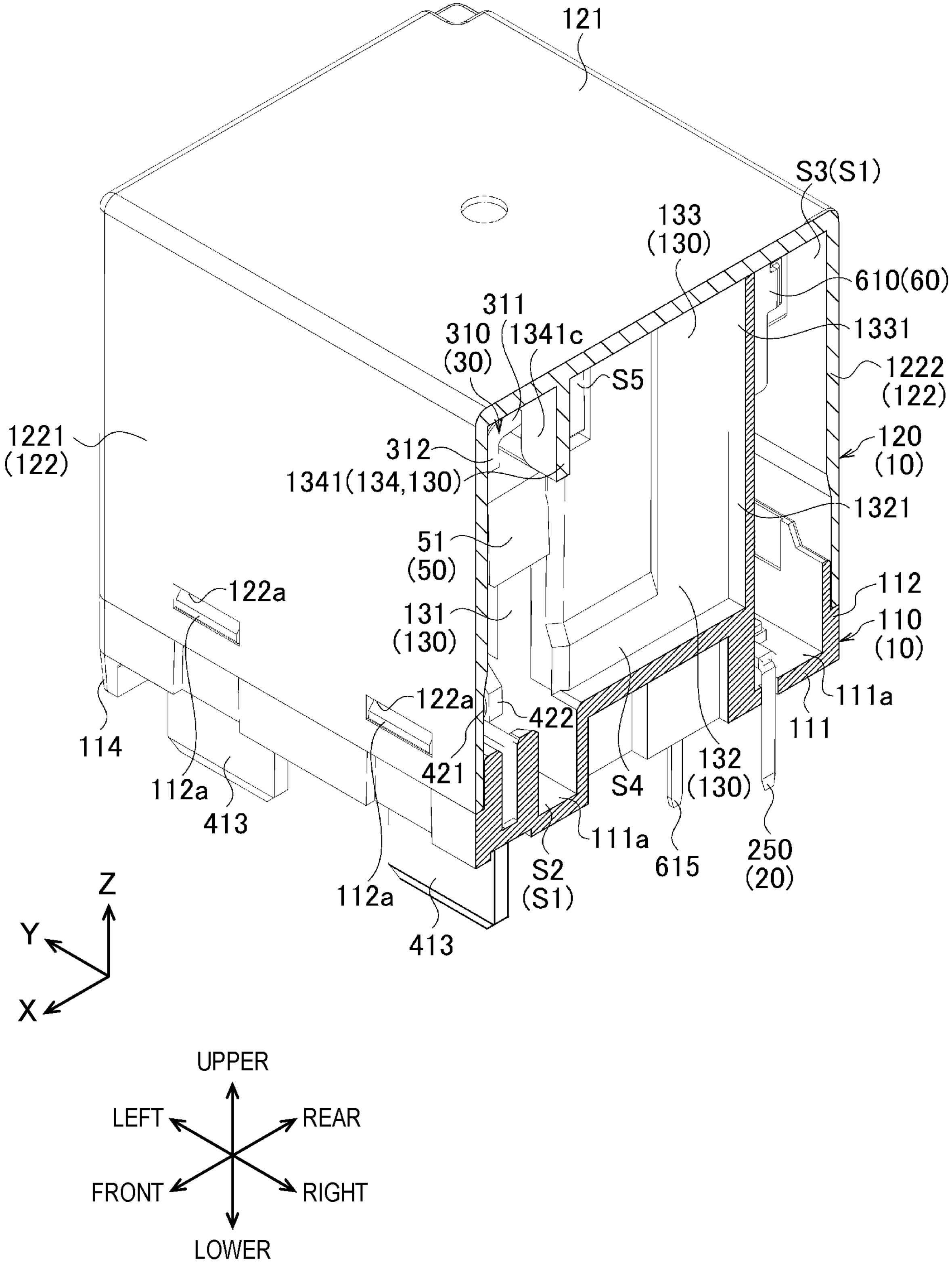
FIG. 33 is a view illustrating the electromagnetic relay according to the second exemplary embodiment, and is a perspective view illustrating a state in which the position where the extension part of the second side wall of the electromagnetic relay exists is cut by a vertical plane extending in the front-rear direction.
Figure 34:
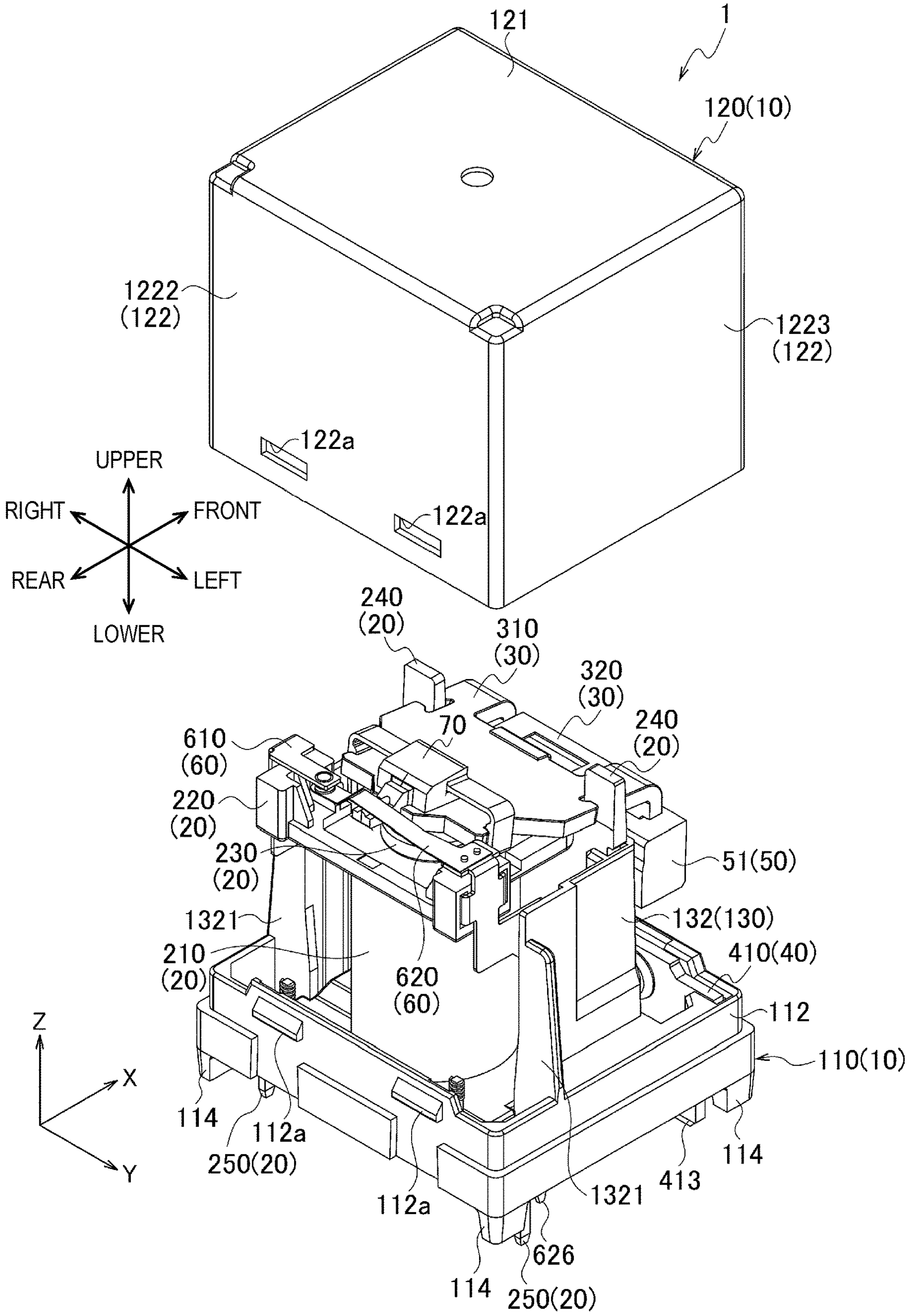
FIG. 34 is an exploded perspective view of a state in which a cover of the electromagnetic relay according to a third exemplary embodiment is removed as viewed from one direction.
Figure 35:
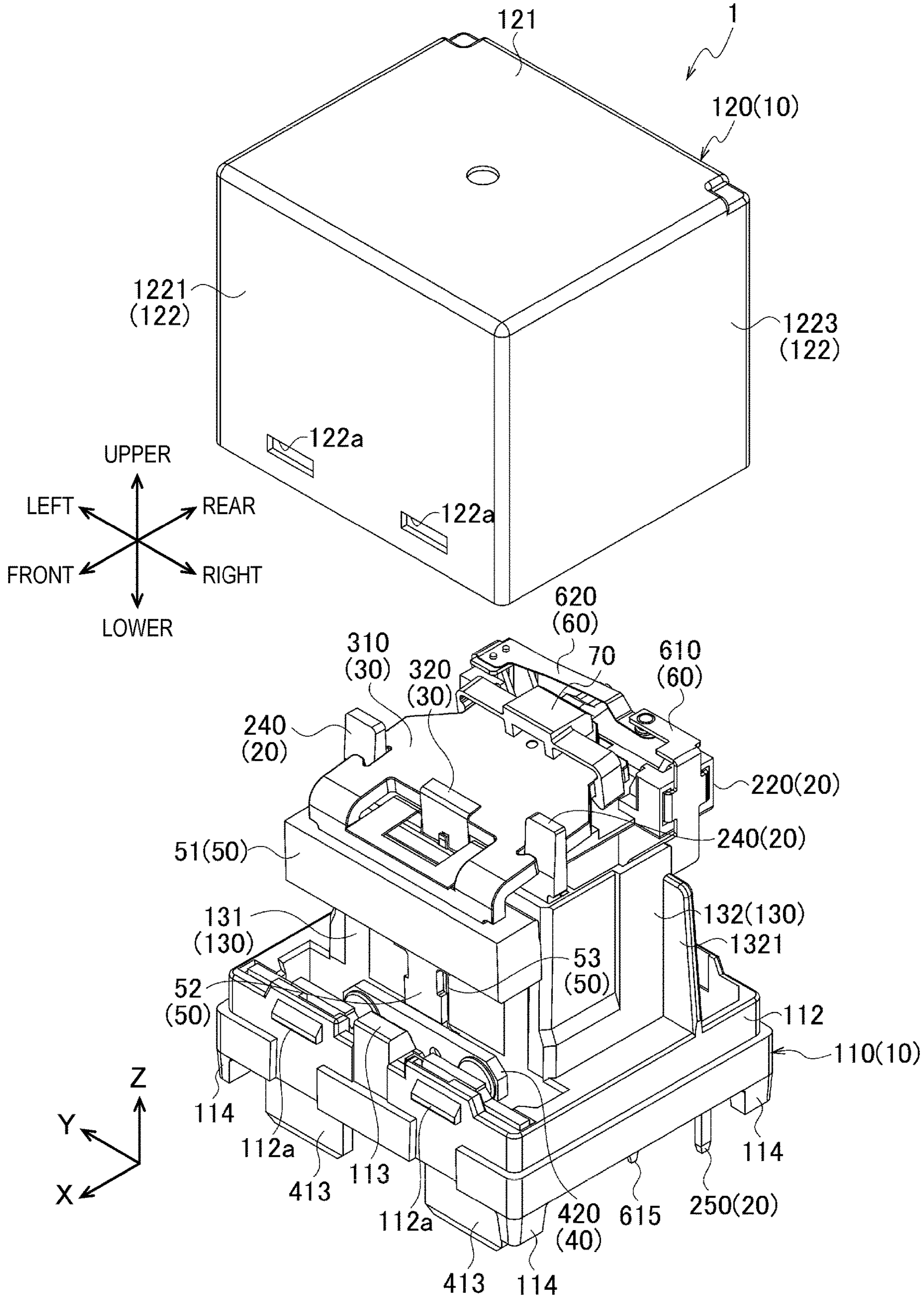
FIG. 35 is an exploded perspective view of a state in which the cover of the electromagnetic relay according to the third exemplary embodiment is removed as viewed from another direction.
Figure 36:
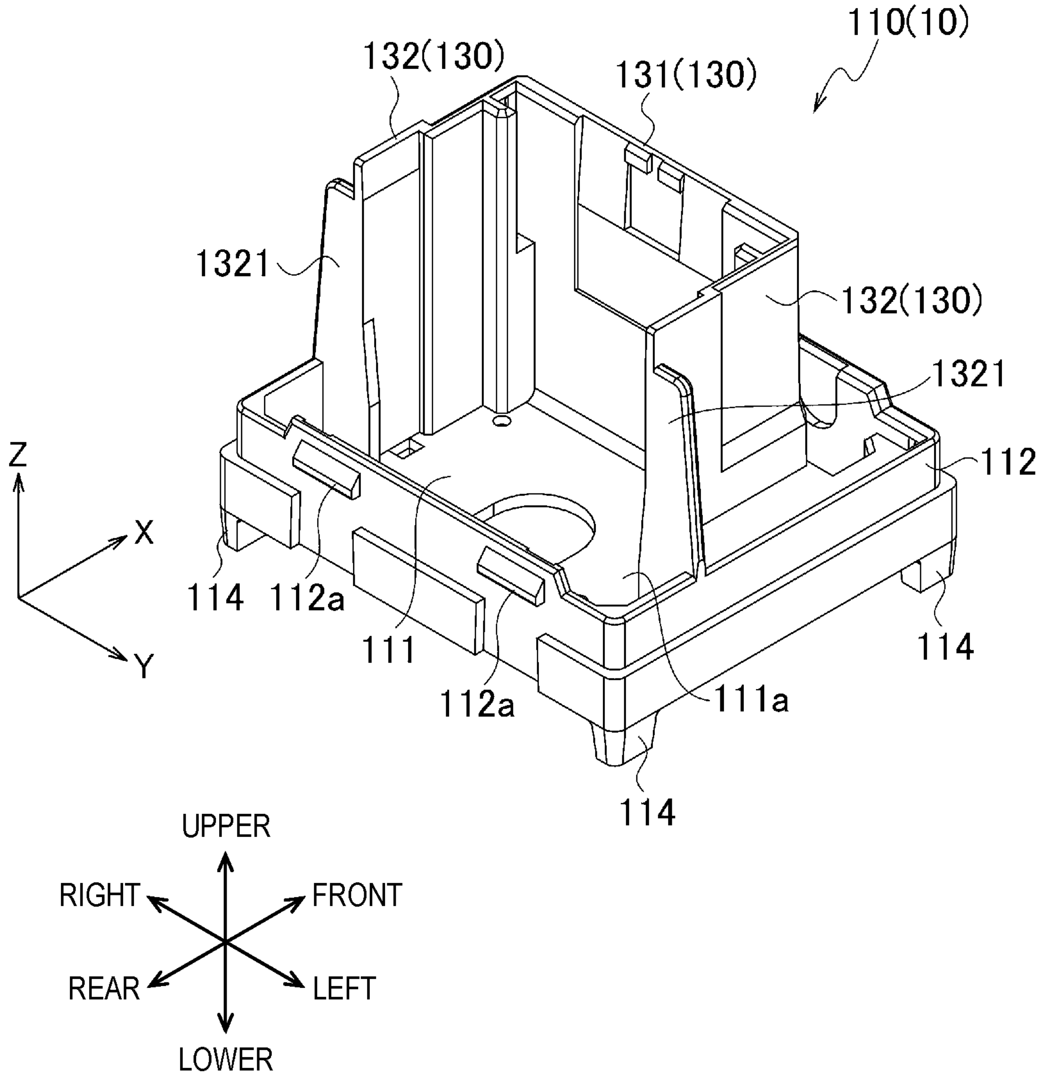
FIG. 36 is a perspective view of a base according to the third exemplary embodiment as viewed from one direction.
Figure 37:
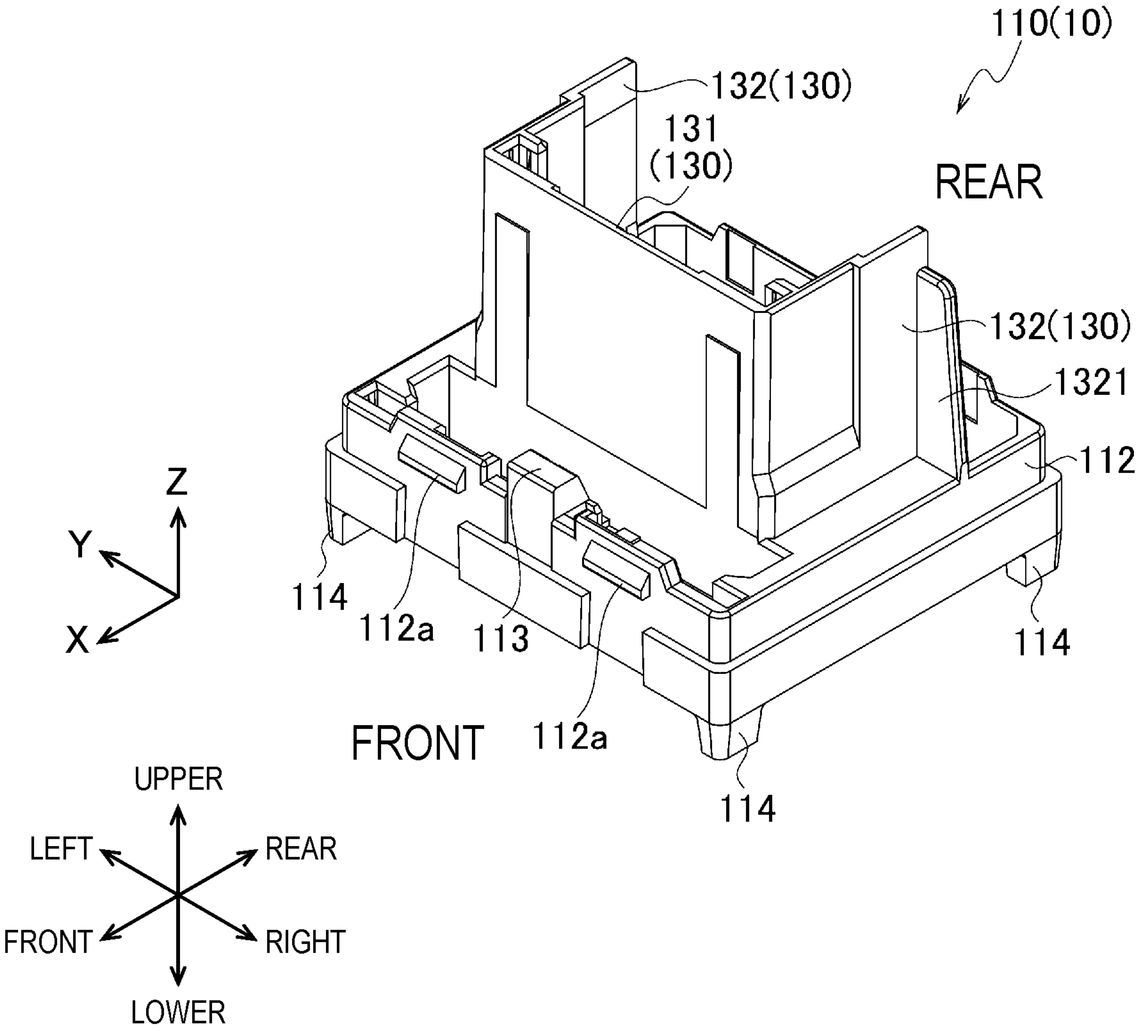
FIG. 37 is a perspective view of a base according to the third exemplary embodiment as viewed from another direction.

With case 120 attached to base 110, the lower end of protrusion 1341*a* is inserted into through-hole 313 formed in armature 310 (see FIG. 32). In addition, in a state where case 120 is attached to base 110, the pair of recesses 1341*b* faces both sides of through-hole 313 of armature 310 in the Y direction (width direction: second direction) in the Z direction (vertical direction: axial direction). Further, in a state where case 120 is attached to base 110, armature 310 is disposed between the pair of pressing wall extended portions 1341*c* in the Y direction (width direction: second direction).

Figure 26:
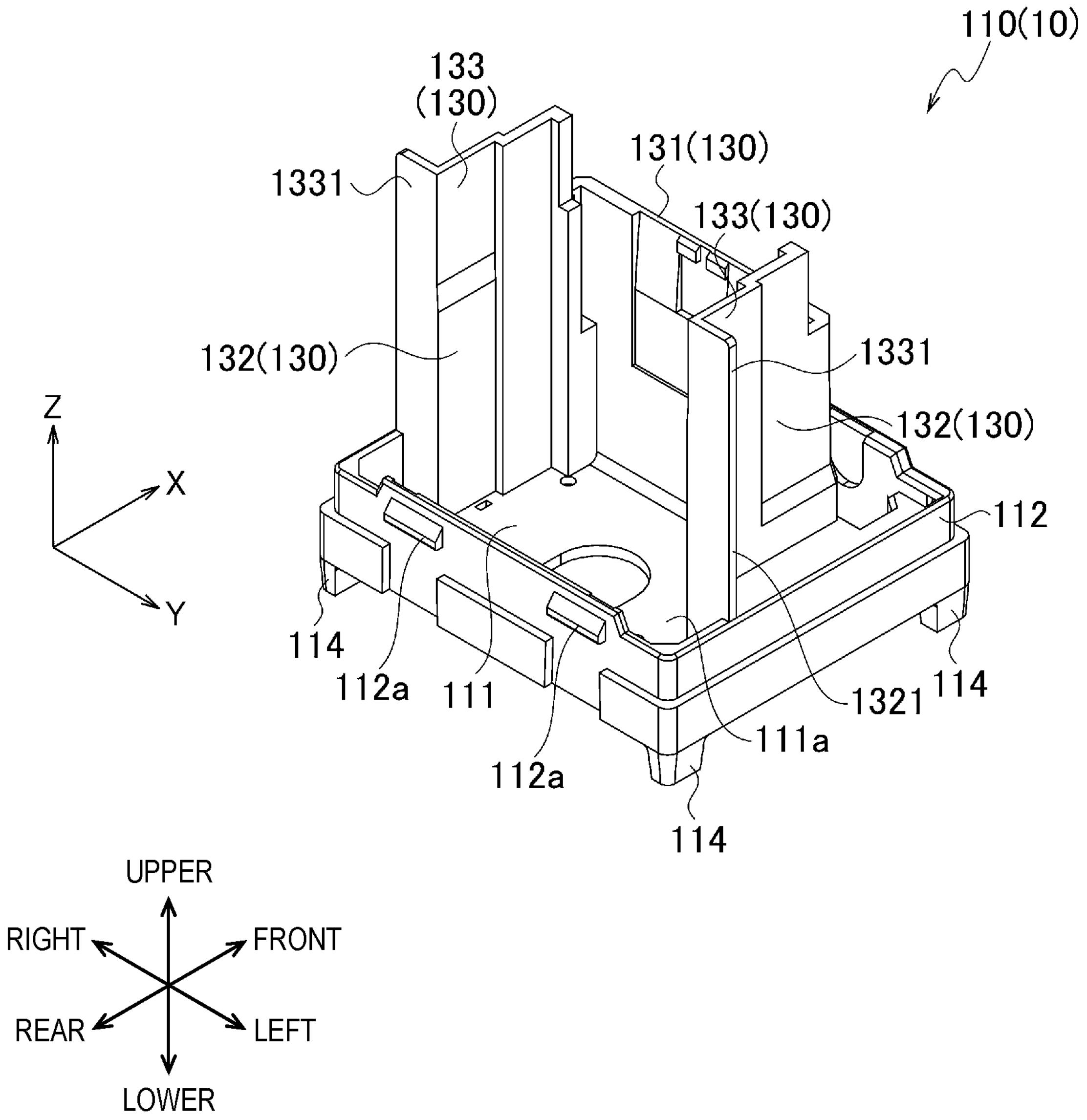
FIG. 26 is a perspective view of a base according to the second exemplary embodiment as viewed from one direction.
Figure 27:
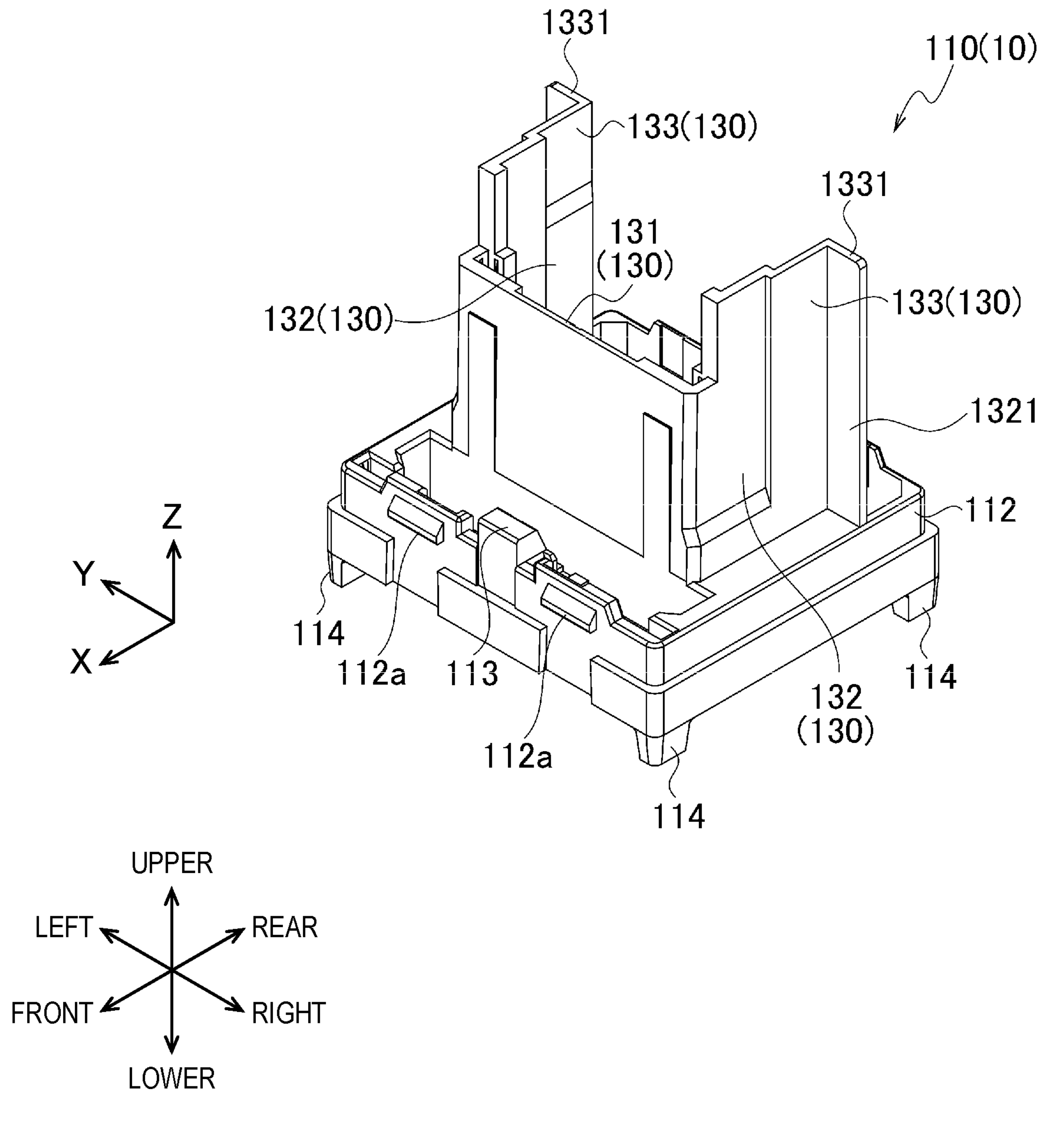
FIG. 27 is a perspective view of a base according to the second exemplary embodiment as viewed from another direction.

Here, in the present exemplary embodiment, third side wall 133 is formed on base 110, and third side wall 133 and second side wall 132 are integrally formed (see FIGS. 26 and 27). Specifically, third side wall 133 and second side wall 132 are formed by integral molding. In addition, a wall portion of partition wall 130 extending in the X direction (front-rear direction: first direction) and the Z direction (vertical direction: axial direction) is formed such that an upper end protrudes upward in the Z direction (vertical direction: axial direction) from an upper end of first side wall 131 (see FIGS. 26 and 27). In the wall portion described above, a portion continuously provided to first side wall 131 (a portion located below the upper end of first side wall 131 in the wall described above) is defined as second side wall 132, and a portion protruding upward from the portion defined as the second side wall (a portion not continuously provided to first side wall 131 in the wall described above) is defined as third side wall 133.

In the present exemplary embodiment, second side wall 132 has extension part 1321 extending outward in the Y direction (width direction: second direction). Extension part 1321 extends in the Y direction (width direction: second direction) and the Z direction (vertical direction: axial direction) from a rear end of second side wall 132 in the X direction (front-rear direction: first direction). Further, at the upper end of extension part 1321, extension part 1331 is extended so as to extend in the Y direction (width direction: second direction) and the Z direction (vertical direction: axial direction) from the rear end of third side wall 133 in the X direction (front-rear direction: first direction), and extension part 1321 and extension part 1331 are integrally formed. As described above, in the present exemplary embodiment, the wall portion constituted by extension part 1321 and extension part 1331 is formed from the lower end of second side wall 132 to the upper end of third side wall 133 (see FIGS. 26 and 27).

Figure 30:
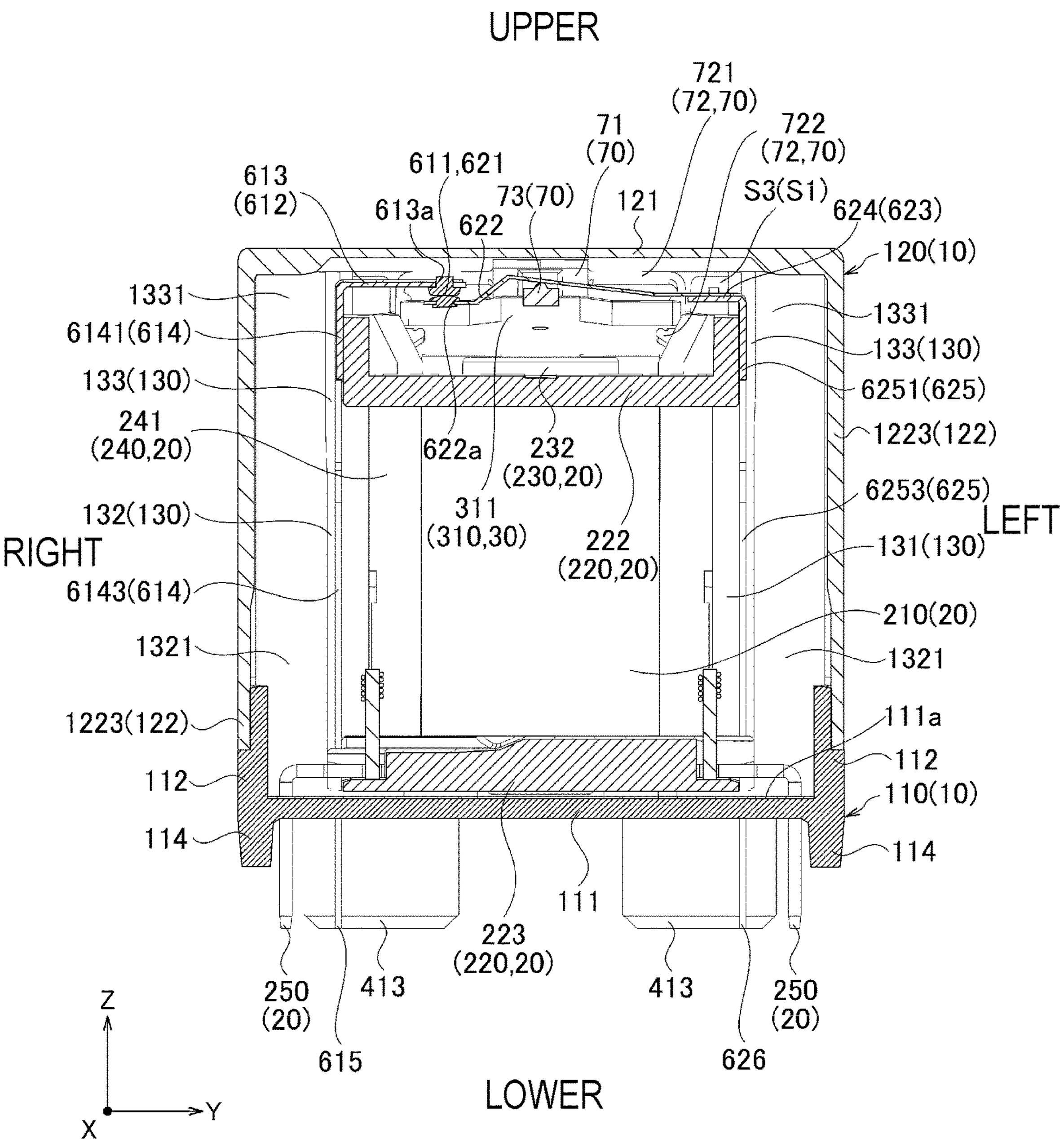
FIG. 30 is a view illustrating an electromagnetic relay according to the second exemplary embodiment, and is a cross-sectional view illustrating a state in which a position where an auxiliary contact of the electromagnetic relay exists is cut by a vertical plane extending in the left-right direction.
Figure 31:
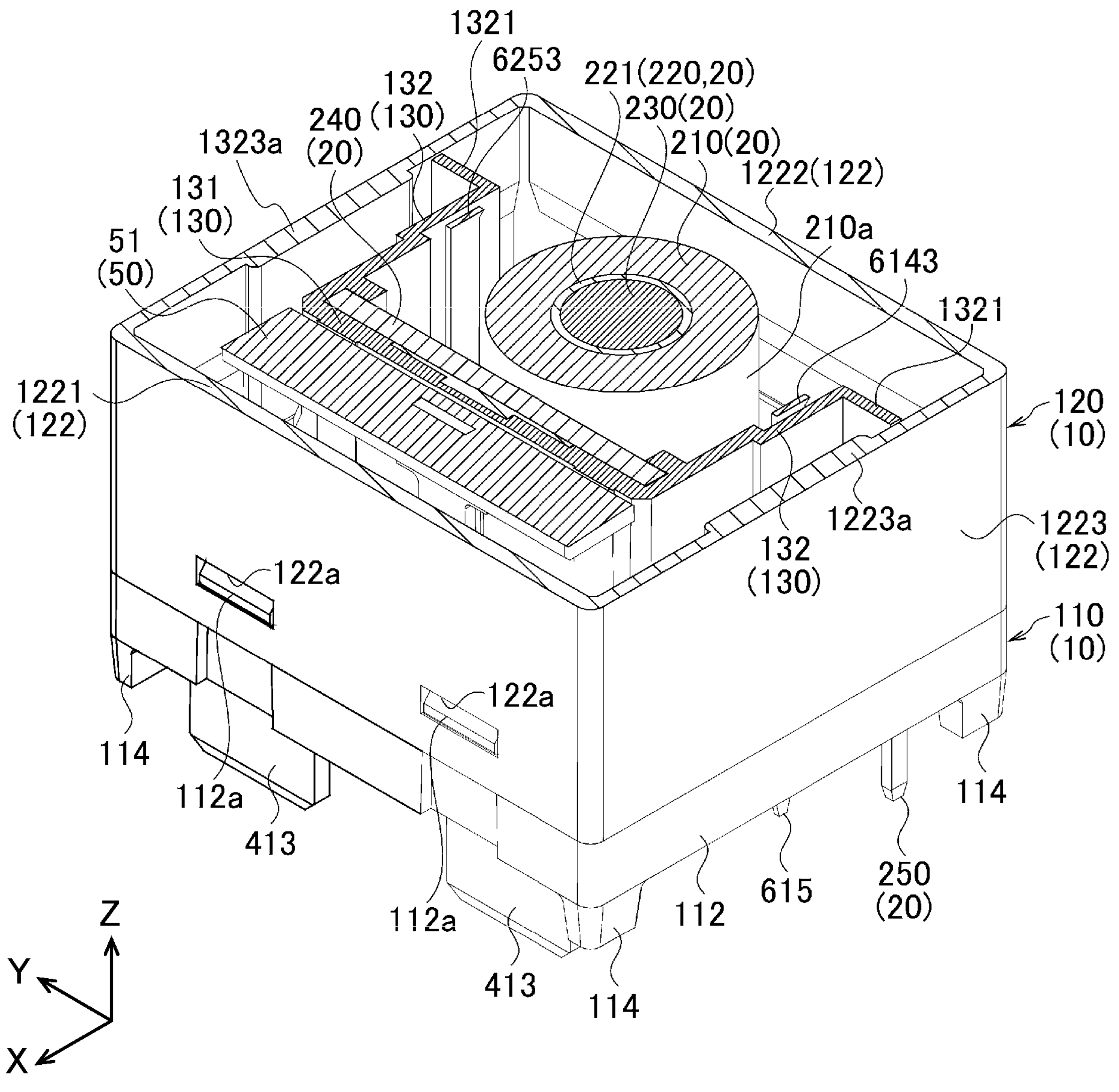
FIG. 31 is a view illustrating an electromagnetic relay according to the second exemplary embodiment, and is a perspective view illustrating a state in which a center in a vertical direction of the electromagnetic relay is cut by a horizontal plane.
Figure 31:
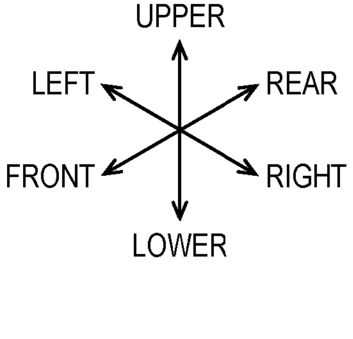

Further, in the present exemplary embodiment, in a state where case 120 is attached to base 110, extension part 1321 is configured such that a gap is hardly formed between the end surface on the outer side in the Y direction (width direction: second direction) and the inner surface of side wall 1223 of case 120 (see FIGS. 30 to 32).

As described above, in the present exemplary embodiment, arc extension space S4 is divided in the X direction (front-rear direction: first direction) by providing extension part 1321. Then, extension part 1321 more reliably prevents the consumable powder or the like generated in main contact portion 40 from entering auxiliary contact side space S3 (see FIGS. 32 and 33).

In the present exemplary embodiment, fourth side wall 134 that is disposed on the front side (main contact portion 40 side) in the X direction (front-rear direction: first direction) with respect to vertical wall (upright portion) 241 of yoke 240 and does not include pressing wall 1341 capable of pressing armature 310 is exemplified.

Such electromagnetic relay 1 can also achieve substantially the same operations and effects as those of electromagnetic relay 1 described in the first exemplary embodiment.

Third Exemplary Embodiment

As illustrated in FIGS. 34 to 37, electromagnetic relay 1 according to the present exemplary embodiment has substantially the same configuration as electromagnetic relay 1 shown in the first exemplary embodiment.

That is, electromagnetic relay 1 according to the present exemplary embodiment includes housing 10 having base 110 and case 120 covering base 110.

Housing 10 further includes main contact portion 40 that has main fixed contact 411 and main moving contact 421 that comes into contact with and separates from main fixed contact 411 and is disposed in internal space S1 formed in the housing.

Auxiliary fixed contact 611 and auxiliary moving contact 621 that comes into contact with or separates from auxiliary fixed contact 611 are provided, and auxiliary contact portion 60 disposed in internal space S1 is provided.

In a state where base 110 is located below case 120, coil 210 disposed in internal space S1 such that the axial direction extends in the Z direction (vertical direction), and yoke 240 disposed around coil 210 are provided.

Armature 310 that swings in response to the excitation/non-excitation of coil 210, and movable part 50 that moves main moving contact 421 in response to the swing of armature 310 are provided.

Electromagnetic relay 1 according to the present exemplary embodiment also includes partition wall 130 that divides internal space S1 into main contact side space S2 where main contact portion 40 exists and auxiliary contact side space S3 where auxiliary contact portion 60 exists.

Partition wall 130 includes first side wall 131 continuously connected to base 110 so as to extend along the Z direction (vertical direction: axial direction) on the front side of coil 210 in the X direction (front-rear direction) (one side in the first direction intersecting the axial direction).

Partition wall 130 includes a pair of second side walls 132 disposed on both sides in the Y direction (width direction: a second direction intersecting with the axial direction of the coil and the first direction) and continuously connected to base 110 so as to extend along the Z direction (vertical direction: axial direction).

First side wall 131 is continuously connected to base 110 such that main contact portion 40 and movable part 50 are located on the front side in the X direction (front-rear direction) and auxiliary contact portion 60 and coil 210 are located on the rear side in the X direction (front-rear direction) (the other side in the first direction intersecting the axial direction).

At least a part of side surface 210*a* of coil 210 is surrounded by first side wall 131 and the pair of second side walls 132.

Further, also in the present exemplary embodiment, partition wall 130 includes a pair of third side walls 133 disposed side by side in the Y direction (width direction: second direction) and provided along the Z direction (vertical direction: axial direction) and along second side wall 132.

Also in the present exemplary embodiment, third side wall 133 is formed inside case 120. Specifically, third side wall 133 extends from the inner surface of top wall 121 along the X direction (front-rear direction: first direction) and the Z direction (vertical direction: axial direction). Third side wall 133 is formed such that the rear end in the X direction (front-rear direction: first direction) is in contact with the inner surface of rear wall 1222.

With case 120 attached to base 110, the lower end of third side wall 133 is disposed outside second side wall 132 in the Y direction (width direction: second direction). At this time, a gap is hardly formed between the lower end of third side wall 133 and second side wall 132 (see FIG. 40).

As described above, in the present exemplary embodiment, third side wall 133 is provided on case 120 so as to overlap second side wall 132 as viewed in the Y direction (width direction: second direction).

Figure 40:
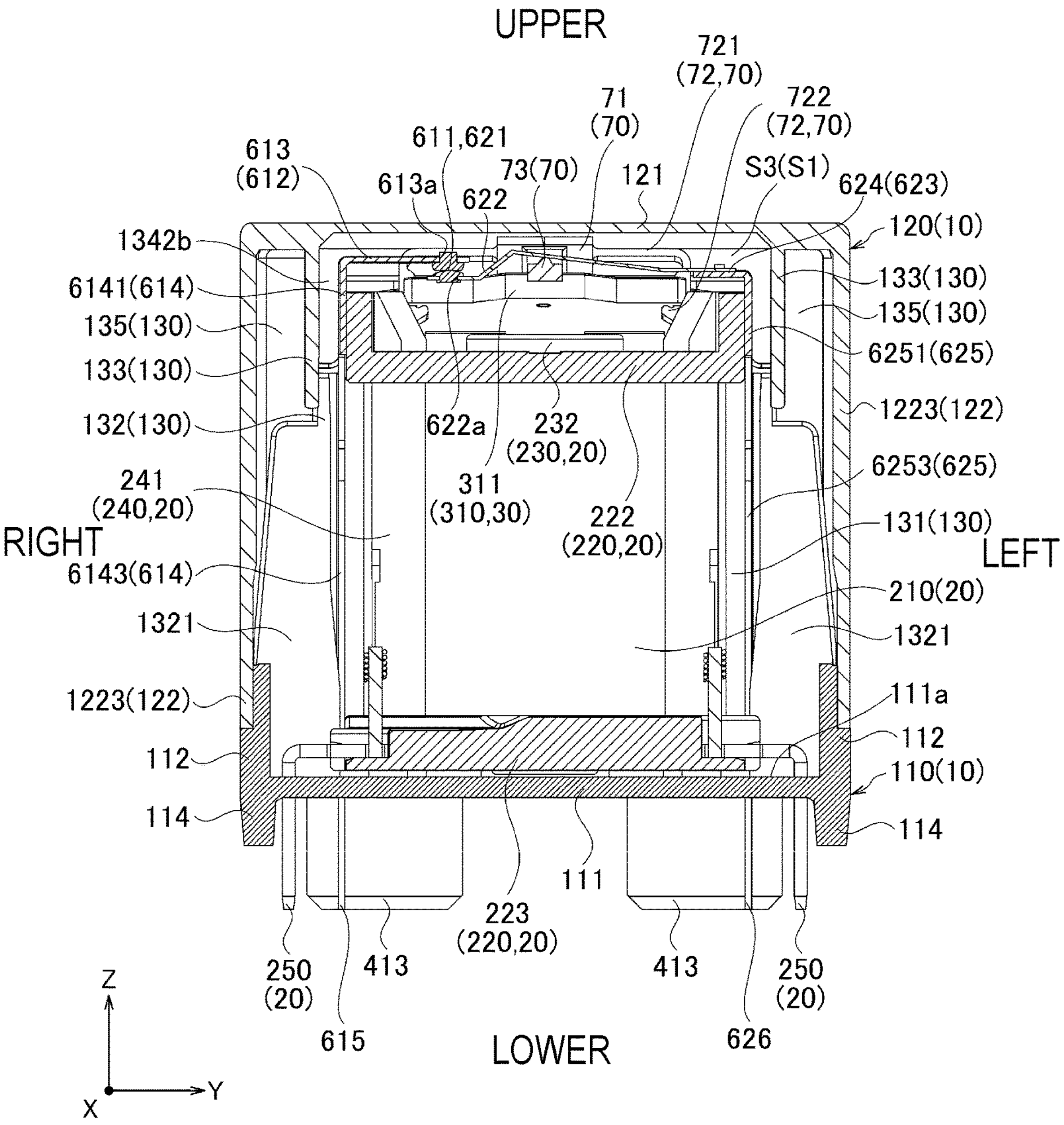
FIG. 40 is a view illustrating the electromagnetic relay according to the third exemplary embodiment, and is a cross-sectional view illustrating a state in which a position where the auxiliary contact of the electromagnetic relay exists is cut by a vertical plane extending in the horizontal direction.
Figure 43:
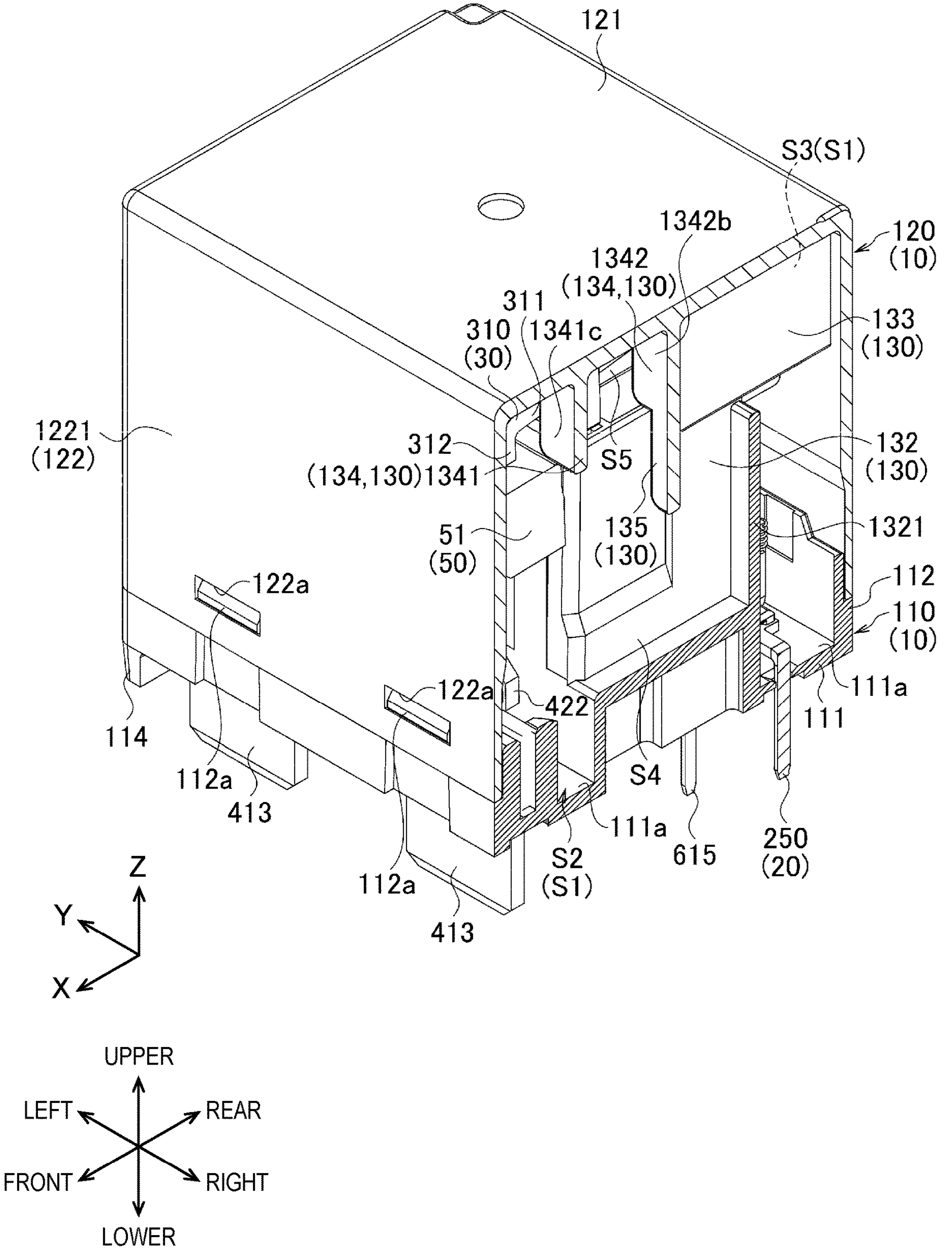
FIG. 43 is a view illustrating the electromagnetic relay according to the third exemplary embodiment, and is a perspective view illustrating a state in which the position where the extension part of the second side wall of the electromagnetic relay exists is cut by a vertical plane extending in the front-rear direction.

In a state where base 110 is located below case 120, the pair of third side walls 133 is provided at the same height as the contact peripheral portion of auxiliary contact portion 60 in the Z direction (vertical direction: axial direction) with respect to bottom surface 111*a* of base 110 (see FIGS. 32, 40, and 43). The pair of third side walls 133 is provided at the same height as at least one of auxiliary fixed contact 611 and auxiliary moving contact 621 in the Z direction with reference to bottom surface 111*a* of base 110. Also in the present exemplary embodiment, the pair of third side walls 133 may be provided higher than head 232 of iron core 230 in the Z direction with reference to bottom surface 111*a* of base 110.

Figure 44:
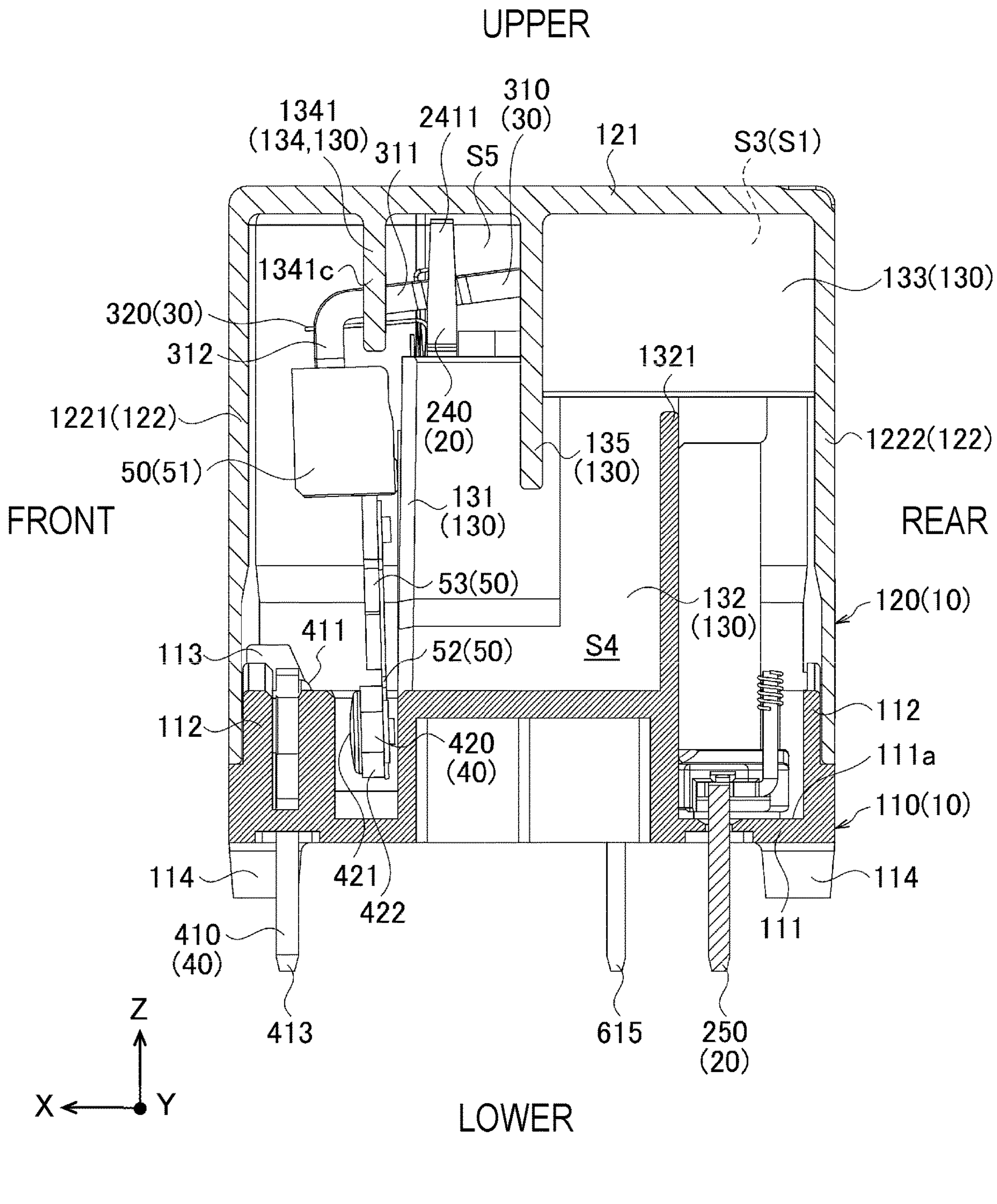
FIG. 44 is a side view of the electromagnetic relay illustrated in FIG. 43.

Further, also in the present exemplary embodiment, partition wall 130 includes fourth side wall 134 provided on case 120 so as to protrude downward in the Z direction (vertical direction: axial direction) in a state where base 110 is located below case 120 (see FIGS. 38 and 39). Fourth side wall 134 extends in the Y direction (width direction: second direction) and faces armature 310 in the Z direction (vertical direction: axial direction) (see FIGS. 40, 43, and 44).

Fourth side wall 134 is disposed on the front side (main contact portion 40 side) in the X direction (front-rear direction: first direction) with respect to vertical wall (upright portion) 241 of yoke 240, and includes pressing wall 1341 capable of pressing armature 310.

Figure 38:
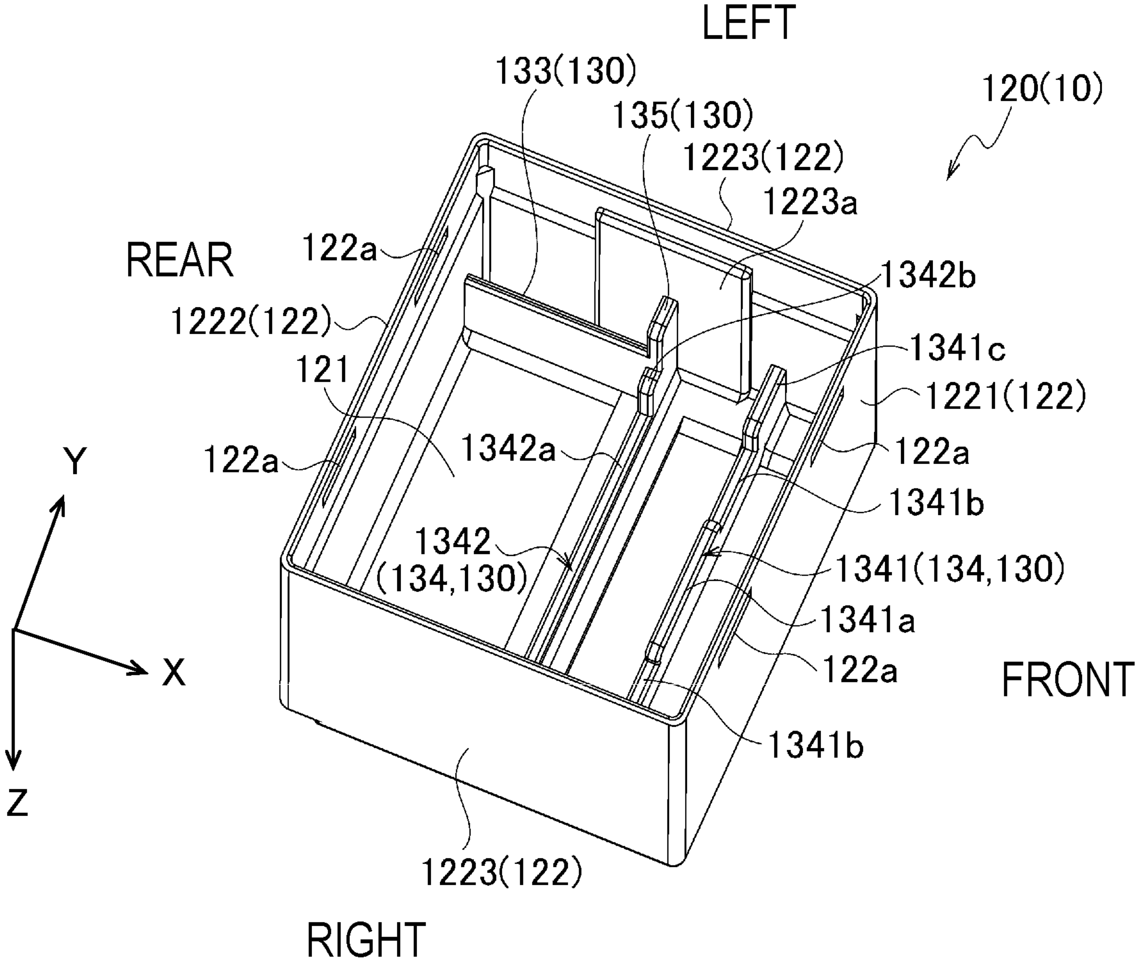
FIG. 38 is a perspective view illustrating the inside of a cover according to the third exemplary embodiment.
Figure 39:
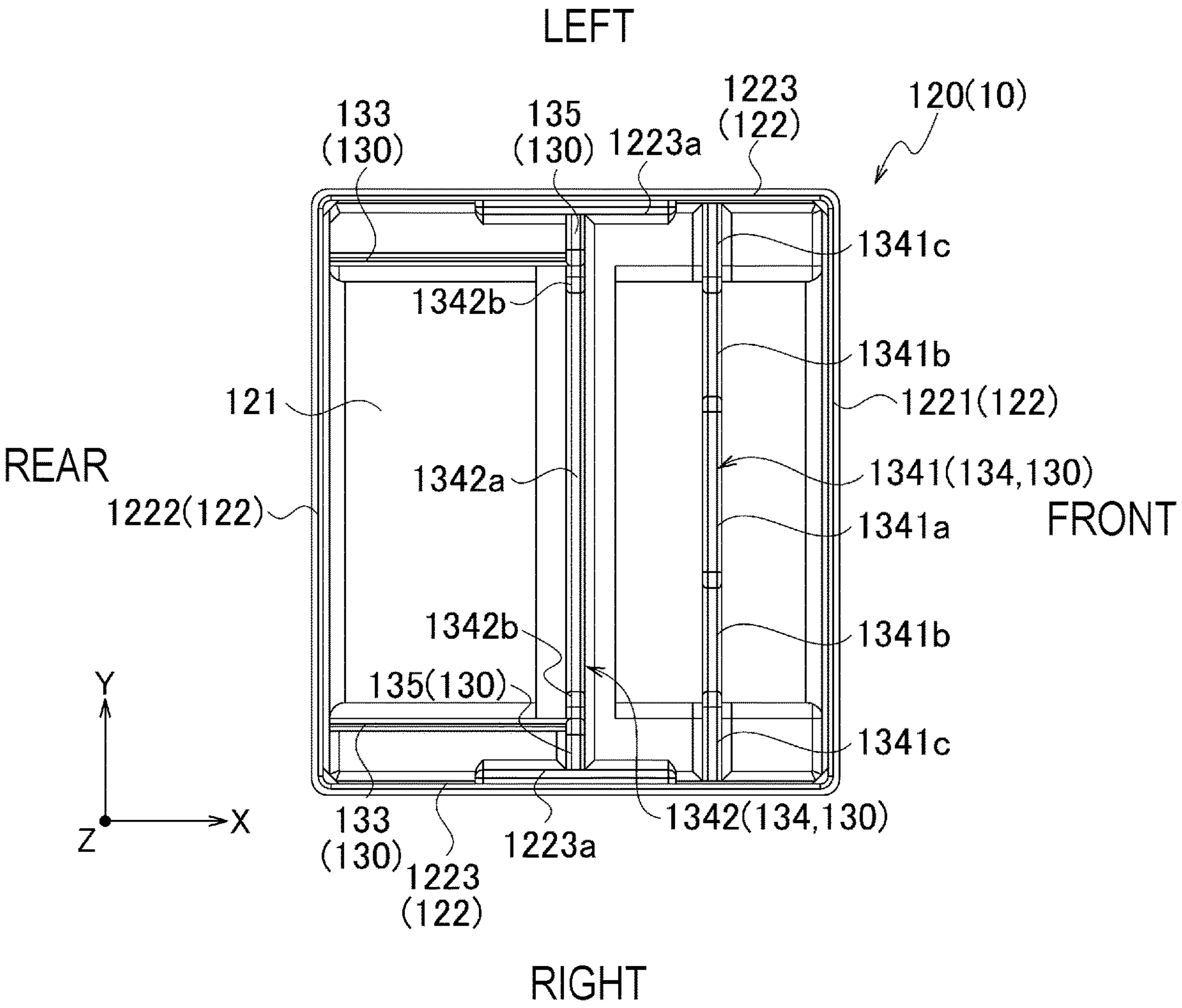
FIG. 39 is a rear view illustrating the cover according to the third exemplary embodiment.

Pressing wall 1341 includes protrusion 1341*a* formed at the center in the Y direction (width direction: second direction) and a pair of recesses 1341*b* formed at both ends in the Y direction (width direction: second direction) of protrusion 1341*a* (see FIGS. 38 and 39). Further, pressing wall 1341 includes a pair of pressing wall extended portions 1341*c* formed on the outer sides of the pair of recesses 1341*b* in the Y direction (width direction: second direction). The pair of pressing wall extended portions 1341*c* is formed such that the outside in the Y direction (width direction: second direction) is in contact with the inner surface of side wall 1223.

With case 120 attached to base 110, the lower end of protrusion 1341*a* is inserted into through-hole 313 formed in armature 310. In addition, in a state where case 120 is attached to base 110, the pair of recesses 1341*b* faces both sides of through-hole 313 of armature 310 in the Y direction (width direction: second direction) in the Z direction (vertical direction: axial direction). Further, in a state where case 120 is attached to base 110, armature 310 is disposed between the pair of pressing wall extended portions 1341*c* in the Y direction (width direction: second direction).

Fourth side wall 134 includes partition wall 1342 which is disposed on the rear side (auxiliary contact portion 60 side) in the X direction (front-rear direction: first direction) with respect to vertical wall (upright portion) 241 of yoke 240, and is capable of dividing space S5 above armature 310.

Partition wall 1342 includes recess 1342*a* formed at the center in the Y direction (width direction: second direction) and a pair of partition wall extended portions 1342*b* formed at both ends in the Y direction (width direction: second direction) of recess 1342*a* (see FIGS. 38 and 39). The pair of partition wall extended portions 1342*b* is formed such that the outside in the Y direction (width direction: second direction) is continuously connected to the front end of third side wall 133.

With case 120 attached to base 110, the lower end of recess 1342*a* faces armature 310 (the upper surface of water wall 311) in the Z direction (the vertical direction: the axial direction). Further, in a state where case 120 is attached to base 110, armature 310 is disposed between the pair of partition wall extended portions 1342*b* in the Y direction (width direction: second direction).

Further, also in the present exemplary embodiment, partition wall 130 includes fifth side wall 135 that extends in the Z direction (vertical direction: axial direction) and is provided on case 120 so as to be disposed outside second side wall 132 in the Y direction (width direction: second direction).

Also in the present exemplary embodiment, thick portion 1223*a* is formed at the center of side wall 1223 of case 120 in the X direction (front-rear direction: first direction). Fifth side wall 135 extends so as to protrude inward in the Y direction (width direction: second direction) from a center in the X direction (front-rear direction: first direction) in thick portion 1223*a*.

Fifth side wall 135 extends downward in the Z direction (vertical direction: axial direction) from top wall 121 of case 120.

Here, in the present exemplary embodiment, in a state where case 120 is attached to base 110, the lower end of fifth side wall 135 is located at an intermediate portion between base portion 111 of base 110 and top wall 121 of case 120. The lower end of fifth side wall 135 only needs to be positioned between base portion 111 of base 110 and top wall 121 of case 120, and the amount of protrusion of fifth side wall 135 from top wall 121 can be appropriately set. However, the amount of protrusion of fifth side wall 135 from top wall 121 is preferably such an amount that a space linearly communicating from main contact portion 40 to auxiliary contact side space S3 is not formed in arc extension space S4. That is, the shortest route from main contact portion 40 to auxiliary contact side space S3 through arc extension space S4 is preferably a polygonal line when viewed from the Y direction (width direction: second direction). Accordingly, in order for the consumable powder or the like generated in main contact portion 40 to enter auxiliary contact side space S3, it is necessary to change the direction at least once. Therefore, it is possible to more reliably prevent the consumable powder or the like generated in main contact portion 40 from entering auxiliary contact side space S3.

Further, also in the present exemplary embodiment, fifth side wall 135 is formed integrally with third side wall 133 and partition wall extended portion 1342*b*.

Here, in the present exemplary embodiment, second side wall 132 has extension part 1321 extending outward in the Y direction (width direction: second direction). Extension part 1321 extends in the Y direction (width direction: second direction) and the Z direction (vertical direction: axial direction) from a rear end of second side wall 132 in the X direction (front-rear direction: first direction). In the present exemplary embodiment, extension part 1321 is formed from the lower end to the upper end side (the middle of the upper end) of second side wall 132. That is, extension part 1321 is connected to second side wall 132 in a state where the upper end of second side wall 132 protrudes upward from the upper end of extension part 1321 (see FIGS. 36 and 37).

In the present exemplary embodiment, the lower end of third side wall 133 is located near the upper end of extension part 1321. Thus, third side wall 133 is provided on case 120 so as to overlap second side wall 132 when viewed from the Y direction (width direction: second direction) and to overlap extension part 1321 of second side wall 132 when viewed from the Z direction (vertical direction: axial direction).

Figure 41:
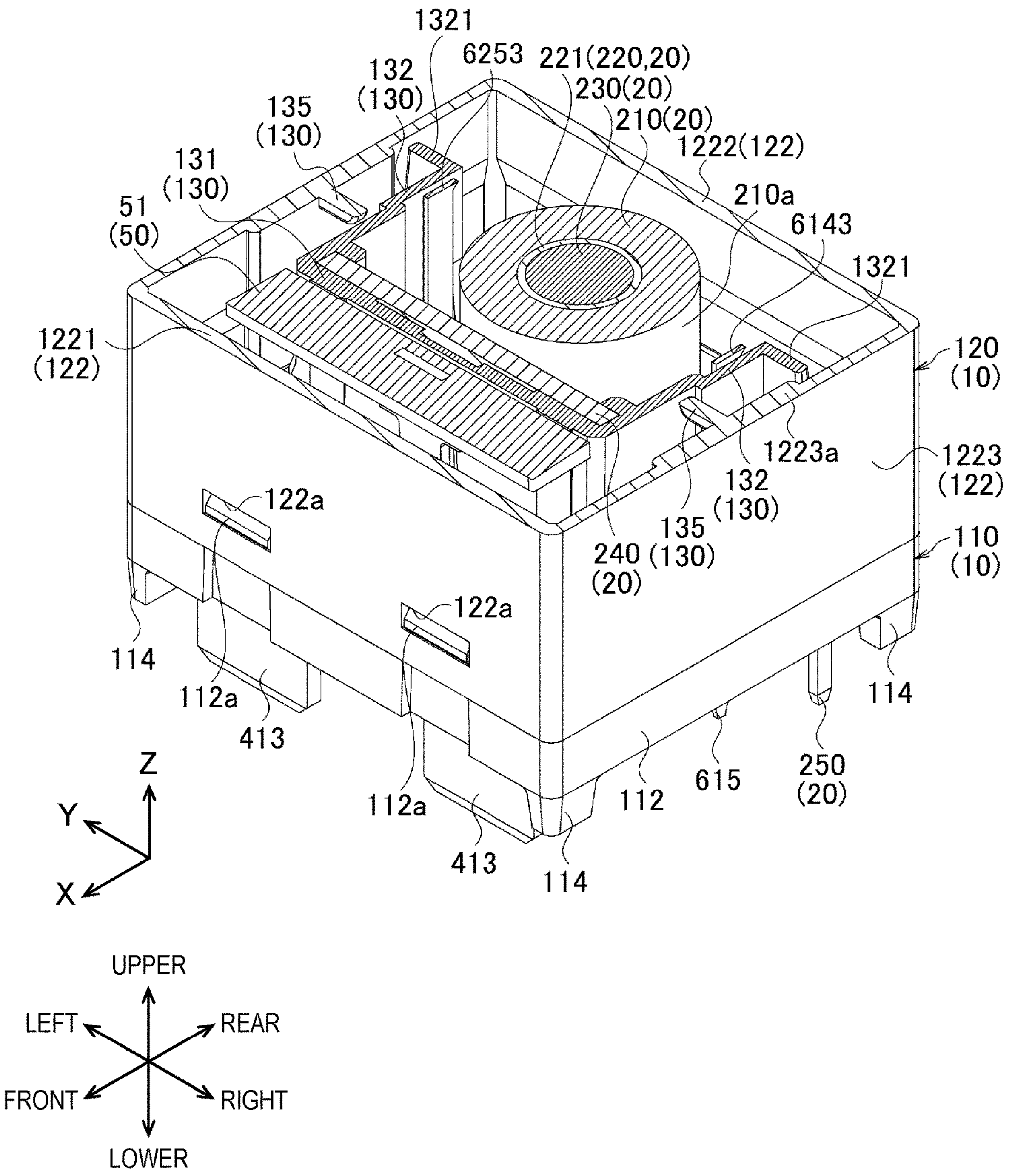
FIG. 41 is a view illustrating an electromagnetic relay according to the third exemplary embodiment, and is a perspective view illustrating a state in which a center in a vertical direction of the electromagnetic relay is cut by a horizontal plane.
Figure 42:
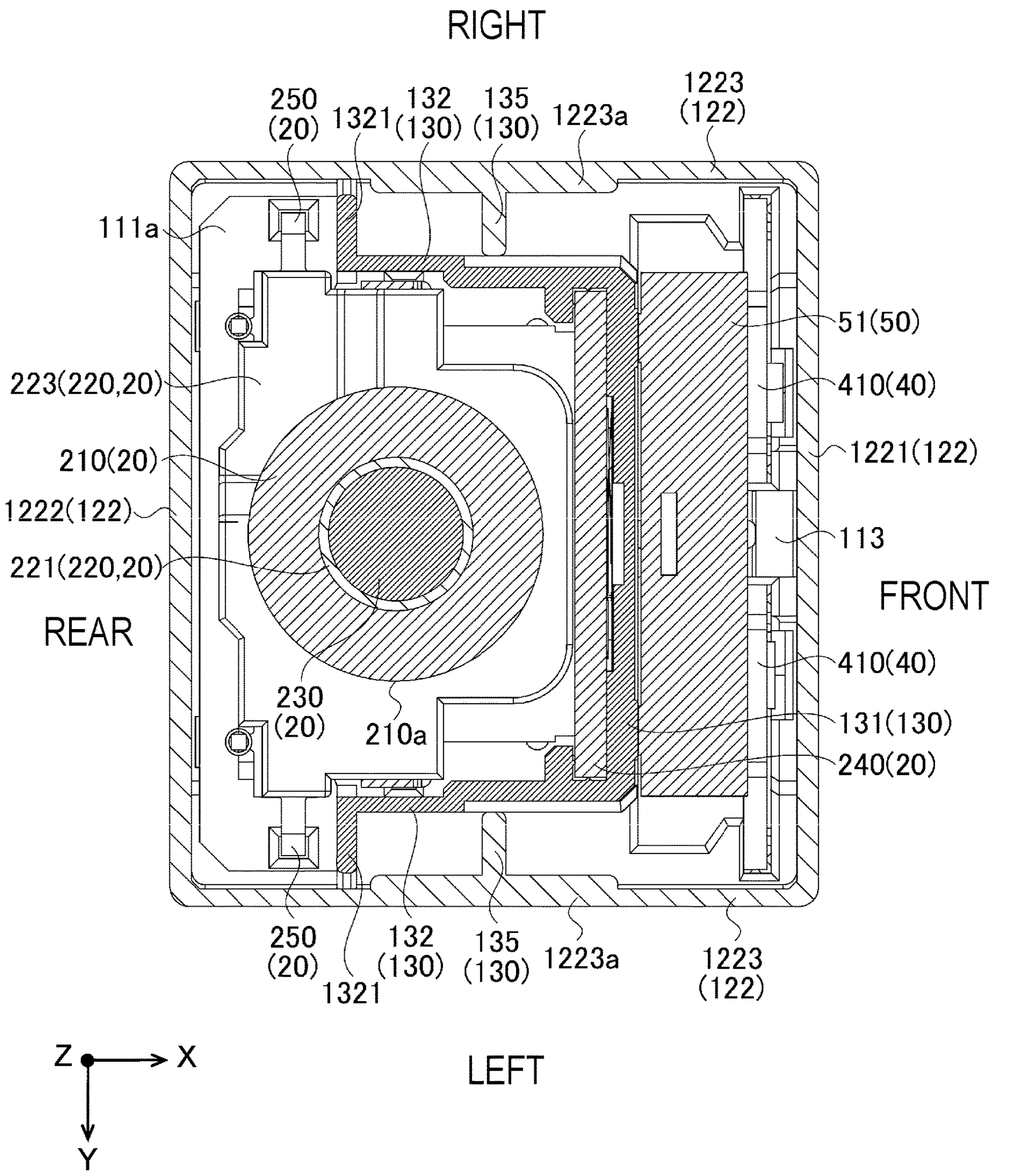
FIG. 42 is a plan view of the electromagnetic relay illustrated in FIG. 41.

Fifth side wall 135 is provided on case 120 so as to overlap with extension part 1321 of second side wall 132 in a state of being viewed from the X direction (front-rear direction: first direction) (see FIGS. 41 and 42).

Such electromagnetic relay 1 can also achieve substantially the same operations and effects as those of electromagnetic relay 1 described in the first exemplary embodiment.

(Conclusion)

Hereinafter, the characteristic configuration of the electromagnetic relay described in the above-described exemplary embodiment and the effects obtained thereby will be described.

The following aspects are disclosed from the above-described exemplary embodiments and the like.

An electromagnetic relay 1 according to a first aspect includes housing 10 including base 110 and case 120 that opens downward and is provided on base 110, housing 10 having an internal space surrounded by base 110 and case 120; main fixed contact 411; main moving contact 421 configured to come into contact with and separates from main fixed contact 411; auxiliary fixed contact 611; auxiliary moving contact 621 configured to come into contact with and separates from auxiliary fixed contact 611; coil 210 provided in housing 10 such that a central axis extends in a vertical direction; iron core 230 disposed so as to be surrounded by coil 210; yoke 240 disposed around coil 210; armature 310 that is disposed to face an upper end of iron core 230 and swings in response to excitation/non-excitation of coil 210; movable part 50 provided with main moving contact 421 and configured to move in response to swinging of armature 310; and partition wall 130 that divides internal space S1 of housing 10 into main contact side space S2 and auxiliary contact side space S3. Main fixed contact 411 and main moving contact 421 are disposed in front of coil 210. Main fixed contact 411, main moving contact 421, auxiliary fixed contact 611, auxiliary moving contact 621, coil 210, iron core 230, yoke 240, armature 310, movable part 50, and partition wall 130 are provided in internal space S1 of housing 10. Main fixed contact 411 and main moving contact 421 are disposed in main contact side space S2. Auxiliary fixed contact 611 and auxiliary moving contact 621 are disposed in an auxiliary contact side space. Partition wall 130 includes first side wall 131 connected to base 110, a pair of second side walls 132 connected to base 110, and a pair of third side walls 133. When viewed from above, first side wall 131 is disposed between: (1) main fixed contact 411 and main moving contact 421; and (2) coil 210, iron core 230, yoke 240, auxiliary fixed contact 611, and auxiliary moving contact 621. One of the pair of second side walls 132 is connected to one end of first side wall 131. An other of the pair of second side walls 132 is connected to an other end of first side wall 131. One of the pair of third side walls 133 is disposed so as to be adjacent to one of the pair of second side walls 132. An other of the pair of third side walls 133 is disposed so as to be adjacent to an other of the pair of second side walls 132. Coil 210 is surrounded by first side wall 131 and the pair of second side walls 132. (1) Each of the pair of third side walls 133 is located laterally over a side of auxiliary fixed contact 611 and auxiliary moving contact 621, or (2) each of the pair of third side walls 133 is located above the upper end of iron core 230.

According to the above configuration, internal space S1 can be more reliably divided into main contact side space S2 and auxiliary contact side space S3 by first side wall 131, the pair of second side walls 132, and the pair of third side walls 133. In other words, a gap connecting main contact side space S2 and auxiliary contact side space S3 can be made as small as possible by first side wall 131, the pair of second side walls 132, and the pair of third side walls 133. It is possible to suppress auxiliary contact portion 60 from being affected by the consumable powder or the like scattering when main contact portion 40 is brought into contact with or separated from.

Therefore, in electromagnetic relay 1 described above, even in electromagnetic relay 1 in which the current flowing through main contact portion 40 (main fixed contact 411 and main moving contact 421) is large, it is possible to further reduce the possibility that auxiliary contact portion 60 is affected by the consumable powder or the like scattered when main contact portion 40 is brought into and out of contact with each other. As a result, it is possible to suppress a decrease in contact reliability of the auxiliary contact portion.

In electromagnetic relay 1 described above, it is possible to suppress a decrease in the contact reliability of auxiliary contact portion 60 not only when the current flowing through main contact portion 40 is small but also when the current flowing through main contact portion 40 is large.

In electromagnetic relay 1 according to the second aspect, auxiliary fixed contact 611 and auxiliary moving contact 621 are disposed above coil 210.

According to the above configuration, the insulation distance between auxiliary contact portion 60 (auxiliary fixed contact 611 and auxiliary moving contact 621) and coil 210 can be secured more reliably.

In electromagnetic relay 1 according to the third aspect, each of the pair of third side walls 133 is provided in the case so as to overlap the corresponding one of the pair of second side walls 132 when viewed from the side.

According to the above configuration, it is possible to minimize the gap communicating between main contact side space S2 and auxiliary contact side space S3. Therefore, it is possible to suppress auxiliary contact portion 60 (auxiliary fixed contact 611 and auxiliary moving contact 621) from being affected by the consumable powder and the like scattering when main contact portion 40 (main fixed contact 411 and main moving contact 421) comes into contact with and separates from each other.

In electromagnetic relay 1 according to the fourth aspect, each of third side walls 133 is formed integrally with the corresponding one of the pair of second side walls 132.

According to the above configuration, it is possible to suppress formation of a gap between second side wall 132 and third side wall 133. Therefore, it is possible to more reliably prevent auxiliary contact portion 60 (auxiliary fixed contact 611 and auxiliary moving contact 621) from being affected by the consumable powder or the like scattering when main contact portion 40 (main fixed contact 411 and main moving contact 421) comes into contact with or separates from each other.

In electromagnetic relay 1 according to the fifth aspect, auxiliary fixed contact 611 and auxiliary moving contact 621 are disposed between the pair of third side walls 133.

According to the above configuration, it is possible to prevent the consumable powder or the like scattering when main contact portion 40 (main fixed contact 411 and main moving contact 421) is brought into contact with or separated from adhering to auxiliary contact portion 60 (auxiliary fixed contact 611 and auxiliary moving contact 621). It is possible to suppress a decrease in contact reliability of the auxiliary contact portion.

In electromagnetic relay 1 according to the sixth aspect, partition wall 130 further includes fourth side wall 134 protruding downward from the lower surface of the upper portion of case 120, and the lower end of fourth side wall 134 faces armature 310.

According to the above configuration, the space formed in the upper portion of armature 310 can be partitioned by fourth side wall 134. Further, the movement of armature 310 can be suppressed by fourth side wall 134. As a result, it is possible to prevent the consumable powder or the like scattering when main contact portion 40 (main fixed contact 411 and main moving contact 421) is brought into contact with or separated from adhering to auxiliary contact portion 60 (auxiliary fixed contact 611 and auxiliary moving contact 621) along the space formed above armature 310. In addition, it is possible to suppress an increase in the gap between armature 310 and partition wall 130 due to movement of armature 310, and it is possible to suppress adhesion of consumable powder or the like scattering at the time of contact and separation of main contact portion 40 to auxiliary contact portion 60.

In electromagnetic relay 1 according to the seventh aspect, yoke 240 includes vertical wall 241 (upright portion) extending along first side wall 131 outside coil 210, fourth side wall 134 includes pressing wall 1341, and pressing wall 1341 is located between vertical wall 241 of yoke 240 and main fixed contact 411 when viewed from above, and can press armature 310.

According to the above configuration, armature 310 is held down by pressing wall 1341 at a place other than vertical wall 241 (upright portion) which is a relatively unstable portion. As a result, an increase in the gap between armature 310 and partition wall 130 is suppressed. Therefore, it is possible to prevent the consumable powder or the like scattering when main contact portion 40 comes into contact with or separates from the auxiliary contact from adhering to auxiliary contact portion 60.

In electromagnetic relay 1 according to the eighth aspect, pressing wall 1341 has a pair of protrusions (pressing wall extended portions 1341*c*), and armature 310 is disposed between the pair of protrusions (pressing wall extended portions 1341*c*).

According to the above configuration, it is possible to suppress an increase in the gap between armature 310 and partition wall 130.

In electromagnetic relay 1 according to the ninth aspect, yoke 240 has vertical wall 241 (upright portion) extending along first side wall 131 outside coil 210, fourth side wall 134 has partition wall 1342, and partition wall 1342 is located above vertical wall 241 (upright portion) of yoke 240 and divides a space above armature 310 in internal space S1.

According to the above configuration, the space above armature 310 can be partitioned by partition wall 1342. As a result, it is possible to prevent the consumable powder or the like scattering at the time of contact and separation of main contact portion 40 from adhering to auxiliary contact portion 60 along the space above armature 310.

In electromagnetic relay 1 according to the tenth aspect, partition wall 1342 has a pair of protrusions (partition wall extended portions 1342*b*), and armature 310 is disposed between the pair of protrusions (partition wall extended portions 1342*b*).

According to the above configuration, it is possible to suppress an increase in the gap between armature 310 and partition wall 130.

In electromagnetic relay 1 according to the eleventh aspect, a part of each of the pair of protrusions (partition wall extended portions 1342*b*) is located outside second side wall 132.

According to the above configuration, it is possible to suppress an increase in the gap between second side wall 132 and the protrusion (partition wall extended portions 1342*b*).

In electromagnetic relay 1 according to the twelfth aspect, each of the pair of second side walls 132 has extension part 1321 bent outward.

According to the above configuration, extension part 1321 can be disposed in the space for extending the arc generated between main moving contact 421 and main fixed contact 411 so as to extend in the direction intersecting the extending direction of the arc. As a result, extension part 1321 can prevent the consumable powder or the like scattering together with the extended arc from moving toward auxiliary contact portion 60. Therefore, it is possible to suppress a decrease in contact reliability of auxiliary contact portion 60.

In electromagnetic relay 1 according to the thirteenth aspect, each of the pair of third side walls 133 overlaps the corresponding one of the pair of second side walls 132 when viewed from the side, and each of the pair of third side walls 133 is provided in the case so as to overlap the corresponding one extension part 1321 of the pair of second side walls 132 when viewed from the above.

According to the above configuration, it is possible to minimize the gap communicating between main contact side space S2 and auxiliary contact side space S3, and it is possible to suppress auxiliary contact portion 60 from being affected by the consumable powder or the like scattering when main contact portion 40 comes into contact with or separates from each other.

In electromagnetic relay 1 according to the fourteenth aspect, partition wall 130 further includes fifth side wall 135 protruding downward from the lower surface of the upper portion of case 120, fifth side wall 135 is disposed on one outer side of the pair of second side walls 132, and fifth side wall 135 is provided in case 120 so as to overlap one extension part 1321 of the pair of second side walls 132 when viewed from the front.

According to the above configuration, extension part 1321 provided continuously upward from base 110 and fifth side wall 135 provided continuously downward from the upper portion of case 120 are arranged side by side in the arc extending direction. As a result, the space in which the arc is extended can have a bent shape along the extension direction of the arc, and it is possible to suppress the consumable powder or the like scattering together with the extended arc from moving toward auxiliary contact portion 60.

In electromagnetic relay 1 according to the fourteenth aspect, main fixed contact 411 and main moving contact 421 are brought into contact with and separated from each other by one end of armature 310, and auxiliary fixed contact 611 and auxiliary moving contact 621 are brought into contact with and separated from each other by the other end of armature 310.

According to the above configuration, main contact portion 40 (main fixed contact 411 and main moving contact 421) can be brought into and out of contact with each other and auxiliary contact portion 60 (auxiliary fixed contact 611 and auxiliary moving contact 621) can be brought into and out of contact with each other only by swinging one armature 310, so that the configuration can be simplified.

[Others]

Although the contents of the electromagnetic relay according to the present disclosure have been described above, the present disclosure is not limited to these descriptions, and it is obvious to those skilled in the art that various modifications and improvements can be made.

For example, it is possible to adopt a configuration in which the configurations described in the above exemplary embodiment are appropriately combined.

In the above exemplary embodiment, auxiliary contact portion 60 is disposed on the upper side of coil 210, but auxiliary contact portion 60 may be disposed in the center or the lower side of coil 210.

In the above exemplary embodiment, auxiliary contact portion 60 is turned off when main contact portion 40 is in the on state, but auxiliary contact portion 60 can also be turned on when main contact portion 40 is in the on state. At this time, main contact portion 40 and auxiliary contact portion 60 can be so-called normally closed contact portions in which the contacts are turned on in the initial state, and main contact portion 40 and auxiliary contact portion 60 can be so-called normally open contact portions in which the contacts are turned off in the initial state.

Also, specifications (including shape, size, and layout) of the base and the case, and other details can be appropriately changed.

REFERENCE MARKS IN THE DRAWINGS

- 1: electromagnetic relay
- 10: housing
- 110: base
- **111*a***: bottom surface
- **112*a***: protrusion
- 113: partition wall
- 120: case
- 130: partition wall
- 131: first side wall
- 132: second side wall
- 1321: extension part
- 133: third side wall
- 1331: extension part
- 134: fourth side wall
- 1341: pressing wall
- **1341*a***: protrusion
- **1341*c***: pressing wall extended portion
- 1342: partition wall
- **1342*b***: partition wall extended portion
- 135: fifth side wall
- 20: electromagnetic device (drive unit)
- 210: coil
- **210*a***: side surface
- 230: iron core
- 232: head
- 240: yoke
- 241: vertical wall (upright portion)
- 310: armature
- 312: vertical wall
- 40: main contact portion
- 411: main fixed contact
- 421: main moving contact
- 50: movable part
- 60: auxiliary contact portion
- 611: auxiliary fixed contact
- 621: auxiliary moving contact
- S1: internal space
- S2: main contact side space (first space)
- S3: auxiliary contact side space (second space)
- X: front-rear direction (direction intersecting axial direction: first direction)
- Y: width direction (direction intersecting axial direction and first direction: second direction)
- Z: vertical direction (axial direction)

The invention claimed is:

1. An electromagnetic relay comprising:

a housing including a base and a case that opens downward and is provided above the base, the housing having an internal space surrounded by the base and the case;

a main fixed contact;

a main moving contact configured to come into contact with and separate from the main fixed contact;

an auxiliary fixed contact;

an auxiliary moving contact configured to come into contact with and separate from the auxiliary fixed contact;

a coil provided in the housing, a central axis of the coil extending in a vertical direction;

an iron core disposed to be surrounded by the coil;

a yoke disposed around the coil;

an armature that is disposed to face an upper end of the iron core and swings in response to excitation/non-excitation of the coil;

a movable part provided with the main moving contact and configured to move in response to swinging of the armature; and a partition wall that divides the internal space of the housing into a first space and a second space, wherein:

the main fixed contact, the main moving contact, the auxiliary fixed contact, the auxiliary moving contact, the coil, the iron core, the yoke, the armature, the movable part, and the partition wall are provided in the internal space of the housing, the main fixed contact and the main moving contact are disposed in the first space, the auxiliary fixed contact and the auxiliary moving contact are disposed in the second space, the partition wall includes a first side wall connected to the base, a pair of second side walls connected to the base, and a pair of third side walls, when viewed along the vertical direction, the first side wall is disposed between, in a front-back direction crossing the vertical direction, (1) the main fixed contact and the main moving contact, and (2) the coil, the iron core, the yoke, the auxiliary fixed contact, and the auxiliary moving contact, one of the pair of second side walls is connected to one end of the first side wall, an other of the pair of second side walls is connected to another end of the first side wall, one of the pair of third side walls is disposed to be adjacent to one of the pair of second side walls, an other of the pair of third side walls is disposed to be adjacent to another of the pair of second side walls, the coil is partially surrounded by the first side wall and the pair of second side walls, and each of the pair of third side walls is located laterally over a side of the auxiliary fixed contact and the auxiliary moving contact.

2. The electromagnetic relay according to claim 1, wherein the auxiliary fixed contact and the auxiliary moving contact are disposed above the coil.

3. The electromagnetic relay according to claim 1, wherein each of the pair of third side walls is provided in the case to overlap corresponding one of the pair of second side walls when viewed from a side of the electromagnetic relay.

4. The electromagnetic relay according to claim 1, wherein each of the pair of third side walls is formed integrally with corresponding one of the pair of second side walls.

5. The electromagnetic relay according to claim 1, wherein the auxiliary fixed contact and the auxiliary moving contact are disposed between the pair of third side walls.

6. The electromagnetic relay according to claim 1, wherein the partition wall further includes a fourth side wall protruding downward from a lower surface of an upper portion of the case, and a lower end of the fourth side wall faces the armature.

7. The electromagnetic relay according to claim 6, wherein the yoke includes an upright portion extending along the first side wall outside the coil, the fourth side wall includes a pressing wall, and the pressing wall is located between the upright portion of the yoke and the main fixed contact when viewed along the vertical direction and is configured to press the armature.

8. The electromagnetic relay according to claim 7, wherein the pressing wall includes a pair of pressing wall extended portions, and the armature is disposed between the pair of pressing wall extended portions.

9. The electromagnetic relay according to claim 6, wherein the yoke includes an upright portion extending along the first side wall outside the coil, the fourth side wall includes a partition wall, and the partition wall is located above the upright portion of the yoke and divides a space above the armature in the internal space.

10. The electromagnetic relay according to claim 9, wherein the partition wall includes a pair of partition wall extended portions, and the armature is disposed between the pair of partition wall extended portions.

11. The electromagnetic relay according to claim 10, wherein a part of each of the pair of partition wall extended portions is located outside the pair of second side walls.

12. The electromagnetic relay according to claim 1, wherein each of the pair of second side walls further includes an extension part bent outward.

13. The electromagnetic relay according to claim 12, wherein each of the pair of third side walls overlaps corresponding one of the pair of second side walls when viewed from a side of the electromagnetic relay, and each of the pair of third side walls is provided in the case to overlap the extension part of the corresponding one of the pair of second side walls when viewed along the vertical direction.

14. The electromagnetic relay according to claim 12, wherein the partition wall further includes a fifth side wall protruding downward from a lower surface of an upper portion of the case, the fifth side wall is disposed outside one of the pair of second side walls, and the fifth side wall is provided in the case to overlap the extension part of one of the pair of second side walls when viewed along the front-back direction.

15. The electromagnetic relay according to claim 1, wherein the main fixed contact and the main moving contact are brought into contact with and separated from each other by one end of the armature, and the auxiliary fixed contact and the auxiliary moving contact are brought into contact with and separated from each other by another end of the armature.

* * * * *